(12) United States Patent
Wu et al.

(10) Patent No.: US 11,952,453 B2
(45) Date of Patent: Apr. 9, 2024

(54) RADIATION CURABLE COMPOSITIONS FOR COATING OPTICAL FIBER AND THE COATINGS PRODUCED THEREFROM

(71) Applicant: Covestro (Netherlands) B.V., Nieuwegein (NL)

(72) Inventors: Xiaosong Wu, Elgin, IL (US); Paulus Antonius Maria Steeman, Echt (NL); Adrianus Cornelis Bastiaan Bogaerds, Echt (NL); Mark Pepels, Echt (NL); Guido Joseph Elisabeth Hensen, Echt (NL)

(73) Assignee: Covestro (Netherlands) B.V, Geleen (NL)

(*) Notice: Subject to any disclaimer, the term of this patent is extended or adjusted under 35 U.S.C. 154(b) by 706 days.

(21) Appl. No.: 17/056,951

(22) PCT Filed: Dec. 3, 2018

(86) PCT No.: PCT/US2018/063577
§ 371 (c)(1),
(2) Date: Nov. 19, 2020

(87) PCT Pub. No.: WO2019/231491
PCT Pub. Date: Dec. 5, 2019

(65) Prior Publication Data
US 2021/0208334 A1    Jul. 8, 2021

Related U.S. Application Data

(60) Provisional application No. 62/679,383, filed on Jun. 1, 2018.

(51) Int. Cl.
| | | |
|---|---|---|
| *C08F 2/46* | (2006.01) | |
| *C08F 2/50* | (2006.01) | |
| *C08F 290/06* | (2006.01) | |
| *C08G 18/34* | (2006.01) | |
| *C08G 18/48* | (2006.01) | |
| *C08G 18/75* | (2006.01) | |
| *C08G 18/76* | (2006.01) | |
| *C08G 61/04* | (2006.01) | |
| *C09D 175/16* | (2006.01) | |
| *G02B 6/02* | (2006.01) | |

(52) U.S. Cl.
CPC ............ *C08F 290/067* (2013.01); *C08F 2/50* (2013.01); *C08G 18/34* (2013.01); *C08G 18/4825* (2013.01); *C08G 18/755* (2013.01); *C08G 18/758* (2013.01); *C08G 18/7621* (2013.01); *C09D 175/16* (2013.01); *G02B 6/02395* (2013.01); *C08G 2150/00* (2013.01)

(58) Field of Classification Search
CPC ............... B01J 19/066; B01J 19/126; B01J 2219/00166; C08F 255/02; C08F 222/06
USPC ............... 522/122, 120, 114, 113, 1; 520/1
See application file for complete search history.

(56) References Cited

U.S. PATENT DOCUMENTS

| | | |
|---|---|---|
| 3,004,896 A | 10/1961 | Hansjorg |
| 3,055,896 A | 9/1962 | Boyle |
| 3,072,585 A | 1/1963 | Milionis |
| 3,074,910 A | 1/1963 | Dickson, Jr. |
| 3,189,615 A | 6/1965 | Hansjorg |
| 3,218,332 A | 11/1965 | Hansjorg |
| 3,230,194 A | 1/1966 | Boyle |
| 4,127,586 A | 11/1978 | Rody |
| 4,226,763 A | 10/1980 | Dexter |
| 4,275,004 A | 6/1981 | Winter |
| 4,278,589 A | 7/1981 | Dexter |
| 4,315,848 A | 2/1982 | Dexter |
| 4,324,744 A | 4/1982 | Lechtken |
| 4,347,180 A | 8/1982 | Winter |
| 4,383,863 A | 5/1983 | Dexter |
| 4,474,830 A | 10/1984 | Taylor |
| 4,675,352 A | 6/1987 | Winter |

(Continued)

FOREIGN PATENT DOCUMENTS

| | | |
|---|---|---|
| CA | 2090450 A1 | 3/1992 |
| CN | 103992462 B | 6/2016 |

(Continued)

OTHER PUBLICATIONS

Lee, WS., Dong, S.H., Moon, D.S., and Lee, Y.S., (2011). Highly Efficient Cooling Unit of Glass Fiber for High Speed Optical Fiber Drawing. In Proceedings 60th International Wire and Cable Symposium (IWCS, Charlotte, USA, Nov. 7-9, 2011); p. 338 et seq.

(Continued)

*Primary Examiner* — Jessica Whiteley
(74) *Attorney, Agent, or Firm* — Donald R. Palladino

(57) ABSTRACT

Described and claimed herein are radiation curable compositions for coating an optical fiber, particularly primary coating compositions, wherein the composition possesses specified liquid glass transition temperatures, and/or viscosity ratios between, e.g., 25° C. and 85° C. Such compositions possess preferably high amounts of a reactive oligomer component with a backbone not derived from polypropylene glycol, preferably reactive oligomers with select diisocyanate constituents, one or more reactive diluent monomers, a photoinitiator, and optionally, one or more additives. Such compositions also are preferably sufficiently viscous at room temperature to ensure optimum optical fiber coating processability. Also described are methods of coating the radiation curable compositions elsewhere described, and the fiber optic coatings resulting therefrom.

20 Claims, 9 Drawing Sheets

(56) References Cited

U.S. PATENT DOCUMENTS

| | | |
|---|---|---|
| 4,681,905 A | 7/1987 | Kubota |
| 4,737,593 A | 4/1988 | Ellrich |
| 4,753,817 A | 6/1988 | Meixner |
| 4,851,165 A | 7/1989 | Rennell, Jr. |
| 4,853,471 A | 8/1989 | Rody |
| 4,940,645 A | 7/1990 | Davis |
| 4,962,992 A | 10/1990 | Chapin |
| 5,013,768 A | 5/1991 | Kiriyama |
| 5,104,433 A | 4/1992 | Chapin |
| 5,229,253 A | 7/1993 | Zertani |
| 5,268,450 A | 12/1993 | Deslauriers |
| 5,278,314 A | 1/1994 | Winter |
| 5,280,124 A | 1/1994 | Winter |
| 5,319,091 A | 6/1994 | Deslauriers |
| 5,410,071 A | 4/1995 | Deslauriers |
| 5,436,349 A | 7/1995 | Winter |
| 5,516,914 A | 5/1996 | Winter |
| 5,534,559 A | 7/1996 | Leppard |
| 5,554,760 A | 9/1996 | Winter |
| 5,563,242 A | 10/1996 | Winter |
| 5,574,166 A | 11/1996 | Winter |
| 5,607,987 A | 3/1997 | Winter |
| 5,942,290 A | 8/1999 | Leppard |
| 5,977,219 A | 11/1999 | Ravichandran |
| 6,020,528 A | 2/2000 | Leppard |
| 6,020,529 A | 2/2000 | Fremy |
| 6,166,218 A | 12/2000 | Ravichandran |
| 6,222,969 B1 | 4/2001 | Botelho |
| 6,323,255 B1 | 11/2001 | Snowwhite |
| 6,486,226 B2 | 11/2002 | Al-akhdar |
| 6,486,228 B2 | 11/2002 | Koehler |
| 6,689,463 B2 | 2/2004 | Chou |
| 6,775,451 B1 | 8/2004 | Botelho |
| 6,869,981 B2 | 3/2005 | Fewkes |
| 7,272,289 B2 | 9/2007 | Bickham |
| 8,242,202 B2 | 8/2012 | Yamaguchi et al. |
| 8,837,892 B2 | 9/2014 | Bennett |
| 10,884,182 B2 * | 1/2021 | Steeman .............. G02B 6/4401 |
| 10,889,732 B2 | 1/2021 | Ren et al. |
| 11,256,028 B2 * | 2/2022 | Steeman .............. C08G 18/246 |
| 2002/0102086 A1 | 8/2002 | Fewkes |
| 2002/0146225 A1 | 10/2002 | Bulters |
| 2003/0123839 A1 | 7/2003 | Chou |
| 2005/0031283 A1 | 2/2005 | Fabian |
| 2005/0207715 A1 | 9/2005 | Roba |
| 2005/0226582 A1 | 10/2005 | Nagelvoort |
| 2007/0077016 A1 | 4/2007 | Bickham |
| 2007/0100039 A1 | 5/2007 | Hancock |
| 2007/0263972 A1 | 11/2007 | Roba et al. |
| 2008/0085947 A1 | 4/2008 | Ward et al. |
| 2014/0294355 A1 | 10/2014 | Bickham |
| 2014/0308015 A1 | 10/2014 | Bookbinder |
| 2014/0328566 A1 | 11/2014 | Bickham |
| 2014/0341521 A1 | 11/2014 | Fabian |
| 2016/0377802 A1 | 12/2016 | Homma |
| 2017/0343751 A1 | 11/2017 | Bookbinder |
| 2018/0128969 A1 | 5/2018 | Iwaguchi et al. |
| 2018/0203184 A1 | 7/2018 | Bookbinder |
| 2020/0166700 A1 * | 5/2020 | Steeman .............. C08G 18/755 |
| 2021/0088720 A1 | 3/2021 | Steeman et al. |
| 2021/0208333 A1 | 7/2021 | Ren et al. |
| 2021/0208334 A1 | 7/2021 | Wu et al. |
| 2022/0017773 A1 * | 1/2022 | Steeman ................ C03C 25/28 |

FOREIGN PATENT DOCUMENTS

| | | | |
|---|---|---|---|
| EP | 0438123 A3 | 11/1991 | |
| GB | 2180358 B | 10/1989 | |
| WO | 1999018043 | 4/1999 | |
| WO | 9959930 A1 | 11/1999 | |
| WO | 1999059930 | 11/1999 | |
| WO | 0105724 A2 | 1/2001 | |
| WO | WO-0177040 A2 * | 10/2001 | ......... C03C 25/1055 |
| WO | 02059652 A2 | 8/2002 | |
| WO | 02053509 A3 | 10/2002 | |
| WO | 03080690 A1 | 10/2003 | |
| WO | 03091781 A1 | 11/2003 | |
| WO | 03091178 A3 | 1/2004 | |
| WO | 2005010589 A1 | 2/2005 | |
| WO | 2005017053 A1 | 2/2005 | |
| WO | 2005026228 A1 | 3/2005 | |
| WO | 2006057795 A1 | 6/2006 | |
| WO | 2007040947 A1 | 4/2007 | |
| WO | 2010121659 A1 | 10/2010 | |
| WO | 2011049607 A1 | 4/2011 | |
| WO | 2012036546 A1 | 3/2012 | |
| WO | 2014168739 A1 | 10/2014 | |
| WO | 2014172143 A1 | 10/2014 | |
| WO | 2018220605 A1 | 12/2018 | |

OTHER PUBLICATIONS

Steeman, P. A.M, et al., Mechanical analysis of the in-situ primary coating modulus test for optical fibers; and accompanying short-course delivered as in-person presentation, in Proceedings 52nd International Wire and Cable Symposium (IWCS, Philadelphia, USA, Nov. 10-13, 2003, and accompanying in-person presentation., Paper 41.

Qian, X., Wang, R., Jiang, X., Peng, Y., Y. Peng; Improve Stability of Coating at High Drawing Speed. In Proceedings 55th International Wire and Cable Symposium (IWCS, Providence, USA, Nov. 12-15, 2006); p. 490 et seq.

International Search Report and Written Opinion dated May 2, 2019.

* cited by examiner

RADIATION CURABLE COMPOSITIONS FOR COATING OPTICAL FIBER AND THE COATINGS PRODUCED THEREFROM

CROSS-REFERENCE TO RELATED APPLICATIONS

This application is a U.S. national phase entry under 35 USC § 371 of international application, PCT/US2018/063577, filed 3 Dec. 2018, which claims priority to U.S. Provisional Application No. 62/679,383, filed 1 Jun. 2018, which is hereby incorporated by reference in its entirety as if fully set forth herein.

CROSS REFERENCE TO RELATED APPLICATIONS

This application claims priority to U.S. Provisional Application No. 62/679,383, filed 1 Jun. 2018, which is hereby incorporated by reference in its entirety as if fully set forth herein.

TECHNICAL FIELD

The present invention relates generally to methods of coating optical fibers, the radiation curable coatings suitable for use on optical fibers that are manufactured using high-speed, low-helium, and/or high temperature drawing, and the optical fibers produced therefrom.

BACKGROUND

Optical fibers have been used in a variety of applications and have several advantages over other media. For example, data can be transmitted over optical fibers at a higher data rate than over wires. Optical fibers are also lighter and more flexible than wires. Thus, optical fibers, especially those made from glass, are often used in the telecommunication industry for data transmission. However, if left unprotected, optical fibers are unsuitable for field use because of the fragility of the thin glass strand across which optical signals are transmitted. In addition to their susceptibility to physical damage, uncoated optical fibers would also be negatively impacted by moisture contact. As a result, surface coatings have long-since been applied to optical fibers for protection and to ensure a high-level of performance.

It is well known to draw glass fibers from a specially prepared, cylindrical preform which has been locally and symmetrically heated to a temperature of, e.g., about 2000° C. As the preform is heated, such as by feeding the preform into and through a furnace, a glass fiber is drawn from the molten material. The surface coating compositions are applied to the glass fiber after it has been drawn from the preform, preferably immediately after cooling. The coating compositions are then cured to produce the coated optical fiber. General methods of applying dual layers of coating compositions to a moving glass fiber are well-known in the art, and are disclosed in U.S. Pat. No. 4,474,830 to Taylor and U.S. Pat. No. 4,851,165 to Rennell et al. Newer fiber design concepts can be found in U.S. Pat. No. 8,837,892, US 2014/0294355, and US 2015/0071595.

To protect them, optical fibers are frequently coated with two or more superposed radiation-curable coatings immediately after the fiber is produced by drawing. The coating which directly contacts the optical fiber is called the "inner primary coating" and an overlaying coating is called the "outer primary coating." In some references, the inner primary coating is also called simply the "primary coating" and the outer primary coating is called a "secondary coating." Inner primary coatings are typically formulated to possess a significantly lower modulus than secondary coatings.

The relatively soft inner primary coating provides resistance to microbending which results in added attenuation of the signal transmission (i.e. signal loss) of the coated optical fiber and is therefore undesirable. Microbends are microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating thickness decreases the amount of protection provided decreases. The relationship between coatings and protection from lateral stress that leads to microbending is discussed, for example, in D. Gloge, "Optical-fiber packaging and its influence on fiber straightness and loss", Bell System Technical Journal, Vol. 54, 2, 245 (1975); W. B. Gardner, "Microbending Loss in Optical Fibers", Bell System Technical Journal, Vol. 54, No. 2, p. 457 (1975); J. Baldauf, "Relationship of Mechanical Characteristics of Dual Coated Single Mode Optical Fibers and Microbending Loss", IEICE Trans. Commun., Vol. E76-B, No. 4, 352 (1993); and K. Kobayashi, "Study of Microbending Loss in Thin Coated Fibers and Fiber Ribbons", IWCS, 386 (1993). The harder outer Primary coating, that is, the secondary coating, provides resistance to handling forces such as those encountered when the coated fiber is ribboned and/or cabled.

Optical fiber secondary coating compositions generally comprise, before cure, a mixture of ethylenically-unsaturated compounds, often consisting of one or more oligomers dissolved or dispersed in liquid ethylenically-unsaturated diluents and photoinitiators. The coating composition is typically applied to the optical fiber in liquid form and then exposed to actinic radiation to effect cure.

Primary coatings preferably possess a higher refractive index than the cladding of the associated optical fiber, in order to allow them to strip errant optical signals away from the core of the optical fiber. Primary coatings should maintain adequate adhesion to the glass fiber during thermal and hydrolytic aging, yet (if needed) is capable of being strippable therefrom for splicing purposes. The primary coating typically has a thickness in the range of 20-50 μm (e.g., about 25 or 32.5 μm), thinner thickness in the range of 15-25 μm for 200 μm fibers.

The primary coating typically has a thickness that is less than about 40 μm, although other thicknesses may be used. The primary coating is typically applied to the glass fiber and subsequently cured. Various additives that enhance one or more properties of the primary coating can also be present, including antioxidants, adhesion promoters, inhibitors, photosensitizers, carrier surfactants, tackifiers, catalysts, stabilizers, surface agents, and optical brighteners.

Secondary coatings are the outer coatings. The secondary coating is, for example, the polymerization product of a coating composition whose molecules become highly cross-linked when polymerized. The secondary coating typically has a high in situ modulus (e.g., greater than about 800 MPa at 25° C., more preferably from between about 1 GPa to about 3 GPa) and a high $T_g$ (e.g., greater than about 50° C.). The in situ secondary modulus is preferably greater than about 1000 MPa. Secondary coatings often possess a thickness that is less than about 40 μm.

Fiber optic coatings, including the primary and secondary layers, typically are applied using one of two processes: wet-on-wet (WOW) and wet-on-dry (WOD). In the WOD process, the fiber passes first through a primary coating application, which is cured via exposure to ultraviolet (UV) radiation. The fiber then passes through a secondary coating application, which is subsequently cured by similar means. In the WOW process, the fiber passes through both the primary and secondary coating applications, whereupon the fiber proceeds to the curing step. In a wet-on-wet process, the curing lamps between primary and secondary coating application are omitted.

Radiant light energy is used in the manufacture of radiation curable coatings for optical fibers. In particular, curing processes use radiant energy from UV lamps to cure optical fiber coatings. UV lamps with broadband mercury spectra are commonly used in the industry, due to their high intensity and broad emission spectrum to ensure rapid and full cure of such radiation curable coatings. Increasingly, curing systems utilizing UV-LED (light emitting diodes) lamps have begun to be used as well, as their efficient construction enables a fiber production process with a reduced energy input.

The global demand for optical fiber continues to increase year-on-year. In order to meet this increasing demand, and also to provide a productivity advantage in such a competitive industry, it would be beneficial to increase, among other things, the speed at which an optical fiber is formed, coated, and cured. Current coating and process technology has enabled most fiber producers to operate draw towers comfortably at line speeds of at least 1000 m/min, with speeds of up to 1500 m/min and even 2500 m/min and higher also possible.

However, as the fiber draw speed increases, several technical challenges are introduced into the process, thereby increasing the difficulty by which a suitably coated optical fiber may be produced. Among these technical challenges include a reduction in the ability of the UV light source to impart sufficient doses of radiation to fully cure the primary and secondary coating compositions due to the reduced relative curing exposure time. Further challenges include an increased tendency for runout or concentricity errors in the application of the coated fiber, as vibrations characterized by higher line speeds could induce physical movement beyond the precise coating application tolerances. Yet additional challenges include bubble entrapment, coating delamination, and increased microbend-induced attenuation.

Many of these challenges are induced or exacerbated by an unwanted temperature differential between the freshly drawn glass fiber and the primary coating composition with which it comes into contact. At higher draw speeds, the fiber enters the primary coating die at a temperature that can significantly exceed 50° C. All else being equal, as fiber draw speeds increase, the previously molten glass fiber has less time to equilibrate to the ambient temperature at which the primary coating composition is applied. An insufficiently cooled glass fiber will induce a concomitant temperature increase in the primary coating during application, which may persist to the downstream curing step. The coating compositions (especially primary coating compositions) which are not sufficiently thermally resistive will be adversely affected by this phenomenon, therefore leading to a deterioration in the physical properties—and even the commercial viability—of the coated optical fiber produced therefrom.

A method for attempting to alleviate this problem is well-known in the industry. Such method involves increasing the rate at which a freshly drawn glass fiber may be cooled via the application of fluids with a higher heat transfer coefficient than ambient air, such as nitrogen or helium. Helium is known to be effective as it has a particularly high heat transfer coefficient. However, the amount of helium required for cooling glass fibers increases exponentially with increasing draw speed, such that there exist physical limitations to the amount which can be applied in a finite cooling tube space for a defined period of time. Furthermore, the high cost of helium makes it an expensive input during the fiber production process. An exponentially increasing requirement for such a costly variable would quickly offset the value of any productivity gains realized by the increased throughput achieved by a higher line speed. Thus, additional solutions are needed.

Further attempts to alleviate these problems via process optimization, construction of taller draw towers, more efficient helium application, and fiber drawing enhancements are known. However, in order to truly and more cost-effectively enable the use of optical fiber coating processes at even higher speeds, such as 3000 m/min or more, or at existing speeds with a reduction (or elimination) in the quantity of expensive helium required, it is necessary to improve the performance of the radiation curable coating compositions themselves. Specifically, an unmet need exists to provide optical fiber coatings, especially primary coatings, which exhibit superior processability at higher temperatures. Such higher temperatures may be introduced primarily via faster line processing speeds, reduced helium input, or both. Further, an unmet need exists to provide optical fiber coatings which are both sufficiently thermally resistive, and simultaneously are also being able to maintain or exceed existing coating performance levels the industry has come to expect. Such an improved primary coating may, in addition to being processable at higher line speeds or with lower helium input, also need to be fast curing, exhibit sufficient glass adhesion, and contribute to excellent microbend resistance by possessing a low modulus.

BRIEF SUMMARY

Figure 1:
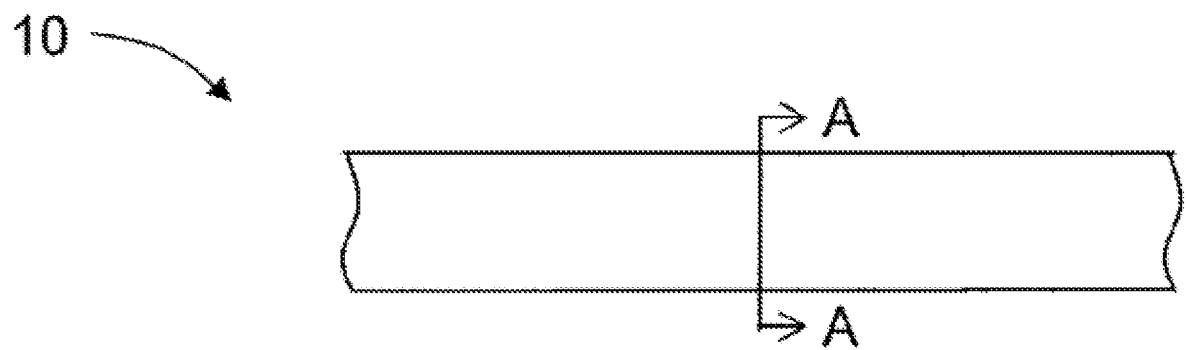
FIG. 1 schematically depicts a cross section of an optical fiber according to embodiments described herein.

Described herein are several embodiments of the invention. A first aspect is a coated optical fiber, including an optical fiber portion, the optical fiber portion itself further including a glass core and a cladding layer in contact with and surrounding said glass core; and a coating portion, said coating portion further including a primary coating layer in contact with and surrounding said cladding layer; and a secondary coating layer in contact with and surrounding said primary coating layer. According to certain embodiments according to this first aspect, the primary coating layer is a cured product of a radiation curable composition comprising a urethane acrylate oligomer which is a product of reactants, said reactants comprising an isocyanate, a polyol, and an acrylate monomer; a reactive diluent monomer; and a free-radical photoinitiator; wherein the radiation curable composition possesses a first viscosity at 25° Celsius (C), a second viscosity at 55° C., and a third viscosity at 85° C., wherein the radiation curable composition is a liquid at each of the first viscosity, the second viscosity, and the third viscosity, and wherein the ratio of the first viscosity to the third viscosity is less than about 15, or less than about 14.4, or less than about 13.9, or less than about 13, or less than about 12, or less than about 11, or less than about 10, or less than about 9, or less than about 7.

According to another embodiment of the first aspect, the coated optical fiber is a single mode or large effective area optical fiber, or any other optical fiber wherein coating processing speed is important, including a multimode fiber. In such other embodiments of the first aspect, the coated optical fiber may possess a mode-field diameter from 8 to 10 µm at a wavelength of 1310 nm, or a mode-field diameter from 9 to 13 µm at a wavelength of 1550 nm, and/or an effective area between 20 and 200 µm².

A second aspect is a radiation curable composition for coating an optical fiber comprising: a reactive oligomer comprising at least one polymerizable group and a backbone derived from a diol comprising polypropylene glycol; a reactive diluent monomer; a photoinitiator; and one or more additives. The radiation curable composition of the second aspect also possesses a liquid glass transition temperature (Tg,rheo), a first viscosity at 25° Celsius (C), a second viscosity at 55° C., and a third viscosity at 85° C.; wherein, at least one or both of the following conditions is satisfied:

(1) the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −85° C., or from −115 to −85° C., or from −110 to −85° C., or from −100 to −85° C., or from −120 to −90° C., or from −115 to −90° C., or from −110 to −90° C., or from −100 to −90° C.; or from −120 to −97° C., or from −113 to −97° C.; or (2) wherein the ratio of the first viscosity to the third viscosity is less than about 15, or less than about 14.4, or less than about 13.9, or less than about 13, or less than 12, or less than about 11, or less than about 10, or less than about 9, or less than about 7.

According to another embodiment of the second aspect, the liquid glass transition temperature of the composition, Tg,rheo, is determined by fitting equation (8) to experimental viscosity versus temperature data for the radiation curable composition:

$$\eta(T)/\eta_{25} = 10^{\left(\frac{-562.5/(62.5 - T_{g,rheo})*(T-25)}{37.5 + T - T_{g,rheo}}\right)}, \qquad (8)$$

where η(T) is the viscosity (in Pascal seconds) of the composition at temperature, T (in degrees Celsius), and $\eta_{25}$ is the first viscosity.

Further embodiments of the second aspect of the invention prescribe varying viscosity ratios of the composition, whether between the first viscosity and the second viscosity, or the first viscosity and the third viscosity. Yet further embodiments of the second aspect prescribe various steady-state viscosity values (at a shear rate of 10/second). Still further embodiments describe various chemical constituents, ratios, quantities, and types that may be incorporated into the compositions according to the present invention.

A third aspect of the invention is a coated optical fiber comprising a primary coating, wherein the primary coating is the cured product of the radiation curable composition according to any of the embodiments of the second aspect.

A fourth aspect of the invention is a method for producing a coated optical fiber comprising the steps of drawing a glass optical fiber through a draw tower; applying a primary coating composition onto the surface of the glass optical fiber; optionally, imparting a dose of UV light sufficient to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition comprises a reactive oligomer comprising at least one polymerizable group and a backbone derived from a diol comprising polypropylene glycol; a reactive diluent monomer; and one or more photoinitiators; wherein the radiation curable composition possesses a liquid glass transition temperature (Tg, rheo), a first viscosity at 25° Celsius (C), a second viscosity at 55° C., and a third viscosity at 85° C.; wherein the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −90° C., or from −115 to −90° C., or from −110 to −90° C., or from −100 to −90° C.; or from −120 to −97° C., or from −113 to −97° C.; and/or wherein the ratio of the first viscosity to the third viscosity is less than about 15, or less than about 14.4, or less than about 13.9, or less than about 13, or less than about 9, or less than about 7.

Another embodiment of the fourth aspect describes optical fiber coating processes according to one or more of the following conditions: at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min; or under the application of no helium, or the application of helium at a flow rate of less than 20 standard liters per minute (SLM), or less than 10 SLM, or less than 5 SLM, or from 1 to 20 SLM, or from 1 to 10 SLM, or from 1 to 5 SLM, or from 5 to 20 SLM, or from 5 to 10 SLM.

A fifth aspect of the invention is an optical fiber cable, wherein the optical fiber comprises at least one optical fiber according to the first or third aspects of the invention, wherein the optical fiber is the cured product of a composition according to the second aspect of the invention, and/or wherein the optical fiber was coated according to the fourth aspect of the invention.

DETAILED DESCRIPTION

A first embodiment of the current invention is a coated optical fiber, including an optical fiber portion, the optical fiber portion itself further including
a glass core and a cladding layer in contact with and surrounding said glass core; and a coating portion, said coating portion further including a primary coating layer in contact with and surrounding said cladding layer; and a secondary coating layer in contact with and surrounding said primary coating layer. According to this first aspect, the primary coating layer is a cured product of a radiation curable composition comprising a urethane acrylate oligomer which is a product of reactants, said reactants comprising an isocyanate, a polyol, and an acrylate monomer; a reactive diluent monomer; and a free-radical photoinitiator; wherein the radiation curable composition possesses a first viscosity at 25° Celsius (C), a second viscosity at 55° C., and a third viscosity at 85° C., wherein the radiation curable composition is a liquid at each of the first viscosity, the second viscosity, and the third viscosity, and wherein the ratio of the first viscosity to the third viscosity is less than about 15, or less than about 14.4, or less than about 13.9, or less than about 13, or less than about 12, or less than about 11, or less than about 10, or less than about 9, or less than about 7.

Figure 2:
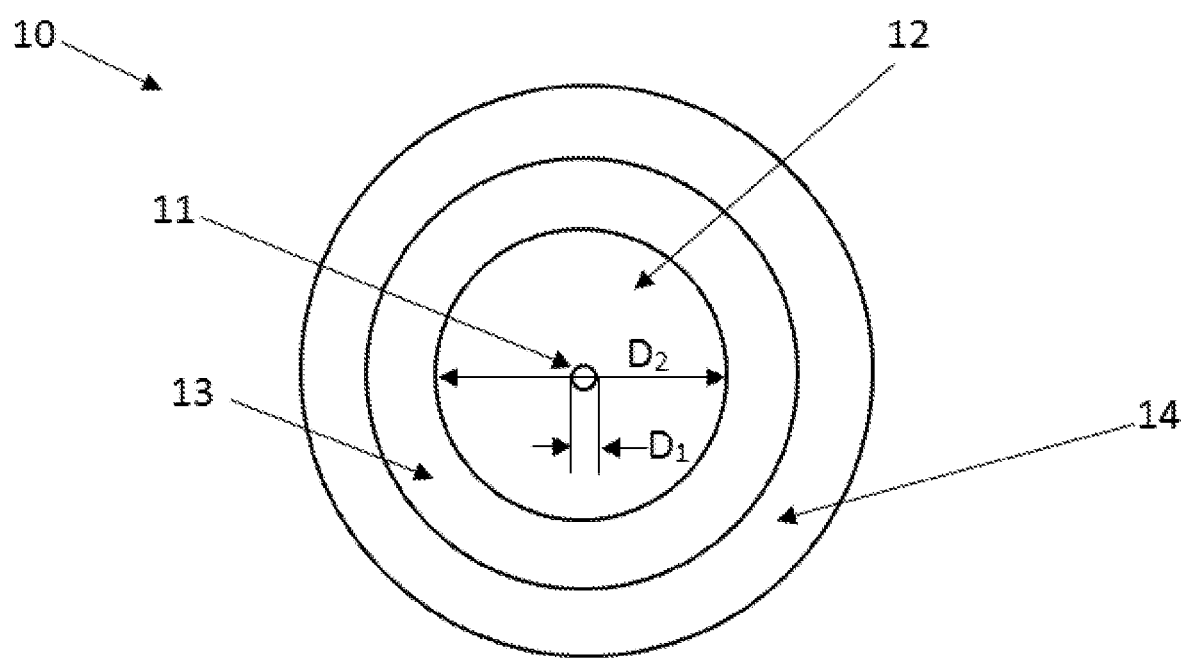
FIG. 2 is a cross-sectional view taken along the line A-A and illustrates a configuration for one example embodiment of the optical fiber of FIG. 1.

FIG. 1 is a side view of fiber 10 as discussed herein. FIG. 2 is a cross-sectional view of fiber 10 an example of the result of the coated fiber described herein.

The optical fiber 10 comprises a core 11, a cladding 12, a primary coating 13 contacting and surrounding the outer annular cladding region, and a secondary coating 14. The outer diameter of the core 11 is $D_1$ and the outer diameter of the cladding 12 is $D_2$. The primary coating 13 is a typical primary coating that has an in situ (or on-fiber) tensile modulus of less than 1.5 MPa, or less than 1.2 MPa, or as low as 0.35 MPa, 0.3 MPa, or 0.25 MPa, and in other embodiments not more than 0.2 MPa. Methods for describing in-situ modulus are well-known in the art and are described in, inter alia, U.S. Pat. Nos. 7,171,103 and 6,961,508, each of which is assigned to DSM IP Assets B.V. The cured primary coating 13 has an in-situ glass transition temperature less than −35° C., or less than −40° C., or less than −45° C., and in other embodiments not more than −50° C. A primary coating with a low in situ modulus reduces the microbending which is the coupling mechanism between the modes propagating in the fiber. A low in situ glass transition temperature ensures that the in-situ modulus of the primary coating will remain low even when the fiber is deployed in very cold environments. The microbending performance will therefore be stable with temperature, resulting in low mode coupling in all situations. The secondary coating 14 is in contact with and surrounds the primary coating 13. The secondary coating 14 has an in situ tensile modulus of greater than 800 MPa, or greater than 1110 MPa, or greater than 1300 MPa, or greater than 1400 MPa, or greater than 1500 MPa. A secondary coating with a high in situ modulus reduces the microbending which is the coupling mechanism between the modes propagating in the fiber.

In the embodiments shown and described herein, core 11 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof. The cladding 12 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index [$\Delta_{1MAX}$] of the core 11 is greater than the maximum relative refractive index [$\Delta_{4MAX}$] of the cladding 12. According to one embodiment, cladding 12 is pure silica glass.

Any optical fiber type may be used in embodiments of the present invention. In a preferred embodiment, however, the coated optical fiber possesses a mode-field diameter from 8 to 10 μm at a wavelength of 1310 nm, or a mode-field diameter from 9 to 13 μm at a wavelength of 1550 nm, and/or an effective area between 20 and 200 μm². Such fibers may be single mode and/or large-effective area fibers, given the expected demand for coating processes for these fibers that utilize higher line or processing speeds. However, other fiber types, such as multimode fibers, may be used as well.

The primary coating 13 preferably has a higher refractive index than the cladding 12 of the optical fiber 10, in order to allow it to strip errant optical signals away from the core of optical fiber. For example, an exemplary transmission optical fiber 10 may have refractive index values at a wavelength of 1550 nm for the core and cladding of 1.447 and 1.436, respectively; as such, it is desirable that the refractive index of primary coating 13 be greater than 1.44 at 1550 nm. The primary coating 13 maintains adequate adhesion to the glass fiber during thermal and hydrolytic aging, yet (if needed) is capable of being strippable therefrom for splicing purposes. The primary coating 13 typically has a thickness in the range of 20-50 μm (e.g., about 25 or 32.5 μm), thinner thickness in the range of 15-25 μm for 200 μm fibers.

Coating 13 is a primary coating, which normally is applied directly to the glass fiber. Coating 13 is preferably formed from a soft crosslinked polymer material having a low in situ modulus and a low in situ $T_g$ The primary coating 13 preferably has a thickness that is less than about 40 μm, more preferably between about 20 to about 40 μm, most preferably between about 20 to about 30 μm. Primary coating 13 is typically applied to the glass fiber and subsequently cured, as will be described in more detail herein below. Various additives that enhance one or more properties of the primary coating can also be present, including antioxidants, adhesion promoters, PAG compounds, photosensitizers, carrier surfactants, tackifiers, catalysts, stabilizers, surface agents, and optical brighteners of the types described above.

In an embodiment, suitable primary coating compositions may include, without limitation, about 10 to 95 weight percent, or from 10 to 90 weight percent, or from about 25 to about 75 weight percent of one or more urethane acrylate oligomers; about 10 to about 65 weight percent, more preferably from about 25 to about 65 weight percent of one or more monofunctional ethylenically unsaturated monomers; about 0 to about 10 weight percent of one or more multifunctional ethylenically unsaturated monomers; about 1 to about 5 weight percent of one or more photoinitiators; about 0.5 to about 1.5 pph of one or more antioxidants; optionally about 0.5 to about 1.5 pph of one or more adhesion promoters; optionally about 0.1 to about 10 pph PAG compound; and about 0.01 to about 0.5 pph of one or more stabilizers.

Coating 14 is the outer coating, and it serves the traditional purpose of a "secondary coating". The outer coating material 14 is, for example, the polymerization product of a coating composition whose molecules become highly crosslinked when polymerized. In the embodiments described herein coating 14 has a high in situ modulus (e.g., greater than about 800 MPa at 25° C.) and a high $T_g$ (e.g., greater than about 50° C.). The in situ secondary modulus is preferably greater than about 1000 MPa, more preferably greater than about 1100 MPa and most preferably greater than about 1200 MPa. According to some preferred embodiments, the in situ secondary modulus is greater than 1200 MPa. In other preferred embodiments, the in situ secondary modulus is between about 1000 MPa and about 8000 MPa, more preferably between about 1200 MPa and about 5000 MPa, and most preferably between about 1500 MPa and about 3000 MPa. The in situ $T_g$ of the secondary coating is preferably between about 50° C. and about 120° C., more preferably between about 50° C. and about 100° C. In an embodiment, the secondary coating 14 has a thickness that is less than about 40 μm, more preferably between about 20 to about 40 μm, most preferably between about 20 to about 30 μm.

Other suitable materials for use in outer (or secondary) coating materials, as well as considerations related to selection of these materials, are well known in the art and are described in, for example, U.S. Pat. Nos. 4,962,992 and 5,104,433 to Chapin. As an alternative to these, high modulus coatings have also been obtained using low oligomer content coating systems, as described in U.S. Pat. No. 6,775,451 to Botelho et al., and U.S. Pat. No. 6,689,463 to Chou et al. In addition, non-reactive oligomer components have been used to achieve high modulus coatings, as described in U.S. Application Publ. No. 20070100039 to Schissel et al. Outer coatings are typically applied to the previously coated fiber (either with or without prior curing) and subsequently cured, as will be described in more detail herein below. Various additives that enhance one or more properties of the coating can also be present, including antioxidants, PAG compounds, photosensitizers, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Suitable compositions for the secondary or outer coating 14 include, without limitation, about 0 to 70 weight percent of one or more urethane acrylate oligomers; about 20 to about 95 weight percent of one or more multifunctional ethylenically unsaturated monomers; about 0 to about 10 weight percent of one or more monofunctional ethylenically unsaturated monomers; about 1 to about 5 weight percent of one or more photoinitiators; about 0 to about 5 pph of one or more slip additives; and about 0.5 to about 1.5 pph of one or more antioxidants.

It is known in the art how to formulate typical optical fiber coating for primary and secondary coatings for fiber as described above, as well as for ink and matrix materials for curing using broadband UV lamps. A good discussion of this technology and associated chemistry and test methods can be found in sections 4.6 to the end of chapter 4 in the textbook, "Specialty Optical Fibers Handbook" by A. Mendez and T. F. Morse, © Elsevier Inc. 2007, published by Elsevier.

A second aspect is a radiation curable composition for coating an optical fiber comprising: a reactive oligomer comprising at least one polymerizable group and a backbone derived from a diol comprising polypropylene glycol; a reactive diluent monomer; a photoinitiator; and one or more additives. The radiation curable composition of the second aspect also possesses a liquid glass transition temperature (Tg,rheo), a first viscosity at 25° Celsius (C), a second viscosity at 55° C., and a third viscosity at 85° C.; wherein, at least one or both of the following conditions is satisfied:

(1) the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −90° C., or from −115 to −90° C., or from −110 to −90° C., or from −100 to −90° C.; or from −120 to −97° C., or from −113 to −97° C.; or (2) wherein the ratio of the first viscosity to the third viscosity is less than about 15, or less than about 14.4, or less than about 13.9, or less than about 13, or less than about 12, or less than about 11, or less than about 10, or less than about 9, or less than about 7.

Radiation curable primary compositions for coating optical fibers according to the second aspect of the present invention contain at least two ethylenically unsaturated polymerizable compounds, including at least one reactive diluent monomer and a radiation curable oligomer, as well as one or more photoinitiators, and an optional additive package. Such components described below may be used in radiation curable compositions according to any of the aspects of the present invention, including coatings used in the optical fibers according to the first aspect, the compositions of the second aspect, and the like.

Ethylenically Unsaturated Polymerizable Compounds

The ethylenically unsaturated polymerizable compounds can contain one or more than one reactive olefinic double bond. They may be low molecular weight (monomeric) or high molecular weight (oligomeric) compounds.

Reactive Diluent Monomers

Typical examples of lower molecular weight monomers containing one double bond are alkyl or hydroxyalkyl acrylates or methacrylates, for example methyl, ethyl, butyl, 2-phenoxy ethyl, 2-ethylhexyl, and 2-hydroxyethyl acrylate, isobornyl acrylate, methyl and ethyl methacrylate, lauryl-acrylate, ethoxylated nonyl-phenol acrylate, and diethylene-glycol-ethyl-hexyl acylate (DEGEHA). Further examples of these monomers are acrylonitrile, acrylamide, methacrylamide, N-substituted (meth)acrylamides, vinyl esters such as vinyl acetate, styrene, alkylstyrenes, halostyrenes, N-vinylpyrrolidone, N-vinyl caprolactam, vinyl chloride and vinylidene chloride. Examples of monomers containing more than one double bond are ethylene glycol diacrylate, propylene glycol diacrylate, tripropylene glycol diacrylate, neopentyl glycol diacrylate, hexamethylene glycol diacrylate, bisphenol A diacrylate, 4,4'-bis(2-acryloyloxyethoxy) diphenylpropane, trimethylolpropane triacrylate, pentaerythritol triacrylate and tetraacrylate, vinyl acrylate, divinyl benzene, divinyl succinate, diallyl phthalate, triallyl phosphate, triallyl isocyanurate or tris(2-acryloylethyl)isocyanurate.

The monomer used may be apolar or polar. Certain apolar monomers which may be suitably used include 2-ethylhexyl acrylate (EHA), isodecyl acrylate (IDA), lauryl acrylate (LA), isobornyl acrylate (IBOA), and various caprolactone acrylates, such as those known commercially as Tone™ M100 or Sartomer SR 495B.

Particularly preferred are polar monomers, including dimethylacryl-amide (dMAA), n-vinyl pyrrolidone (nVP), 2-(2-ethoxyethoxy)ethyl acrylate (EOEOA), 4-hydroxy butyl acrylate (4-HBA), 2-phenoxyethyl acrylate (PEA), and ethoxylated 2-phenoxy ethyl acrylate (EPEA). Inventors have surprisingly discovered that, relative to apolar monomers, more polar monomers of a similar viscosity tend to more effectively contribute to a lower liquid glass transition temperature of the composition with which they are associated. As is discussed elsewhere herein, infra, this combination of characteristics may be valuable to contributing to the formulation of a radiation curable composition which exhibits certain advantages of the current invention.

Polarity is a relative concept which may be characterized and/or quantified in multiple ways. One known method for determining a monomer's polarity is by determining its calculated Boltzmann-averaged dipole moment ("dipole moment"). A comprehensive listing of the calculated Boltzmann-averaged dipole moments of several radiation curable monomers, along with methods for the determination thereof, is presented in *Fast Monomers: Factors Affecting the Inherent Reactivity of Acrylate Monomers in Photoinitiated Acrylate Polymerization*; Macromolecules 2003, 36, 3681-3873 (as revised Apr. 3, 2003). A method for determining such dipole moment values are also described in U.S. Pat. No. 6,916,855 B2, which is hereby incorporated by reference in its entirety. As used herein, a monomer is considered to be "polar" if it possesses a calculated Boltzmann average dipole moment of 2.2 Debye or greater. In an embodiment, therefore, the composition comprises, or consists, or consists essentially of a reactive diluent monomer with a calculated Boltzmann average dipole moment on weight basis of greater than 2.2 Debye, or greater than 2.3 D, or greater than 2.35, or greater than 2.5, or from 2.2 to 4.2 D, or from 2.3 to 4.1 D, or from 2.35 to 4.1 D, or from 2.35 to 4.0 D, or from 2.35 to 3.7 D, or from 2.35 to 3.0 D, or from 2.4 to 4.1 D, or from 2.4 to 4.0 D, or from 2.4 to 3.7 D, or from 2.4 to 3.0 D. In an alternative embodiment, more than one reactive diluent monomer is used, and the total calculated Boltzmann average dipole moment of all of the reactive diluent monomers present in the composition, on a weight bases, is greater than 2.2 Debye, or greater than 2.3 D, or greater than 2.35, or greater than 2.5, or from 2.2 to 4.2 D, or from 2.3 to 4.1 D, or from 2.35 to 4.1 D, or from 2.35 to 4.0 D, or from 2.35 to 3.7 D, or from 2.35 to 3.0 D, or from 2.4 to 4.1 D, or from 2.4 to 4.0 D, or from 2.4 to 3.7 D, or from 2.4 to 3.0 D.

One or more of the aforementioned reactive diluent monomers can be employed in compositions according to the present invention in any suitable amount and may be chosen singly or in combination of one or more of the types enumerated herein. In a preferred embodiment, the reactive diluent monomer component is present in an amount, relative to the entire weight of the composition, of from about 5 wt. % to about 90 wt. %, or from about 10 wt. % to about 90 wt. %, or from about 10 wt. % to about 80 wt. %., or from about 10 wt. % to about 60 wt. %.

Oligomers

Generally, optical fiber coating materials comprise as a reactive oligomer component. An oligomer is a molecule of intermediate relative molecular mass, the structure of which comprises a plurality of units derived, actually or conceptually, from molecules of lower relative molecular mass. As used herein, an "oligomer" possesses a number average molecular weight (Mn) from about 600 g/mol to about 25,000 g/mol, as measured by size exclusion chromatography (SEC) calibrated with a polystyrene standard in tetrahydrofuran.

Such components typically include a urethane acrylate oligomer comprising an acrylate group, urethane groups and a backbone. The backbone is derived from a polyol which has been reacted with an isocyanate, such as a diisocyanate, a polyisocyanate, and a hydroxyalkylacrylate.

Examples of suitable polyols are polyether polyols, polyester polyols, polycarbonate polyols, polycaprolactone polyols, acrylic polyols, and other polyols. These polyols may be used either individually or in combinations of two or more. In a preferred embodiment, the backbone of the urethane acrylate oligomer comprises a compound derived from a polypropylene glycol (PPG). As used herein, a compound derived from a polypropylene glycol includes an endcapped PPG, such as an EO-endcapped PPG. There are no specific limitations to the manner of polymerization of the structural units in these polyols. Each of random polymerization, block polymerization, or graft polymerization is acceptable.

As used herein, a block copolymer means a portion of an oligomer or polymer, comprising many constitutional units, wherein at least one constitutional unit comprises a feature that is not present in adjacent portions. As used herein, mono-, di-, and tri-block copolymers refer to the average amount of a particular block present in the oligomer. In a preferred embodiment, the particular block refers to a polyether block, which is derived from one or more of the polyols, preferably polyether polyols, described elsewhere herein. In an embodiment, the block to which a mono-, di-, and/or tri-block copolymer refers is a polyether block which is derived from one or more of the polyols described elsewhere herein. In an embodiment, a monoblock copolymer may be described as a copolymer having only an average of around 1, or from about 0.9 to less than 1.5 units of a particular block, such as a polyether block. In an embodiment, a diblock copolymer may be described as a copolymer having an average of around 2, or from at least 1.5 to less than 2.5 units of a particular block, such as a polyether block. In an embodiment, a triblock copolymer may be described as a copolymer having an average of around 3, or from at least 2.5 to less than 3.5 units of a particular block, such as a polyether block. The number of polyether units in a given oligomer may be determined by the number of polyether polyol molecules utilized in the synthesis of a single oligomer.

Given as examples of the polyether polyols are polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. In an embodiment, polyols containing polytetramethylene glycol and copolymer glycols of butyleneoxide and ethyleneoxide are particularly preferred.

The number average molecular weight derived from the hydroxyl number of these polyols is usually from about 50 to about 15,000, and preferably from about 1,000 to about 8,000. As used herein, unless otherwise specified, molecular weight refers to a number average molecular weight, as specified in grams/mol (g/mol), as determined by SEC calibrated with a polystyrene standard.

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, 2,4,4 trimethylhexamethylene diisocyanate, hexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred polyisocyanates are isophorone diisocyanate, 2,2,4-trimethylhexamethylene diisocyanate, 2,4,4 trimethylhexamethylene diisocyanate and hexamethylene diisocyanate, 2,4-tolylene diisocyanate, and 2,6-tolylene diisocyanate.

Examples of the hydroxyl group-containing (meth)acrylate used in the oligomer, include, (meth)acrylates derived from (meth)acrylic acid and epoxy and (meth)acrylates comprising alkylene oxides, more in particular, 2-hydroxy ethyl (meth)acrylate, 2-hydroxypropylacrylate, 2-hydroxy-3-oxyphenyl(meth)acrylate, and hydroxyethylcaprolactoneacrylate. Acrylate functional groups are preferred over methacrylates.

The ratio of polyol, polyisocyanate, and hydroxyl group-containing (meth)acrylate used for preparing the urethane (meth)acrylate is determined so that about 1.1 to about 3 equivalents of an isocyanate group included in the polyisocyanate and about 0.1 to about 1.5 equivalents of a hydroxyl group included in the hydroxyl group-containing (meth) acrylate are used for one equivalent of the hydroxyl group included in the glycol.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from about 0.01 to about 1 wt. % of the total amount of the reactant. The reaction is carried out at a temperature from about 10 to about 90° C., and preferably from about 30 to about 80° C.

The number average molecular weight (Mn) of the urethane (meth)acrylate used in the composition of the present invention is preferably in the range from about 600 to about 25,000, and more preferably from about 2,200 to about 10,000, as measured by as measured by size exclusion chromatography (SEC) calibrated with a polystyrene standard in tetrahydrofuran. If the Mn of the urethane (meth) acrylate is less than about 100, the resin composition tends to solidify; on the other hand, if the Mn becomes larger than about 25,000, the viscosity of the composition becomes high, making handling of the composition difficult. In an embodiment, the Mn of the inner primary coating oligomer is between about 2,200 and about 5,500.

Other oligomers that can be used include polyester (meth) acrylate, epoxy (meth)acrylate, polyamide (meth)acrylate, siloxane polymer having a (meth)acryloyloxy group, a reactive polymer obtained by reacting (meth)acrylic acid and a copolymer of glycidyl methacrylate and other polymerizable monomers, and the like. Particularly preferred are bisphenol A based acrylate oligomers such as alkoxylated bisphenol-A-diacrylate and diglycidyl-bisphenol-A-diacrylate.

Beside the above-described components, other curable oligomers or polymers may be added to the liquid curable resin composition of the present invention to the extent that the characteristics of the liquid curable resin composition are not adversely affected.

Preferred oligomers are polyether-based acrylate oligomers, polycarbonate acrylate oligomers, polyester acrylate oligomers, alkyd acrylate oligomers and acrylated acrylic oligomers. More preferred are the urethane-containing oligomers thereof. Even more preferred are polyether urethane acrylate oligomers and urethane acrylate oligomers using blends of the above polyols, and particularly preferred are aliphatic polyether urethane acrylate oligomers. The term "aliphatic" refers to a wholly aliphatic polyisocyanate used.

However, also urethane-free acrylate oligomers, such as urethane-free acrylated acrylic oligomers, urethane-free polyester acrylate oligomers and urethane-free alkyd acrylate oligomers are also preferred. Examples of such high molecular weight (oligomeric) polyunsaturated compounds are acrylated epoxy resins, acrylated polyethers, and acrylated polyesters. Further examples of unsaturated oligomers are unsaturated polyester resins, which are usually prepared from maleic acid, phthalic acid and one or more diols and which have molecular weights of greater than about 500. Unsaturated oligomers of this type are also known as prepolymers. Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and copolymers thereof, polybutadiene and butadiene copolymers, polyisoprene and isoprene copolymers, polymers and copolymers containing (meth)acrylic groups in side-chains, as well as mixtures of one or more than one such polymer. Illustrative examples of unsaturated carboxylic acids are acrylic acid, methacrylic acid, crotonic acid, itaconic acid, cinnamic acid, unsaturated fatty acids such as linolenic acid or oleic acid. Suitable polyols are aromatic, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, for instance on the aromatic polyols and epichlorohydrin.

The reactive oligomer, which is an ethylenically unsaturated polymerizable oligomer preferably comprises, or consists, or consists essentially of urethane acrylate oligomers. The reactive oligomer possesses at least one polymerizable group, although in a preferred embodiment the reactive oligomer is difunctional; i.e., it possesses on average between 1.5 to 2.5 reactive groups per molecule.

One or more of the aforementioned ethylenically unsaturated oligomers can be employed in compositions according to the present invention in any suitable amount and may be chosen singly or in combination of one or more of the types enumerated herein. In an embodiment, the ethylenically unsaturated oligomer component is present in an amount, relative to the entire weight of the composition, of from about 5 wt. % to about 90 wt. %, or from about 10 wt. % to about 90 wt. %, or from about 10 wt. % to about 80 wt. %. In a preferred embodiment, however, a large quantity of the ethylenically unsaturated oligomer should be employed to obtain the desired first viscosity of the composition for a given configuration for high temperature resistance, such as, relative to the total weight of the composition, at least 50 wt. %, or at least 55 wt. %, or at least 60 wt. %, or at least 65 wt. %, or at least 70 wt. %, or from 45-85 wt. %, or from 55 to 80 wt. %, or from 60 to 85 wt. %, or from 60 to 80 wt. %.

Free-Radical Photoinitiator Component

In preferred embodiments, the liquid radiation curable resin for coating an optical fiber of the present invention includes a free-radical photoinitiator component. The photoinitiator is a compound that chemically changes due to the action of light or the synergy between the action of light and the electronic excitation of a sensitizing dye to produce at least one of a radical, an acid, and a base.

According to an embodiment of the present invention, the free-radical photoinitiator is an acylphosphine oxide photoinitiator. Acylphosphine oxide photoinitiators are disclosed for example in U.S. Pat. Nos. 4,324,744, 4,737,593, 5,942,290, 5,534,559, 6,020,529, 6,486,228, and 6,486,226.

The acylphosphine oxide photoinitiators are bisacylphosphine oxides (BAPO) or monoacylphosphine oxides (MAPO).

The bisacylphosphine oxide photoinitiators are of the formula I:

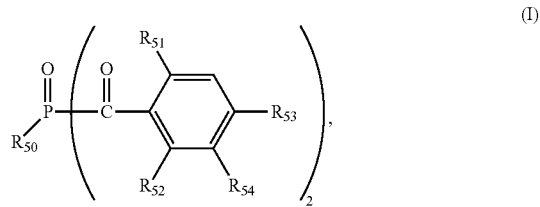

(I)

wherein $R_{50}$ is $C_1$-$C_{12}$ alkyl, cyclohexyl or phenyl which is unsubstituted or is substituted by 1 to 4 halogen or $C_1$-$C_8$ alkyl;

$R_{51}$ and $R_{52}$ are each independently of the other $C_1$-$C_8$ alkyl or $C_1$-$C_8$ alkoxy;

$R_{53}$ is hydrogen or $C_1$-$C_8$ alkyl; and $R_{54}$ is hydrogen or methyl.

For example, $R_{50}$ is $C_2$-$C_{10}$ alkyl, cyclohexyl or phenyl which is unsubstituted or is substituted by 1 to 4 $C_1$-$C_4$ alkyl, Cl or Br. Another embodiment is where $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. For instance, $R_{50}$ is $C_4$-$C_{12}$ alkyl or cyclohexyl, $R_{51}$ and $R_{52}$ are each independently of the other $C_1$-$C_8$ alkyl or $C_1$-$C_8$alkoxy and $R_{53}$ is hydrogen or $C_1$-$C_8$ alkyl. For instance, $R_{51}$ and $R_{52}$ are $C_1$-$C_4$ alkyl or $C_1$-$C_4$alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl. For example, $R_{51}$, $R_{52}$ and $R_{53}$ are methyl. Another embodiment is where $R_{51}$, $R_{52}$ and $R_{53}$ are methyl and $R_{54}$ is hydrogen. Another embodiment is where $R_{50}$ is $C_3$-$C_8$ alkyl. For example, $R_{51}$ and $R_{52}$ are methoxy, $R_{53}$ and $R_{54}$ are hydrogen and $R_{50}$ is isooctyl. For instance, $R_{50}$ is isobutyl. For example, $R_{50}$ is phenyl. The present bisacylphosphine oxide photoinitiator is for example bis(2,4,6-trimethylbenzoyl)-phenylphosphine oxide (CAS #162881-26-7) or is bis(2,4,6-trimethylbenzoyl)-(2,4-bis-pentyloxyphenyl)phosphine oxide.

The monoacylphosphine oxide photoinitiators are of the formula II:

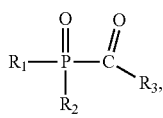

(II)

in which $R_1$ and $R_2$ independently of one another are $C_1$-$C_{12}$alkyl, benzyl, phenyl which is unsubstituted or substituted from one to four times by halogen, $C_1$-$C_8$ alkyl and/or $C_1$-$C_8$ alkoxy, or are cyclohexyl or a group —$COR_3$, or $R_1$ is —$OR_4$;

$R_3$ is phenyl which is unsubstituted or substituted from one to four times by $C_1$-$C_8$ alkyl, $C_1$-$C_8$ alkoxy, $C_1$-$C_8$ alkylthio and/or halogen; and $R_4$ is $C_1$-$C_8$ alkyl, phenyl or benzyl. For example, $R_1$ is —$OR_4$. For example, $R_2$ is phenyl which is unsubstituted or substituted from one to four times by halogen, $C_1$-$C_8$ alkyl and/or $C_1$-$C_8$ alkoxy. For example, $R_3$ is phenyl which is unsubstituted or substituted from one to four times by $C_1$-$C_8$alkyl. For example, the present monoacylphosphine oxide is 2,4,6-trimethylbenzoylethoxyphenylphosphine oxide (CAS #84434-11-7) or 2,4,6-trimethylbenzoyldiphenylphosphine oxide (CAS #127090-72-6).

Compositions according to the present invention may also employ further photoinitiators, for example α-hydroxy ketone photoinitiators of the formula III:

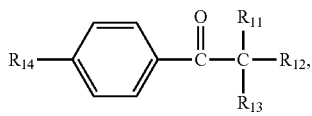

(III)

where $R_{11}$ and $R_{12}$ independently of one another are hydrogen, $C_1$-$C_6$ alkyl, phenyl, $C_1$-$C_6$ alkoxy, $OSiR_{16}(R_{17})_2$ or —$O(CH_2CH_2O)_q$—$C_1$-$C_6$ alkyl, or $R_{11}$ and $R_{12}$, together with the carbon atom to which they are attached, form a cyclohexyl ring;

q is a number from 1 to 20;

$R_{13}$ is OH, $C_1$-$C_{16}$ alkoxy or —$O(CH_2CH_2O)_q$—$C_1$-$C_6$ alkyl;

$R_{14}$ is hydrogen, $C_1$-$C_{18}$ alkyl, $C_1$-$C_{12}$hydroxyalkyl, $C_1$-$C_{18}$ alkoxy, —$OCH_2CH_2$—$OR_{15}$, —$CH=CH_2$, —$C(CH_3)=CH_2$ or is

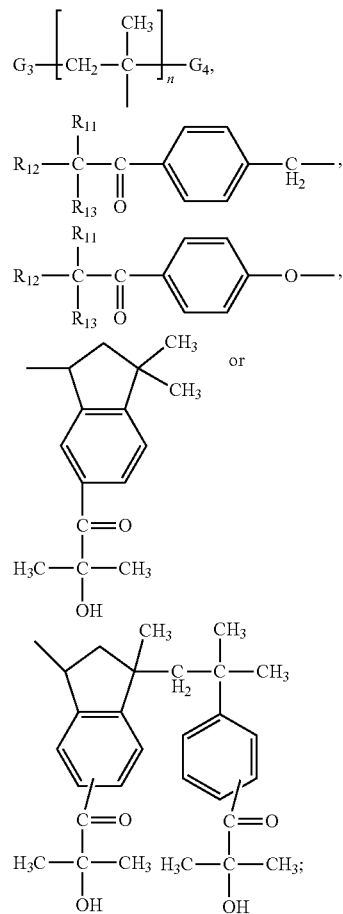

n is a number from 2 to 10;

$R_{15}$ is hydrogen, —$COCH=CH_2$ or —$COC(CH_3)=CH_2$;

$R_{16}$ and $R_{17}$ independently of one another are $C_1$-$C_8$ alkyl or phenyl; and $G_3$ and $G_4$ independently of one another are end groups of the polymeric structure, preferably hydrogen or methyl.

α-hydroxy ketone photoinitiators that are of interest are those in which $R_{11}$ and $R_{12}$ independently of one another are hydrogen, $C_1$-$C_6$ alkyl or phenyl or $R_{11}$ and $R_{12}$, together with the carbon atom to which they are attached, form a cyclohexyl ring, $R_{13}$ is OH, and $R_{14}$ is hydrogen, $C_1$-$C_{12}$ alkyl, $C_1$-$C_{12}$ alkoxy, —$OCH_2CH_2OR_{15}$, —$C(CH_3)=CH_2$ or is

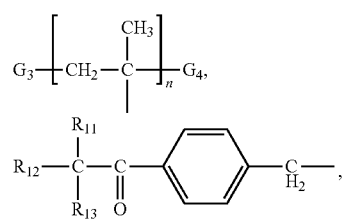

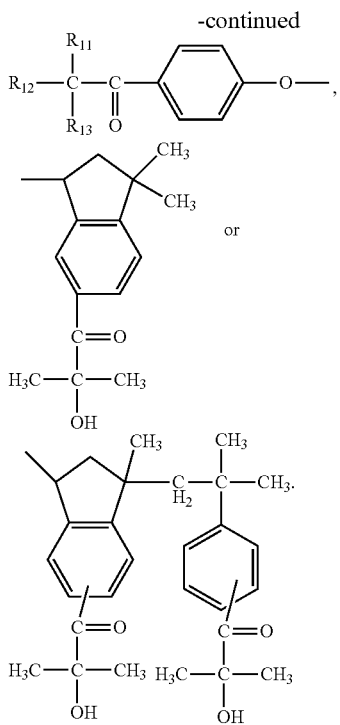

For example, suitable as the α-hydroxy ketone photoinitiators are those in which $R_{11}$ and $R_{12}$ independently of one another are methyl or ethyl or $R_{11}$ and $R_{12}$, together with the carbon atom to which they are attached, form a cyclohexyl ring, $R_{13}$ is hydrogen and $R_{14}$ is hydrogen, $C_1$-$C_4$ alkyl, $C_1$-$C_4$ alkoxy or —$OCH_2CH_2OH$. Interesting also are compounds, wherein $R_{14}$ is

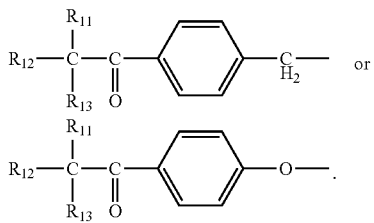

For instance, suitable α-hydroxy ketone photoinitiators are
α-hydroxycyclohexyl phenyl ketone,
2-hydroxy-2-methyl-1-phenylpropanone,
2-hydroxy-2-methyl-1-(4-isopropylphenyl)propanone,
2-hydroxy-2-methyl-1-(4-dodecylphenyl)propanone,
2-Hydroxy-1-{4-[4-(2-hydroxy-2-methyl-propionyl)-benzyl]-phenyl}-2-methyl-propan-1-one and
2-hydroxy-2-methyl-1-[(2-hydroxyethoxy)phenyl]propanone.

The present α-hydroxy ketone photoinitiator is for example α-hydroxycyclohexylphenyl ketone or 2-hydroxy-2-methyl-1-phenyl-1-propanone. Straight or branched chain alkyl is for example, methyl, ethyl, propyl, isopropyl, butyl, isobutyl, sec-butyl, tert-butyl, pentyl, isopentyl, isooctyl, hexyl, heptyl, octyl, nonyl, decyl or dodecyl. Likewise, alkoxy or alkylthio are of the same straight or branched chains.

Photoinitiators according to the present invention may be employed singularly or in combination of one or more as a blend. Suitable photoinitiator blends (PI blends) are for example disclosed in U.S. Pat. No. 6,020,528 and U.S. Pat. app. No. 60/498,848. The present PI (photoinitiator) blends are for example a mixture of bis(2,4,6-trimethylbenzoyl) phenylphosphine oxide (CAS #162881-26-7) and 2,4,6-trimethylbenzoylethoxyphenylphosphine oxide (CAS #84434-11-7) in ratios by weight of about 1:11, 1:10, 1:9, 1:8 or 1:7.

Another especially suitable PI blend is a mixture of bis(2,4,6-trimethylbenzoyl)phenylphosphine oxide, 2,4,6-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable PI blend is a mixture of bis(2,4,6-trimethylbenzoyl)phenylphosphine oxide and 2-hydroxy-2-methyl-1-phenyl-1-propanone in weight ratios of for instance about 1:3, 1:4 or 1:5. The present acylphosphine oxide PI or PI blend is present in the radiation-curable compositions from about 0.2 to about 10% by weight, based on the weight of the composition. For instance, the PI or PI blend is present from about 0.5 to about 8%, about 1 to about 7%, or about 2, 3, 4, 5 or 6% by weight based on the weight of the radiation-curable composition.

Other suitable photoinitiators according to this invention are for or example, other mono- or bisacylphosphinoxides such as diphenyl-2,4,6-trimethylbenzoylphosphine oxide or bis(2,6-dimethoxybenzoyl)-2,4,4-trimethylpentylphosphineoxide; α-hydroxyketones, such as 1-hydroxycyclohexylphenylketone or 2-hydroxy-1-[4-(2-hydroxyethoxy)phenyl]-2-methyl-1-propanone; α-aminoketones, such as 2-methyl-1-[4-(4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl)-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis (chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Other suitable photoinitiators employed according to this invention, with or without acylphosphine oxide photoinitiators, are for example oxime esters as disclosed in U.S. Pat. No. 6,596,445. A suitable oxime ester photoinitiator is for example:

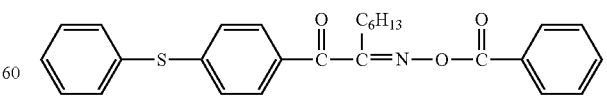

Another class of suitable photoinitiators according to this invention, with or without acylphosphine oxide photoinitiators, are for example phenyl glyoxalates, for example as disclosed in U.S. Pat. No. 6,048,660. For example, phenyl glyoxalates of the formula:

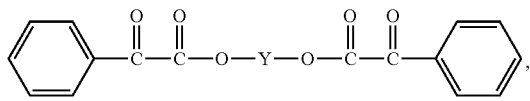

wherein Y is $C_1$-$C_{12}$alkylene, cyclohexlyene, $C_2$-$C_{40}$alkylene interrupted one or more times by cyclohexylene, O, S, or $NR_{30}$, and $R_{30}$ is hydrogen, $C_1$-$C_{12}$alkyl or phenyl, preferably Y is $CH_2CH_2$—O—$CH_2CH_2$.

One or more of the aforementioned free-radical photoinitiators can be employed in compositions according to the present invention in any suitable amount and may be chosen singly or in combination of one or more of the types enumerated herein. In a preferred embodiment, the free-radical photoinitiator component is present in an amount, relative to the entire weight of the composition, of from about 0.1 wt. % to about 10 wt. %, more preferably from about 0.1 wt. % to about 5 wt. %, more preferably from about 1 wt. % to about 5 wt. %.

Additives

Additives are also typically added to optical fiber coatings to achieve certain desirable characteristics such as improved shelf life, improved coating oxidative and hydrolytic stability, and the like. There are many different types of desirable additives, and the invention discussed herein is not intended to be limited by these, nevertheless they are included in the envisioned embodiments since they have desirable effects.

Examples of these are thermal inhibitors, which are intended to prevent premature polymerization, examples being hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributylphosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, paraffin or similar wax-like substances can be added; these migrate to the surface on commencement of the polymerization because of their low solubility in the polymer and form a transparent surface layer which prevents the ingress of air. It is likewise possible to apply an oxygen barrier layer.

Light stabilizers which can be added are UV absorbers, for example well known commercial UV absorbers of the hydroxyphenylbenzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines are for example:

2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-ditbutylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Other Additives

To accelerate the photopolymerization it is possible to add accelerators, coinitiators and autoxidizers such as thiols, thioethers, disulfides and phosphines, as are described, for example, in EP-A-438 123 and GB-A-2 180 358.

The photopolymerization can also be accelerated by the addition of photosensitizers, which shift or broaden the spectral sensitivity. These are, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes. Alternatively, non-aromatic carbonyl compounds may be used. An example of a non-aromatic carbonyl is dimethoxy anthracene.

The curing procedure can be assisted, in particular, by compositions which are pigmented (for example with titanium dioxide), and also by adding a component which forms free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817. Further suitable for this purpose include benzopinacol compounds.

The novel compositions can also include a photo reducible dye, for example xanthene, benzoxanthene, benzothioxanthene, thiazine, pyronine, porphyrin or acridine dyes, and/or a trihalomethyl compound which can be cleaved by radiation. Similar compositions are described, for example, in U.S. Pat. No. 5,229,253.

Other conventional additives may be used depending on the intended application. Examples include fluorescent whiteners, fillers, pigments, dyes, wetting agents or levelling assistants. Thick and pigmented coatings can also contain glass microbeads or powdered glass fibers, as described in U.S. Pat. No. 5,013,768, for example.

One or more of the aforementioned additives can be employed in compositions according to the present invention in any suitable amount and may be chosen singly or in combination of one or more of the types enumerated herein. In a preferred embodiment, the additive component is present in an amount, relative to the entire weight of the composition, of from about 0.01 wt. % to about 5 wt. %, more preferably from about 0.1 wt. % to about 2 wt. %. According to another embodiment, the one or more of the aforementioned additives are included in an amount from about 1 wt. % to about 5 wt. %.

Configuring Primary Coating Compositions for Improved Thermal Resistivity

Inventors have presently discovered that traditional radiation curable primary coating compositions of the types described herein, and especially the oligomer components, are typically characterized by non-Newtonian rheological behavior. That is, they are shear thinning, or exhibit a reduction of shear viscosity at a high shear rate. Furthermore, such materials are highly temperature dependent; that is, the composition's viscosity is significantly influenced by its temperature. Inventors have found that the combination of these properties results in materials which are particularly sensitive to high temperature, high shear rate conditions, such as those experienced in high draw speed or low helium fiber optic coating processes.

This particular sensitivity results in coatings which become exponentially adversely affected by increasing levels of thermal shock or stress to the primary coating, exemplified by the situation wherein a relatively hot freshly drawn glass fiber moving at a high rate of speed comes into contact with a relatively cool, static radiation curable primary coating composition. Specifically, given the temperature dependence of the shear viscosity, upon application to a hot glass optical fiber, the so-called viscous heating effect creates a thin layer of low-viscous fluid close to the fiber. This phenomenon, which may be conceptually analogized to the rapid insertion of a hot knife through butter, results in a strong reduction of the drag capacity of the resin inside the corresponding applicator die, as well as a strong reduction of the coating thickness.

Furthermore, Inventors have discovered that conventional fiber optic coating applicator die designs leave a significant fraction of the die volume in a closed loop vortex. This leads to long residence times of the average quantum of primary coating composition in a die before application. Such die designs exacerbate the aforementioned problems because they lead to the phenomenon that while the local temperature of the resin is increased by the work done by viscous heating, the material inside the vortex will not be refreshed and will increase in temperature until a balance is reached between cooling by heat conduction in the fluid and heating by viscous dissipation.

The foregoing phenomena result in problems of impermissibly thin primary coatings, primary coatings with runout/concentricity issues, primary coatings with bubbles or defects, or those that improperly adhere to the glass, resulting in delamination issues.

In view of its understanding of the mechanics of the foregoing, Inventors have presently recognized that it is possible to improve the suitability of a primary coating composition for use in high draw speed or low helium optical fiber coating processes by reducing its viscosity sensitivity as a function of temperature. That is, such a material, if its relative viscosity were plotted as a function of temperature, should exhibit a flattened or reduced slope.

Inventors have discovered that appropriate "curve flattening" can be achieved by tuning the composition's viscosity ratio. As used herein, viscosity ratio is a measure of the steady-state shear viscosity (at a shear rate of $10 \text{ s}^{-1}$) of the same composition at two different temperatures, wherein the first temperature is lower than the second temperature. Unless otherwise noted, as used herein, "viscosity," along with all qualifiers (such as "first viscosity," "second viscosity," or "third viscosity," etc.) shall be assumed to mean the steady-state shear viscosity at a shear rate of $10 \text{ s}^{-1}$, and all units shall be expressed in terms of Pascal seconds unless otherwise noted. In an embodiment, the viscosity ratio is the composition's viscosity at 25° C. divided by that same composition's viscosity at 55° C. In another embodiment, the viscosity ratio is the composition's viscosity at 25° C. divided by that same composition's viscosity at 85° C. Although temperature conditions of optical fiber coating processes at high draw speeds or low helium utilization will vary, 55° C. is chosen because it is an operating temperature at which existing primary coating compositions have been observed to fail. It is believed that 85° C. is an even more effective marker, because: (1) this higher value will more finely discriminate between marginally-performing and high-performing coatings, and (2) it reflects a temperature to which coatings will foreseeably rise during the ever more demanding optical fiber processing conditions required for higher throughput and/or reduced helium consumption. Thus, compositions possessing viscosity ratios below select values may be sufficiently thermally resistive to be suitable in high draw speed/low helium coating processes.

In an embodiment wherein 85° C. is selected as the upper point in determining temperature sensitivity, the composition possesses a ratio of the viscosity at 25° C. to the viscosity at 85° C. of less than 15, or less than 14.4, or less than 13.9, or less than 13, or less than 12, or less than 11, or less than 10, or less than 9, or less than 7. In an embodiment, the ratio of the viscosity at 25° C. to 85° C. is a range from 5 to 15, or from 5 to 14.4, or from 5 to 13.9, or from 5 to 13, or from 5 to 9, or from 5 to 7, or from 6 to 15, or from 6 to 14.4, or from 6 to 13.9, or from 6 to 13, or from 6 to 9, or from 6 to 7, or from 6.4 to 15, or from 6.4 to 14.4, or from 6.4 to 13.9, or from 6.4 to 13, or from 6.4 to 9, or from 6.4 to 7, or from 7 to 15, or from 7 to 14.4, or from 7 to 13.9, or from 7 to 13, or from 7 to 12, or from 7 to 11, or from 7 to 10, or from 7 to 9. The above values and ratios may be exact, or alternatively reference an approximation of each stated value (i.e. ±5%, or "about" each value).

In an embodiment wherein 55° C. is selected as the upper point in determining temperature sensitivity, the composition possesses a ratio of the viscosity at 25° C. to the viscosity at 55° C. of less than about 4.7, or less than about 4.6, or less than about 4.4, or less than about 4.2, or less than about 4.0, or less than about 3.5. In an embodiment, the ratio of the viscosity at 25° C. to 55° C. is a range from about 2 to about 4.7, or from about 3 to about 4.7, or from about 2 to about 4.6, or from about 3 to about 4.6, or from about 2 to about 4.4, or from about 3 to about 4.4, or from about 2 to about 4.2, or from about 3 to about 4.2, or from about 2 to about 4.0 or from about 3 to about 4.0, or from about 2 to about 3.5, or from about 3 to about 3.5. The above values and ratios may be exact, or alternatively reference an approximation of each stated value (i.e. ±5%, or "about" each value).

If the viscosity ratio is too high, as has been observed in all heretofore existing optical fiber primary coatings, the composition will be characterized by an undesirably marked sensitivity to changes in temperature, which will result in inferior glass application and/or curing performance under high-temperature/high-speed processing. Therefore, the composition should be tuned according to the methods described herein to ensure that the viscosity ratio is as low as possible, whilst maintaining viability as an optical fiber coating.

In addition to possessing the requisite viscosity ratios, a primary coating composition should also possess a sufficiently high viscosity at higher operating temperatures, such as 55° C. That is, the primary coating must exhibit both a sufficiently low slope in terms of the temperature/viscosity relationship, but also an appropriately high "y-intercept" as well. A primary coating composition which possesses a sufficiently low viscosity ratio (i.e. relatively temperature insensitive or temperature/viscosity independent) might still not be suitable for use in coating optical fibers if it possessed an initial viscosity that was too low for feasible use. Therefore, according to certain embodiments, Inventors have discovered that an additional constraint upon thermally resistant primary coating compositions according to the current invention is that such compositions should possess a viscosity at the fiber application temperature of at least 0.01 pascal seconds (Pa·s), or greater than 0.10 Pa·s, or less than 20 Pa·s, or less than 1 Pa·s, or between about 0.01 Pa·s to about 20 Pa·s, or between about 0.01 Pas to about 1 Pa·s, or from about 0.03 Pa·s to about 1 Pa·s, or from about 0.03 Pa·s to about 0.8 Pa·s, or from about 0.03 Pa·s to about 0.5 Pa·s, or from about 0.03 Pa·s to about 0.4 Pa·s, or from about 0.05 Pas to about 1 Pa·s, or from about 0.05 Pa·s to about 0.5 Pa·s, or from about 0.1 Pa·s to about 1 Pa·s, or from about 0.1 Pa·s to about 0.8 Pa·s. In an embodiment, the application temperature is 55° C. In another embodiment, the application temperature is 85° C.

In a preferred embodiment, where the application temperature is 55° C., the viscosity of the composition is between 0.03 to 6 Pa·s, or from 0.05 to 5 Pa·s, or from 0.1 to 3 Pa·s. In a preferred embodiment, where the application temperature is 85 degrees Celsius, the viscosity of the composition is between 0.01 to 2 Pa·s, or from 0.03 to 1.5 Pa·s, or from 0.05 to 1 Pa·s. In a preferred embodiment, where the application temperature is 25 degrees Celsius, meanwhile, the viscosity of the composition is between 0.1 to 20 Pa·s, or from 0.5 to 15 Pa·s, or from 1 to 10 Pa·s, or from 5 to 10 Pa·s.

The viscosity of the composition at room temperature may also be a suitable indicator as to whether it will possess an appropriate flow resistance at a specified application temperature. Compositions that possess a viscosity that is too low at room temperature will more likely be insufficiently viscous at an application temperature. Therefore, in an embodiment, the viscosity of the primary coating composition, when measured at 25° C. is greater than 4 Pa·s, or greater than 5 Pa·s, or from 5 Pa·s to 100 Pa·s, or from 5 Pa·s to 50 Pa·s, or from 5 Pa·s to 20 Pa·s, or from 5 Pa·s to 12 Pa·s, or from 5 Pa·s to 10 Pa·s, or from 8 Pa·s to 50 Pa·s, or from 8 Pas to 20 Pa·s, or from 8 Pa·s to 12 Pa·s.

The curve flattening effect of primary coating compositions of the present invention are also discovered herein to be associated with various other coating properties. Inventors have discovered that there exists a correlation between properties such as a composition's dielectric constant, its refractive index, its liquid glass transition temperature, and such composition's relative heat sensitivity (or insensitivity). Surprisingly, Inventors have discovered that there exists a strong correlation between a coating composition's liquid glass transition temperature and its viscosity ratio; that is, the lower the liquid glass transition temperature of the composition selected, the more temperature insensitive it becomes (as reflected by its relative ability to resist changes in viscosity as it is heated).

Inventors have found that the degree of a primary coating composition's suitability for use in high draw speed/low helium optical fiber coating processes is correlated with its expected time-temperature superposition performance as measured by the Williams-Landel-Ferry (or WLF) equation. The temperature dependence of the relaxation time (tau) associated with the glass transition of amorphous polymeric materials follows the so-called Williams, Landel and Ferry (WLF) relationship[1]:

$$\log(\tau(T)) = \log(\tau(T_{ref})) - \frac{C_1 * (T - T_{ref})}{C_2 + T - T_{ref}} \quad (1)$$

In which $\tau(T)$ is the relaxation time of the glass transition of the polymeric material at temperature T, $\tau(T_{ref})$ the relaxation time of the glass transition of the polymeric material at a reference temperature $T_{ref}$, and $C_1$ and $C_2$ are constants. The values of $C_1$ and $C_2$ depend on the chosen reference temperature. It has been described in literature that 'universal' values for $C_1$=17.44 and $C_2$=51.6 can be used for a broad range of polymeric materials when the reference temperature is chosen equal to the glass transition temperature ($T_g$), wherein $T_g$ is determined via dynamic scanning calorimetry in a method described in McCrum, Read and Williams, *Anelastic and Dielectric Effects in Polymeric Solids*, John Wiley & Sons, New York, 1967. To the finding of the Inventors, however, the viscosity of the uncured optical fiber coating resin formulations can be appropriately described with:

$$\log(\eta(T)) = \log(\eta(T_g)) - \frac{15*(T-T_G)}{C_2+T-T_G} \quad (2)$$

In which $\eta(T)$ is the viscosity of the liquid at temperature T (as used herein, T is expressed in degrees Celsius unless otherwise noted), $\eta(T_g)$ the viscosity at the glass transition temperature $T_g$ as determined with DSC, the constant $C_1$ has a fixed value of 15 and $C_2$ is a fitting parameter that varies over a limited range of values between 35 and 45. Thus, the WLF equation for the liquid resin viscosity follows the same temperature dependence as the relaxation time of the glass transition, with a similar value of $C_1$ and a slightly lower value for $C_2$. Inventors also found that upon choosing a fixed value of 37.5 for $C_2$ in this equation, the glass transition of the liquid resin (Tg,rheo) can be determined from the resin viscosity versus temperature which is especially useful when data from DSC are not available. Given the limited range of $C_2$ values found when using actual Tg data from DSC this means that the glass transition temperature as determined from rheology agrees with the values from DSC within at most ±5° C., which is herein considered to be an acceptable accuracy.

For calculating the Tg from rheology, therefore, the standardized equation may be applied as follows:

$$\log(\eta(T)) = \log(\eta(T_{g,rheo})) - \frac{15*(T-T_{g,rheo})}{37.5+T-T_{g,rheo}} \quad (3)$$

The uncured liquid optical fiber coating resin formulations according to this invention have a lower temperature sensitivity of the resin viscosity in comparison with state of the art resin formulations, as measured from the ratios $\eta(25°C.)/\eta(55°C.)$ and/or $\eta(25°C.)/\eta(85°C.)$. For that purpose, it is useful to transform equation (3) from Tg,rheo as reference temperature to a reference temperature of 25° C.

$$\log(\eta(T)/\eta_{25}) = -\frac{C_{1,Tref=25°C.}*(T-25)}{C_{2,Tref=25°C.}+T-25} \quad (4)$$

The transformation of the WLF equation to a different reference temperature can be done by equating:

$$C_{1,Tref=25°\ C.} \times C_{2,Tref=25°} \ _{C.} = C_{1,Tref=Tg,rheo} \times C_{2,Tref=Tg,rheo} \quad (5)$$

and $$C_{2,Tref=25°\ C.} - 25 = C_{2,Tref=Tg,rheo} - Tg,\text{rheo} \quad (6).$$

The universal WLF equation with Tg-rheo as reference temperature (3) and the equivalent equation with 25° C. as reference temperature (4) can, by including equations (5) and (6), be combined into a single free parameter equation for fitting Tg,rheo to the relative viscosity curve at reference temperature 25° C.:

$$\log(\eta(T)/\eta_{25}) = -\frac{15*37.5/(37.5+25-T_{g,rheo})*(T-25)}{37.5+T-T_{g,rheo}} \quad (7)$$

$$\eta(T)/\eta_{25} = 10\left(\frac{-562.5/(62.5-T_{g,rheo})*(T-25)}{37.5+T-T_{g,rheo}}\right) \quad (8)$$

The foregoing is surprising and has directed inventors to solve the problem of providing compositions to be more processable at higher line speeds and/or lower helium content by formulating in a direction opposite of what was previously considered the appropriate formulation approach. The conventional approach to assure a coating would possess a higher viscosity at elevated temperature was to increase the viscosity of that resin. Such approach could be accomplished via, i.a., increasing the relative quantity of higher molecular weight components, such as the oligomer, or by selecting reactive diluent monomers with a higher viscosity. Such approaches, however, will typically result in an increase in the liquid glass transition temperature (Tg, rheo) of the coating. Taking into account the universal WLF description of the viscosity versus temperature according to equation (3), Inventors have found that such an approach would unexpectedly increase the composition's temperature sensitivity, resulting in a coating that, although possessing an initially higher viscosity at room temperature, would more readily degrade into a low-viscosity resin that is ill-suited for application under higher thermal loads. Therefore, Inventors have presently prescribed a counterintuitive approach of formulating resins in directions which have the effect of a reduction or maintenance of viscosity at room temperature (versus the best known existing solutions) and a reduction of the liquid coating glass transition temperature in order to yield a reduced viscosity sensitivity overall and assure increased processability at higher temperatures.

In addition to the discovery of the reasons for these phenomena, Inventors have devised solutions which enable the skilled artisan, when following certain guidelines prescribed herein (and further illustrated in the non-limiting examples), are able to readily tune or configure a radiation curable primary coating composition to within certain parameters (including viscosity ratio and viscosity at 25° C.) without undue experimentation, so as to mitigate the inherent detriments associated with high draw speed/low helium processing environments. Thus, inventors have surprisingly discovered that it is possible to configure a primary coating composition for increased thermal resistivity—and in turn suitability for use optical fiber coating processes operating at high line speeds or with low helium application—if certain characteristics of the resin are tuned. Several approaches may be utilized to formulating to meet this criterion, including: (1) selecting reactive diluent monomers with lower liquid glass transition temperatures; and/or (2) selecting oligomers with a lower liquid glass transition temperature. Though the glass transition temperature of uncured monomers is usually not specified by the manufacturer or readily determined, as noted, the viscosity of the monomer can serve as a first guideline for selection of appropriate types. That is, monomers with a low viscosity usually also possess a low glass transition temperature.

Additionally, Inventors have determined that a monomer's relative polarity is also a good indicator of its ability to reduce the glass transition temperature of a composition with which it is associated. Inventors have discovered that more polar monomers have been observed to contribute beneficially by tending to reduce, relative to apolar monomers, the liquid glass transition temperature of the composition with which they are associated, without a concomitant reduction in the composition's overall viscosity. As mentioned elsewhere herein, the relative polarity can be understood by a monomer's calculated Boltzmann-averaged dipole moment.

In the case of the oligomer, meanwhile, Inventors have found that a low oligomer Tg, Theo can be obtained by selecting building blocks (polyol, isocyanate and acrylate end-cap) with a low glass transition temperature. Since the diol typically has the lowest glass transition temperature, in an embodiment it is preferred to select diols with number average molecular weight of 4000 g/mol or more—especially if it is desired to simultaneously assure a sufficiently high initial viscosity value—and combine these with an adequate molar ratio of (di-)isocyanates to target mono-, di- or a higher number of polyol blocks containing polyether-urethane-acrylate oligomers. Additionally, Inventors have discovered that the oligomer chemistry has a significant impact on the liquid elasticity as measured by the so-called steady state compliance (Je) of the liquid. Narrowly distributed oligomer diols (e.g. from anionic polymerization) provide less elastic liquids. Additionally, polyols with a low entanglement molecular weight including e.g. PTGL and polytetrahydrofuran (PTHF) result in a higher liquid elasticity. Examples with high entanglement molecular weight and therefore less elastic liquids, by contrast, include polypropylene glycol (PPG) and ethyleneoxide-butyleneoxide copolymer (EOBO).

In order to control viscosity, meanwhile, it would be possible to modify the quantity or nature of the reactive diluent monomer as appropriate. Because this component is not expected to have a significant impact on the composition's elasticity, it may be tuned to enable appropriate starting viscosities as prescribed and claimed herein once sufficient temperature sensitivity or viscosity ratios are achieved.

First, due to the significant diluent effect of several preferred monomers having a low liquid glass transition temperature, it is often desirable or necessary to incorporate a large quantity of the oligomer component. Large quantities of the oligomer also help to induce favorable mechanical properties into the primary coating cured therefrom, so there exist multiple reasons to ensure a high content of the oligomer is present in several embodiments of the invention. In a preferred embodiment, therefore, the radiation curable composition contains at least 50 wt. % of a reactive oligomer component, or at least 55 wt. % of a reactive oligomer component, or at least 60 wt. %, or at least 65 wt. %, or at least 70 wt. %, or from 45-85 wt. %, or from 55 to 80 wt. %, or from 60 to 85 wt. %, or from 60 to 80 wt. %.

It is also possible to control viscosity via oligomer selection and/or synthesis method. Specifically, Inventors have surprisingly also discovered that depending upon the method of oligomer synthesis technique employed, it is possible to modify the viscosity of the composition with which such oligomer is associated independently of such composition's overall temperature resistance. Specifically, Inventors have observed that oligomers synthesized with certain molecular weight distributions tend to yield oligomers with a higher viscosity than the same theoretical oligomer created via methods of synthesis with other molecular weight distributions without inducing a significant impact upon the Tg, rheo of the radiation curable composition with which they were associated. Inventors observed that, by way of non-limiting example, an oligomer synthesized by an "inside-out" method yielded such optimal molecular weight distributions than the same oligomer created by an "outside-in" method of synthesis. Without wishing to be bound by any theory, Inventors believe this phenomenon occurs because such methods tend to create a distribution containing higher fractions of oligomers possessing larger molecular weights. It is believed that although such variants are able to impart changes in viscosity, they do not appreciably impact the overall liquid glass transition temperature because of their relatively low representation by weight relative to all oligomer variants present.

This tactic may be helpful to the formulator of a radiation curable primary composition for optical fiber coating applications because it enables the use of a broader class of formulation constituents that reduce the composition's liquid glass transition temperature but are otherwise not suitable for use because they result in compositions that are insufficiently viscous. Conversely, this understanding enables the formulator to decrease the viscosity without significant changes in the relative temperature resistance as desired as well.

Inventors have discovered that an appropriate way to characterize oligomers which tend to produce this desired effect is my defining those with prescribed Relative High Molecular Weight Ratios (RHMWR). As used herein, RHMWR is determined by calculation of derived values for peak molecular weight (Mp), Z-average molecular weight (Mz), and number average molecular weight (Mn) via the following formula (9):

$$RHMWR = \frac{Mp - Mz}{Mn} \quad (9)$$

wherein Mp, Mz, and Mn are determined via a size exclusion chromatography (SEC) method.

In a preferred embodiment, therefore, the reactive oligomer possesses a RHMWR value from −0.3 to 3. In an embodiment, the reactive oligomer possesses a RHMWR value greater than −0.3, or greater than −0.1, or greater than 0, or greater than 0.05. In an embodiment, the reactive oligomer possesses a RHMWR value less than 3, or less than 2, or less than 1, or less than 0.8.

Any oligomer synthesis technique which tends to yield oligomers to within this aforementioned range is expected to facilitate higher viscosities without a detrimental impact upon the liquid glass transition temperature. Inventors have also surprisingly discovered that polydispersity is not a good indicator of this phenomenon, as it has been observed that differently-performing oligomers with different RHMWR values might still possess relatively similar polydispersity values. This is believed to be because for present purposes, the relevant differences in molecular weight distribution are most relevant in the higher (e.g. z− and z+1) moments of the molecular weight distribution. Because lower moments such as Mw and Mn are insufficiently sensitive to indicate such subtle but notable differences, other methods should be used.

Inventors have also surprisingly discovered that fillers can be employed to increase viscosity without sacrificing the viscosity ratios of the compositions with which they are associated.

The foregoing configuration guidelines can be utilized singularly or in combination of two or more, and in any event do not represent an exhaustive list. Others, including additional already-known formulation guidelines, are appreciated by the skilled artisan and may be used as is exigent given the particular requirements of the application and process for which the primary coating composition is to be associated.

A third aspect of the invention is a coated optical fiber comprising a primary coating, wherein the primary coating is the cured product of the radiation curable composition according to any of the embodiments of the second aspect.

A fourth aspect of the invention is a method for producing a coated optical fiber comprising the steps of drawing a glass optical fiber through a draw tower; applying a primary coating composition onto the surface of the glass optical fiber; optionally, imparting a dose of UV light sufficient to at least partially cure said primary coating composition; applying a secondary coating composition to the primary coating composition; exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating; wherein the primary coating composition comprises a reactive oligomer comprising at least one polymerizable group and a backbone derived from a diol comprising polypropylene glycol; a reactive diluent monomer; and one or more photoinitiators; wherein the radiation curable composition possesses a liquid glass transition temperature (Tg, rheo), a first viscosity at 25° Celsius (C), a second viscosity at 55° C., and a third viscosity at 85° C.; wherein the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −85° C., or from −115 to −85° C., or from −110 to −85° C., or from −100 to −85° C., or from −120 to −90° C., or from −115 to −90° C., or from −110 to −90° C., or from −100 to −90° C.; or from −120 to −97° C., or from −113 to −97° C.; and/or wherein the ratio of the first viscosity to the third viscosity is less than about 15, or less than about 14.4, or less than about 13.9, or less than about 13, or less than about 9, or less than about 7.

Another embodiment of the fourth aspect describes optical fiber coating processes according to one or more of the following conditions: at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min; or under the application of no helium, or the application of helium at a flow rate of less than 20 standard liters per minute (SLM), or less than 10 SLM, or less than 5 SLM, or from 1 to 20 SLM, or from 1 to 10 SLM, or from 1 to 5 SLM, or from 5 to 20 SLM, or from 5 to 10 SLM.

A fifth aspect of the invention is an optical fiber cable, wherein the optical fiber comprises at least one optical fiber according to the first or third aspects of the invention, wherein the optical fiber is the cured product of a composition according to the second aspect of the invention, and/or wherein the optical fiber was coated according to the fourth aspect of the invention.

Improved resins of the current invention can be formulated via the selection of components specified above herein, and further readily tuned by those of ordinary skill in the art to which this invention applies by following the formulation guidelines herein, as well as by extrapolating from the general approaches taken in the embodiments illustrated in the examples below. The following such examples further illustrate the invention but, of course, should not be construed as in any way limiting its scope.

EXAMPLES

These examples illustrate embodiments of the instant invention. Tables 1A and 1B describe the various components of the compositions used in the present examples. Tables 2A and 2B describe the relative amounts of the reagents described in Tables 1A and 1B which were used to synthesize the oligomers used in the present examples. Tables 2C and 2D represent further evaluation of select reactive diluent monomers and reactive oligomers, respectively.

TABLE 1A

Oligomer Components

| Component | Chemical Descriptor | Supplier/Manufacturer |
| --- | --- | --- |
| Acclaim 8200 | Diol based on propylene Oxide; molecular weight approximately 8,000 | Covestro |
| Acclaim 4200 | Long-chain polyether polyol; molecular weight approximately 4,000 | Covestro |
| Arcol Polyol PPG 2000 | Bifunctional polypropylene glycol; molecular weight approximately 2,000 | Covestro |
| IPDI | Isophorone diisocyanate; CAS 4098-71-9 | Evonik |
| Mondur TDS Grade II | High 2,4-isomer toluene diisocyanate; 2,4-Isomer, % 98 min; 2,6-Isomer, % 2.0 max | Covestro |
| H12MDI | 4,4'-methylenedicyclohexyl diisocyanate; CAS 5124-30-1 | Covestro |
| PDI | 1,5-pentane diisocyanate; CAS 4538-42-5 | Mitsui Chemical |
| TMDI | 2,2,4- and 2,4,4-trimethyl-hexamethylene diisocyanate (about 1:1); CAS 28679-16-5 | Evonik |
| HDI | Hexamethylene diisocyanate; CAS 822-06-0 | Covestro |
| HEA | 2-Hydroxyethyl acrylate; CAS 818-61-1 | Nippon Shokubai |
| AA | Acrylic Acid, 99% purity; CAS 79-10-7 | BASF |
| 2-EH | 2-ethylhexanol; CAS 104-76-7 | Perstorp |
| BHT Food Grade | Butylated hydroxytoluene; CAS 000128-37-0 | Lanxess |
| DBTDL | Dibutyltin dilaurate; CAS 77-58-7 | Evonik |
| Coscat 83 | Proprietary organobismuth catalyst | Vertellus |

TABLE 1B

Other Formulation Components

| Component | Chemical Descriptor | Supplier/Manufacturer |
|---|---|---|
| AEROSIL® R 972 | hydrophobic fumed silica after treated with DDS (Dimethyldichlorosilane) | Evonik |
| dMAA | Dimethylacryl-amide; CAS 2680-03-7 | Sigma-Aldrich |
| EHA | 2-ethylhexyl acrylate; CAS 103-11-7 | Sigma-Aldrich |
| ENPA | Ethoxylated nonylphenol acrylate; CAS 50974-47-5 | Sartomer, DSM Coating Resins ("DSM") |
| EOEOA | 2-(2-ethoxyethoxy)ethyl acrylate; CAS 7328-17-8 | DSM |
| EPEA | Ethoxylated 2-phenoxy ethyl acrylate; CAS 56641-05-5 | DSM |
| 4-HBA | 4-hydroxy butyl acrylate; CAS 2478-10-6 | TCI |
| IBOA | Isobornyl acrylate; CAS 5888-33-5 | Sigma-Aldrich |
| IDA | Isodecyl acrylate; CAS 1330-61-6 | Sigma-Aldrich |
| LA | Lauryl acrylate; CAS 2156-97-0 | DSM |
| M100 | Caprolactone acrylate; CAS 101484-78-0 | Sartomer |
| nVC | n-vinylcaprolactam; CAS 2235-00-9 | BASF; Alfa Aesar |
| nVP | n-vinyl pyrrolidone; CAS 88-12-0 | Aldrich |
| PEA | 2-phenoxyethyl acrylate; CAS 48145-04-6 | Kowa American Corp., DSM |
| Silquest Y-11167 | Proprietary adhesion promoter | E.W. Kaufmann |
| THIOCURE® TMPMP | Trimethylopropan tri(3-mercaptopropionate) | Bruno Bock |
| TPGDA | Tripropylene glycol diacrylate | Sigma Aldrich |
| TPO | 2,4,6-Trimethylbenzoyldiphenylphosphine oxide; CAS 75980-60-8 | BASF |

TABLE 2A

Oligomer Reactants

| Component | Oligomer 1 | Oligomer 2 | Oligomer 3 | Oligomer 4 | Oligomer 5 |
|---|---|---|---|---|---|
| Acclaim 8200 | 0 | 91.97 | 94.49 | 95.36 | 0 |
| Acclaim 4200 | 0 | 0 | 0 | 0 | 91.22 |
| Arcol Polyol PPG 2000 | 80.70 | 0 | 0 | 0 | 0 |
| IPDI | 0 | 5.21 | 4.02 | 3.6 | 0 |
| Mondur TDS Grade II | 12.16 | 0 | 0 | 0 | 5.93 |
| HEA | 5.46 | 2.72 | 1.4 | 0.94 | 2.37 |
| Acrylic Acid | 0.003 | 0 | 0 | 0 | 0.01 |
| 2-ethyl hexanol | 1.53 | 0 | 0 | 0 | 0.3 |
| BHT Food Grade | 0.10 | 0.05 | 0.05 | 0.05 | 0.15 |
| DBTDL | 0.04 | 0.05 | 0.05 | 0.05 | 0 |
| Coscat 83 | 0 | 0 | 0 | 0 | 0.03 |
| Polyol Equivalents | 2.75 | 2 | 4 | 6 | 4 |
| Isocyanate Equivalents | 4.75 | 4 | 6 | 8 | 6 |
| Acrylate Equivalents | 1.6 | 2 | 2 | 2 | 1.8 |
| Theoretical Molecular Weight | 3397 | 8524 | 16593 | 24662 | 8676 |
| Polyether Block Nature of copolymer | Monoblock | Monoblock | Diblock | Triblock | Diblock |

TABLE 2B

Oligomer Reactants, cont'd

| Component | Oligomer 6 | Oligomer 7 | Oligomer 8 | Oligomer 9 | Oligomer 10 | Oligomer 11 | Oligomer 12 |
|---|---|---|---|---|---|---|---|
| Acclaim 4200 | 88.62 | 91.93 | 90.18 | 91.48 | 89.82 | 89.82 | 91.93 |
| H12MDI | 8.71 | 0 | 0 | 0 | 0 | 0 | 0 |
| PDI | 0 | 5.31 | 0 | 0 | 0 | 0 | 5.31 |
| TMDI | 0 | 0 | 7.1 | 0 | 0 | 0 | 0 |
| HDI | 0 | 0 | 0 | 5.76 | 0 | 0 | 0 |
| IPDI | 0 | 0 | 0 | 0 | 7.48 | 7.48 | 0 |
| HEA | 2.57 | 2.67 | 2.62 | 2.65 | 2.6 | 2.6 | 2.67 |

TABLE 2B-continued

Oligomer Reactants, cont'd

| Component | Oligomer 6 | Oligomer 7 | Oligomer 8 | Oligomer 9 | Oligomer 10 | Oligomer 11 | Oligomer 12 |
|---|---|---|---|---|---|---|---|
| BHT Food Grade | 0.05 | 0.05 | 0.05 | 0.05 | 0.05 | 0.05 | 0.05 |
| DBTDL (1) | 0.02 | 0.02 | 0.02 | 0.02 | 0.02 | 0.02 | 0.02 |
| DBTDL (2) | 0.03 | 0.03 | 0.03 | 0.03 | 0.03 | 0.03 | 0.03 |
| Synthetic Procedure | O/I | O/I | O/I | O/I | O/I | I/O | I/O |
| Polyol Equivalents | 4 | 4 | 4 | 4 | 4 | 4 | 4 |
| Isocyanate Equivalents | 6 | 6 | 6 | 6 | 6 | 6 | 6 |
| Acrylate Equivalents | 2 | 2 | 2 | 2 | 2 | 2 | 2 |
| Theoretical Molecular Weight | 9029 | 8705 | 8873 | 8747 | 8909 | 8909 | 8705 |
| Polyether Block Nature of copolymer | Diblock | Diblock | Diblock | Diblock | Diblock | Diblock | Diblock |

Synthesis of Oligomers 1-5

First, the relevant polyol (Arcol Polyol PPG 2000 for Oligomer 1, Acclaim 8200 for Oligomers 2-4, and Acclaim 4200 for Oligomer 5), after measured to ensure the quantities specified in Table 2A above, was added under a dry air blanket to a clean and dry flask, followed by the specified quantities of the inhibitor (BHT Food Grade). Next, the specified quantities of the isocyanate components (IPDI for Oligomers 2-4; Mondur TDS Grade II for Oligomers 1 and 5) were added, after which the specified quantities of acrylic acid and 2-ethyl hexanol (only included in Oligomers 1 and 5) were then added. These reagents were mixed and stirred for about 15 minutes. Next, the specified quantities of the relevant catalyst (DBTDL for Oligomers 1-4, Coscat 83 for Oligomer 5) were added to the same flask and mixed for approximately an additional 15 minutes. The resulting mixture was then reacted at 60° C. for 1 hour in a heating mantle.

After the 1-hour reaction, the quantity of isocyanate (NCO) content was measured by a potentiometric titrator to ensure it was within 10% of the value of the theoretical isocyanate content that would be derivable for each oligomer from the quantities specified in Table 2A above. Upon confirmation of the appropriate isocyanate content, the appropriate amount of hydroxy ethyl acrylate was added to each oligomer, after which the resulting mixture was reacted for 1 hour at 85° C. Here, again, the isocyanate content was checked via potentiometric titration; if the isocyanate content was beyond 10% of the theoretical value, the mixture was placed back in the reaction chamber in 15-minute additional increments (again at 85° C.) and checked again, with this step repeated until the isocyanate content fell to within the desired range.

Synthesis of Oligomers 6-10

For this "outside-in" synthesis, designated in Table 2B as "O/I," the following synthesis steps were used. First, the relevant diisocyanate (either H12MDI, PDI, TMDI, HDI, or IPDI as indicated in Table 2B) and BHT was charged into a 500 ml reactor (equipped with a stirred, lean air inlet, dropping funnel, and condenser) and heated to 60° C. Then, the reactor containing the heated mixture was purged with oxygen-depleted air (consisting of a 3:1 flow ratio of nitrogen to oxygen). The mixture was maintained at a temperature of 60° C. for 10 minutes. Next, an amount (specified per example in Table 2B) of HEA was charged with the amount of DBTDL(1) specified in Table 2B and added dropwise into the same reactor which had been maintained at 60° C. This temperature was further maintained for 1 hour after the addition of HEA. After 1 hour, a small sample was removed, and the NCO content was measured by a potentiometric titrator to ensure it was within ±0.2% of the value of the theoretical isocyanate content that would be derivable for each oligomer from the quantities specified in Table 2B. If the content was not determined to be within the allowable range, the reaction was then allowed to continue at 60° C., with additional measurements taken every 15 subsequent minutes until acceptable NCO content values were achieved.

With acceptable NCO content values achieved, the Acclaim 4200 polyol was then loaded, along with an additional quantity of DBTDL (specified per example as DBTDL (2) in Table 2B), into a feeding vessel, after which the polyol/DBTDL combination was added dropwise into the reactor containing the previously-mentioned components. The reactor was maintained at 60° C. for another 1 hour. After this time period the reactor was heated further to 85° C. and maintained at such a temperature for an additional 2 hours. Beginning at the end of the additional 2-hour period, the NCO content was again checked to ensure it was present in an amount of less than 0.1% relative to the entire weight of the composition. This was checked by verifying the FT-IR spectrum peak corresponding to NCO (located around 2200-2300 $cm^{-1}$) of the sample had disappeared completely. Additional checks would continue once each subsequent hour until the NCO content was reduced to the maximum allowable level. Finally, the resulting synthesized oligomer was cooled slowly and discharged for use in the experiments described elsewhere herein.

Synthesis of Oligomers 11-12

For this "inside-out" synthesis, designated in Table 2B as "I/O," the following synthesis steps were used. First, the specified amount of the relevant diisocyanate (IPDI for oligomer 11 or PDI for oligomer 12, in the quantities indicated in Table 2B) and BHT was charged into a 500 ml reactor (equipped with a stirred, lean air inlet, dropping funnel, and condenser) and heated to 60° C. Then, the reactor containing the heated mixture was purged with oxygen-depleted air (consisting of a 3:1 flow ratio of nitrogen to oxygen). Then, the specified quantity of Acclaim 4200 polyol was loaded—along with the corresponding quantity of DBTDL as specified under the row designated "DBTDL(1)"—into a feeding vessel. After this, the combination was added slowly dropwise into the reactor which had been maintained to 60° C. for a feeding time of 1 hour. In order to control additional heating due to the ongoing exothermic reaction, the temperature was maintained to below 65° C. via water cooling technique wherein a water pot was applied to cool the exterior of the reactor. The 60° C. temperature was then further maintained for 1 additional hour. Afterwards, a small sample was removed, and the NCO content measured by a potentiometric titrator to ensure it was within ±0.2% of the value of the theoretical isocyanate content that would be derivable for each oligomer from the quantities specified in Table 2B. If the content was not determined to be within the allowable range, the reaction was then allowed to continue at 60° C., with additional measurements taken every 15 subsequent minutes until acceptable NCO content values were achieved.

With the NCO values determined to be present within an acceptable range, BHT (in the amounts specified in Table 2B) was then loaded into the reactor. Next, the HEA—along with a corresponding quantity of DBTDL as specified under the row designated "DBTDL(2)" from Table 2B—were loaded into a feeding vessel and subsequently added slowly dropwise into the 60° C. reactor over the course of 1-2 hours until the addition had been completed. After this, the reactor was heated to 85° C. and maintained at this temperature for an additional 2-hour period. Beginning at the end of the additional 2-hour period, the NCO content was again checked to ensure it was present in an amount of less than 0.1% relative to the entire weight of the composition. This was checked by verifying the FT-IR spectrum peak corresponding to NCO (located around 2200-2300 cm$^{-1}$) of the sample had disappeared completely. Additional checks would continue once each subsequent hour until the NCO content was reduced to the maximum allowable level. Finally, the resulting synthesized oligomer was cooled slowly and discharged for use in the experiments described elsewhere herein.

Preliminary Evaluation of Various Reactive Diluent Monomers

Several known reactive diluent monomers were screened for their potential beneficial contribution to formulations according to the present invention and are depicted below in Table 2C. For each reactive diluent monomer, one or both of the associated viscosity at 25° C. and dipole moment values are listed. The determination of viscosity was made according to the following method:

An Anton Paar type Physica MCR501 instrument was used for these experiments. This rheometer was equipped with a C-PTD200 temperature controller device consisting of a Peltier cooler/heater for use with concentric cylinder and double-gap measuring systems. The so-called double gap DG26.7 system was used as the measurement geometry.

Sample preparation and loading: A disposable plastic pipette (7 ml) was used to load each sample of liquid monomer into the sample cylinder of the double-gap geometry at room temperature, holding the geometry under an angle of about 45 degrees. This was used to prevent the inclusion of large air bubbles in the double-gap geometry.

Next, about 6 ml of the liquid to be investigated was loaded into the double gap geometry, thus obtaining a complete filling of the measurement cell, and assuring the correctness of the sample-geometry surface area values. This amount of material was required to ensure full emersion of the bob of the double gap geometry in the liquid (i.e. the geometry was slightly overloaded with this amount of sample).

Atmosphere and shielding of the sample under investigation: Measurements were performed under air. To minimize evaporation of the liquid monomer sample under investigation, the liquid top surface was covered inside the geometry with the top-cap of a solvent trap system that was attached to the bob of the double-gap geometry.

Measurement: Next, a measurement protocol was followed that consisted of the following consecutive steps:
1. The temperature was set to 25° C. for a duration of 5 minutes, without shearing or data collection to allow for temperature equilibration of the sample and geometry.
2. Perform a steady shearing measurement at 25° C. and applying a shear rate ramp profile with increasing shear rate from 1 to 1000 s-1 and 3 data points per decade. For collecting of the individual data points no specific time settings where applied. The value @ 100 s-1 is taken as value for the viscosity at the 25° C.

Values are reported in Table 2C below under the column titled "Viscosity at 25° C. (Pa·s)."

The Dipole moment values, meanwhile are the calculated Boltzmann-averaged dipole moment, as stated in the known literature, such as *Fast Monomers: Factors Affecting the Inherent Reactivity of Acrylate Monomers in Photoinitiated Acrylate Polymerization*; Macromolecules 2003, 36, 3681-3873 (as revised Apr. 3, 2003) and/or U.S. Pat. No. 6,916,855. Values are expressed in Debye (D). Where indicated, estimations are made on the basis of a relative comparison with values of known monomers possessing similar structures.

TABLE 2C

Dipole Moments of Various Monomers Used

| Monomer | Viscosity at 25° C. (Pa · s) | Dipole Moment (D) |
|---|---|---|
| EHA | 1.7 | 1.87 |
| ENPA | 109.7 | n/a |
| PEA | 9.2 | 2.49 |
| EPEA | 22.6 | n/a |
| EOEOA | 3.2 | 2.41 |
| LA | 4.6 | 1.8[a] |
| 4-HBA | 9.8 | 2.9[b] |
| IBOA | 7.8 | 2.08 |
| nVP | 2.3 | >4[c] |
| nVC | solid | n/a |
| dMAA | 1.2 | 3.6[d] |
| IDA | 3.0 | 1.83 |
| M100 | 86.2 | n/a |

[a]Estimation via comparison with known values for isodecyl acrylate and 2-ethylhexyl acrylate.
[b]Estimation via comparison with published values for 2-hydroxyethyl acrylate.
[c]Estimation via comparison with published values for N-methyl pyrrolidone.
[d]Estimation via comparison with known values for dimethylformamide and dimethylacetamide.

Preliminary Evaluation of Reactive Oligomers

Next, multiple oligomers were evaluated according to the size exclusion chromatography (SEC) method described below to observe the impact that different diisocyanates (H12MDI, PDI, TMDI, HDI, and IPDI)—each synthesized according to two different techniques (outside-in/"O-I" or inside-out/"I-O")—would have on the oligomer's viscosity. Oligomers designated with an asterisk indicate those for which the synthesis has not been directly described above, but they represent inside out syntheses of the same oligomers prescribed elsewhere herein via outside-in methods (as indicated).

Values for number average molecular weight (Mn), weight average molecular weight (Mw), peak molecular weight (Mp), and Z-average molecular weight (Mz) are reported in Table 2D below. Also reported are two parameters which are derived from one or more of Mn, Mw, Mp, and Mz. The first is polydispersity, which is a representation of Mw/Mn, while the second, is Relative High Molecular Weight Ratio, which is represented by the following formula (9):

$$RHMWR = \frac{Mp - Mz}{Mn} \quad (9)$$

The SEC was performed on a Waters APC (Advanced Polymer Chromatography) apparatus, equipped with the following column set:
Acquity APC XT 450 Å 2.5 μm
Acquity APC XT 125 Å 2.5 μm
Acquity APC XT 45 Å 1.7 μm
Two detectors were used: a refractive index detector (RI) and a PDA (Photo Diode Array Detector). The software package employed was Waters Empower 3. All readings were calibrated against polystyrene standards.

The typical run conditions, meanwhile, were as follows:
Injection volume: 10 μl
Flow rate: 0.8 ml/min.
Eluent: THF with 0.8% (v/v) acetic acid
Run time: 10 min.
The column and detectors were maintained at a temperature of approximately 40° C.
Calibrated with polystyrene standards
Integration protocol was performed manually according to methods known in the art to which this invention applies. The baseline was drawn such that only the polyol-containing fraction of each oligomer is reported in Table 2D below (the HEA-isocyanate-HEA adduct quantities are excluded).

Finally, the steady-state viscosity of each oligomer at 25° C. was determined in accordance with the measurement method prescribed below titled "Measurement of the steady state viscosity at 25, 55 and 85° C.," with the following alterations:
The viscosity meter used was a Brookfield DV-III (ULTRA). For oligomers with a viscosity range from vis range is 450 to 25000 cPs, spindle #40 was used. For oligomers having a viscosity greater than 25,000 cPs (up to 800,000 cPs) available, #52 spindle was used. The torque value of Viscosity meter was controlled to around the 45 to 50%.
The weight of sample was keeping on around 0.5 ml.

TABLE 2D

Relative High Molecular Weight Ratio of Various Oligomers
Molecular weight specified in kg/mol

| Oligomer | Diisocyanate used | Synthesis Method | Mn | Mw | Mp | Mz | Poly-dispersity | RHMWR | Viscosity |
|---|---|---|---|---|---|---|---|---|---|
| 6 | H12MDI | O-I | 9.81 | 13.30 | 11.18 | 17.20 | 1.36 | −0.61 | 47.6 |
| 7 | PDI | O-I | 8.65 | 11.65 | 10.10 | 14.95 | 1.35 | −0.56 | 25.7 |
| 8 | TMDI | O-I | 7.92 | 10.53 | 10.12 | 13.62 | 1.33 | −0.44 | 16.5 |
| 9 | HDI | O-I | 8.58 | 11.60 | 10.13 | 14.96 | 1.35 | −0.56 | 30.9 |
| 10 | IPDI | O-I | 8.12 | 10.68 | 10.17 | 13.67 | 1.32 | −0.43 | 25.0 |
| 6* | H12MDI | I-O | 13.55 | 18.84 | 25.93 | 23.77 | 1.39 | 0.16 | No data |
| 12 | PDI | I-O | 11.47 | 15.81 | 21.47 | 19.82 | 1.38 | 0.14 | 107.0 |
| 8* | TMDI | I-O | 10.51 | 14.56 | 20.12 | 18.64 | 1.39 | 0.14 | No data |
| 9* | HDI | I-O | 11.76 | 16.16 | 22.14 | 20.20 | 1.37 | 0.17 | No data |
| 11 | IPDI | I-O | 8.66 | 11.78 | 10.31 | 15.32 | 1.36 | −0.58 | 42.5 |

Examples 1-50

Next, mixtures of oligomer, monomer(s) and photo-initiator were weighed in non-transparent polypropylene cups at 10-20 g scale. The mixing was performed at room temperature in a so-called speed-mixer (Brand Hauschild type DAC 150FVZ) for 5 minutes at 3000-3500 rpm. The temperature during mixing increased by a maximum of 10° C. If the (solid) photo-initiator was not completely dissolved visually, the mixing procedure was repeated. Samples were stored in the same cups.

For examples 15 and 16, the filler was later added using an ultrasonic agitator. For these examples, the base formulation consisting of the oligomer, the monomer constituents and the photo-initiator was prepared as described previously. For the preparation of the mixture with the filler a 15 ml glass rolled bottle was nearly fully filled with an exactly weighed amount of AEROSIL® R 972. Next, a weighted amount of the base resin formulation was added in an amount needed to obtain the desired weight ratio of the Aerosil in the final mixture. The accuracy of the weighing needs to be adequate to obtain an accuracy of the filler weight fraction in the final formulation of better than or equal to ±0.01%. The bottle with filler and resin was subjected to ultrasonic agitation for in total 30 seconds by inserting an ultrasonic probe (standard ½" solid probe by Sonics & Materials Inc., made of a titanium alloy TI-6Al-4V), which was operated at 40% of its capacity. This was done in three steps. After the first 15 seconds ultrasonic mixing the ultrasonic probe was removed a few times and subsequently reinserted into the mixture to obtain additional macroscopic mixing of the sample. Finally, a further 15 minutes of ultrasonic agitation was applied. Mixing was performed at room temperature, under atmospheric conditions.

These samples were tested according to the methods described below for determining each composition's steady state viscosity at 25°, 55°, and 85° Celsius. These values are reported in Tables 3A, 3B, 3C, and 4 as $\eta_{25}$, $\eta_{55}$, and $\eta_{85}$, respectively. The values are presented as rounded to two decimal places, with the exception of values that were less than 0.10 Pascal seconds; such values are presented as rounded to three decimal places. The temperature sensitivity of each composition was also reported, in terms of the ratio of the steady state viscosity from 25° C. to 55° C., and also from 25° C. to 85° C. These values are reported in Tables 3A, 3B, 3C, and 4 as $$\frac{\eta_{25}}{\eta_{55}} \text{ and } \frac{\eta_{25}}{\eta_{85}},$$

respectively. The values for $$\frac{\eta_{25}}{\eta_{55}} \text{ and } \frac{\eta_{25}}{\eta_{85}}$$

are calculated using the non-rounded values of $\eta_{25}$, $\eta_{55}$, and $\eta_{85}$, and are reported to two decimal places. Finally, the liquid glass transition temperature of each sample was also determined by using the calculation method described herein. Such values are reported as rounded to one decimal place.

Measurement of the Steady State Viscosity at 25, 55 and 85° C.

General Description: A general description of the measurement of the steady state shear viscosity of resins can be found in ISO 3219 "Plastics—Polymers/resins in the liquid state or as emulsions or dispersions—Determination of viscosity using a rotational viscometer with defined shear rate." For the analysis of the steady state shear viscosity of uncured optical fiber coating formulations according to the invention, the rotational rheometer should be equipped with a measurement geometry to be adequately sensitive for the determination of the viscosity at a deformation rate of 10 s$^{-1}$ at temperatures between at least 20° C. and 90° C. Care needs to be taken to avoid evaporation of components of the sample under investigation during the course of the experimental procedure to a level that it affects the results of the measurement beyond the typical accuracy of the experiment of +/−5%. Though not limiting, the following preferred set-up for performing such measurements is described herein below.

Equipment: An Anton Paar type Physica MCR501 instrument was used for these experiments. This rheometer was equipped with a C-PTD200 temperature controller device consisting of a Peltier cooler/heater for use with concentric cylinder and double-gap measuring systems. The so-called double gap DG26.7 system was used as the measurement geometry.

Sample preparation and loading: A disposable plastic pipette (7 ml) was used to load the liquid into the sample cylinder of the double-gap geometry at room temperature, holding the geometry under an angle of about 45 degrees. This was used to prevent the inclusion of large air-bubbles in the double-gap geometry.

Next, about 6 ml of the liquid to be investigated was loaded into the double gap geometry, thus obtaining a complete filling of the measurement cell, and assuring the correctness of the sample-geometry surface area values. This amount of material was required to ensure full emersion of the bob of the double gap geometry in the liquid (i.e. the geometry was slightly overloaded with this amount of sample).

Atmosphere and shielding of the sample under investigation: Measurements were performed under air. To minimize evaporation of components from the sample under investigation, the liquid top surface was covered inside the geometry with the top-cap of a solvent trap system that was attached to the bob of the double-gap geometry.

Measurement: Next, a measurement protocol was followed that consisted of the following consecutive sequences:

1. The temperature was set to 20° C. for a duration of 15 minutes, without shearing or data collection to allow for temperature equilibration of the sample and geometry.
2. Perform a step-temperature steady shearing test sequence from 20 to 90° C. using temperature intervals of 5° C. and a shear rate 10 s$^{-1}$. After heating to the next temperature equilibrate for 10 minutes without shearing, the steady shear measurement was started using a shear rate 10 s$^{-1}$, after which 15 data points were acquired using a measurement duration per data point of 6 seconds. The average of these data points was then taken as value for the viscosity at the particular measurement temperature. This sequence was repeated up to a measurement temperature of 90° C. Finally, the data points from these results were extracted for the viscosities at 25, 55 and 85° C.

The following (optional) measurement sequences were also added for a consistency check of the viscosity data obtained from the step temperature measurement sequence. Such steps specifically were incorporated to check that changes to the liquid viscosity e.g. due to evaporation during the measurements could be neglected:

3. Upon completion of the step-temperature sequence, the temperature was set to 85° C., for a duration of 10 minutes, without shearing or data collection to allow for temperature equilibration of the sample and geometry.
4. Next, a steady shear measurement using a shear rate 10 s$^{-1}$ was started, after which 15 data points were acquired using a measurement duration per data point of 6 seconds. The average of the acquired data points was
5. taken and then verified that they coincided with the viscosity at 85° C. as determined by the step-temperature steady shearing measurement previously performed within an accuracy of 10%.
6. Next, the temperature was set to 55° C. for a duration 15 minutes, without shearing or data collection to allow for temperature equilibration of the sample and geometry.
7. After this, an additional steady shear measurement was started using a shear rate 10 s$^{-1}$, and 15 data points were acquired using a measurement duration per data point of 6 seconds each. The average of the acquired data points was then established, with this value verified that it coincided with the viscosity at 55° C. as determined with the step-temperature steady shearing measurement previously performed within an accuracy of 10%.
8. Additionally, the temperature was then set to 25° C. for a duration 15 minutes, without allowing for any shearing or data collection, to ensure temperature equilibration of the sample and geometry.
9. Finally, an additional steady shear measurement was started using a shear rate 10 s$^{-1}$, after which 15 data points were acquired using a measurement duration per data point of 6 seconds each. The average of these acquired data points were then taken and checked to verify that they coincided with the viscosity at 25° C. as determined by the step-temperature steady shearing measurement previously performed within an accuracy of 10%.

The above procedure was applied to each of the examples, with viscosity values at 25° C. reported as $\eta_{25}$, viscosity values at 55° C. reported as $\eta_{55}$, and viscosity values at 85° C. reported as $\eta_{85}$. The results are depicted in Tables 3A, 3B, 3C, and 4 below.

Temperature Sensitivity of the Liquid Resin Viscosity (Tg, Rheo)

The values reported under the heading "Tg, rheo" are curve-fit calculations, which are a result of the application of one or more of expressions (1) through (8) of the Williams-Landel-Ferry equation to the actual rheology data (the method for obtaining which is explained above), reported in Tables 3A, 3B, 3C, and 4. Preferably, simplified equation (8) may be used:

$$\eta(T)/\eta_{25} = 10\left(\frac{-562.5/(62.5 - T_{g,rheo}) * (T - 25)}{37.5 + T - T_{g,rheo}}\right), \quad (8)$$

where $\eta(T)$ is the viscosity of the composition at temperature, T, and $\eta_{25}$ is the first viscosity.

As used above, $\eta(T)$ means the entirety of the viscosity data measured between 20° C. and 90° C., from which the viscosity at 25° C. ($\eta_{25}$) is used as the reference value. Next, a non-linear regression fit was applied to determine the value of Tg, rheo that provided the best overall fit of the calculated WLF fit to the experimental data. This was implemented in a Microsoft Excel® sheet using the Solver add-in. The results for each of the examples and comparative examples are depicted in Tables 3A, 3B, 3C, and 4 below.

Figure 3:
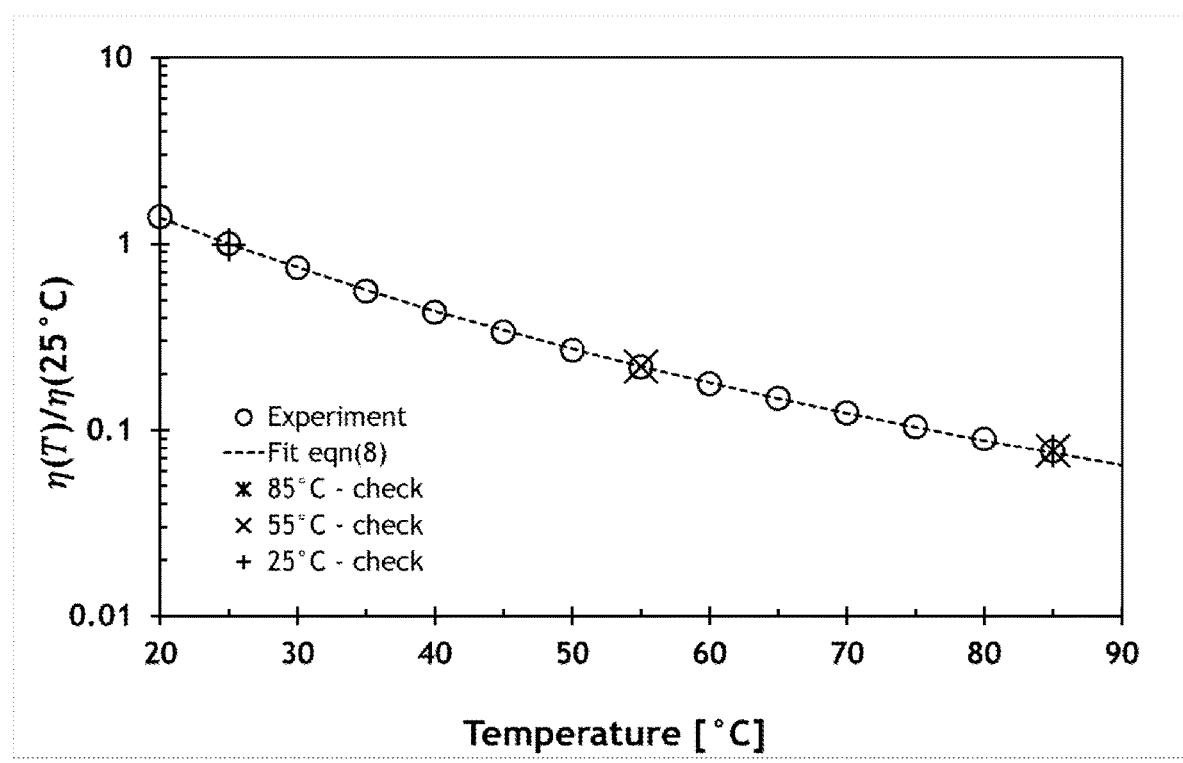
FIG. 3 shows the curve fitting of an embodiment of the present invention (Example 14) in order to establish the Tg, rheo values according to the procedure specified herein.

FIG. 3 illustrates the curve fit (Example 24 is depicted) in order to establish the Tg, rheo values per the aforementioned procedure and equations. The data points represented by circles illustrate the experimentally-obtained values, whereas the fit equation is represented by the dashed line. The data points plotted with crosses depict the additional measurements at 85, 55 and 25° C. during cooling which are determined as stability check.

TABLE 3A

Examples 1-24. Amounts are listed in parts by weight. Viscosity values are reported in pascal seconds (Pa · s); ratios are unitless.

| Example | Oligomer | Oligomer Amount | Monomer 1 | Monomer 1 Amt. | Monomer 2 | Monomer 2 Amt. | TPO | Aerosil | $\eta_{25}$ | $\eta_{55}$ | $\eta_{85}$ | $\frac{\eta_{25}}{\eta_{55}}$ | $\frac{\eta_{25}}{\eta_{85}}$ | Tg, rheo (° C.) |
|---|---|---|---|---|---|---|---|---|---|---|---|---|---|---|
| 1 | 1 | 70 | EHA | 30 | n/a | 0 | 0 | 0 | 1.29 | 0.27 | 0.095 | 4.73 | 13.60 | −82.7 |
| 2 | 1 | 60 | EHA | 40 | n/a | 0 | 1 | 0 | 0.50 | 0.13 | 0.050 | 3.86 | 9.90 | −94.0 |
| 3 | 1 | 50 | EHA | 50 | n/a | 0 | 0 | 0 | 0.17 | 0.053 | 0.023 | 3.21 | 7.20 | −107.8 |
| 4 | 1 | 50 | PEA | 50 | n/a | 0 | 0 | 0 | 0.74 | 0.15 | 0.053 | 5.06 | 13.90 | −81.8 |
| 5 | 1 | 50 | EHA | 25 | PEA | 25 | 1 | 0 | 0.34 | 0.088 | 0.0364 | 3.84 | 9.50 | −95.8 |
| 6 | 2 | 50 | EHA | 25 | PEA | 25 | 1 | 0 | 0.75 | 0.24 | 0.11 | 3.18 | 6.90 | −108.3 |
| 7 | 2 | 60 | EHA | 40 | n/a | 0 | 1 | 0 | 0.97 | 0.31 | 0.15 | 3.07 | 6.60 | −110.8 |
| 8 | 3 | 50 | EHA | 25 | PEA | 25 | 1 | 0 | 1.04 | 0.33 | 0.15 | 3.15 | 6.80 | −109.2 |
| 9 | 3 | 60 | EHA | 40 | n/a | 0 | 1 | 0 | 1.29 | 0.43 | 0.20 | 2.99 | 6.40 | −113.0 |
| 10 | 4 | 50 | EHA | 25 | PEA | 25 | 1 | 0 | 1.26 | 0.40 | 0.19 | 3.11 | 6.70 | −110.2 |
| 11 | 4 | 60 | EHA | 40 | n/a | 0 | 1 | 0 | 1.69 | 0.57 | 0.27 | 2.99 | 6.40 | −113.0 |
| 12 | 4 | 70 | EHA | 15 | PEA | 15 | 1 | 0 | 6.94 | 1.81 | 0.74 | 3.83 | 9.40 | −94.8 |
| 13 | 4 | 70 | EHA | 15 | nVC | 15 | 1 | 0 | 6.06 | 1.68 | 0.70 | 3.60 | 8.60 | −98.5 |
| 14 | 4 | 80 | EHA | 20 | n/a | 0 | 1 | 0 | 11.21 | 2.90 | 1.16 | 3.86 | 9.70 | −93.9 |
| 15 | 2 | 60 | EHA | 40 | n/a | 0 | 1 | 5 | 1.60 | 0.51 | 0.26 | 3.11 | 6.20 | −111.7 |
| 16 | 2 | 60 | EHA | 40 | n/a | 0 | 1 | 9 | 6.22 | 1.40 | 0.54 | 4.44 | 11.50 | −86.9 |
| 17 | 3 | 70 | EHA | 15 | PEA | 15 | 1 | 0 | 5.41 | 1.38 | 0.56 | 3.91 | 9.70 | −93.3 |

TABLE 3A-continued

Examples 1-24. Amounts are listed in parts by weight. Viscosity values are reported in pascal seconds (Pa · s); ratios are unitless.

| Example | Oligomer | Oligomer Amount | Monomer 1 | Monomer 1 Amt. | Monomer 2 | Monomer 2 Amt. | TPO | Aerosil | $\eta_{25}$ | $\eta_{55}$ | $\eta_{85}$ | $\frac{\eta_{25}}{\eta_{55}}$ | $\frac{\eta_{25}}{\eta_{85}}$ | Tg, rheo (° C.) |
|---|---|---|---|---|---|---|---|---|---|---|---|---|---|---|
| 18 | 3 | 70 | EHA | 15 | nVC | 15 | 1 | 0 | 4.72 | 1.31 | 0.54 | 3.61 | 8.70 | −98.2 |
| 19 | 3 | 80 | EHA | 20 | n/a | 0 | 1 | 0 | 8.76 | 2.23 | 0.88 | 3.93 | 9.90 | −92.8 |
| 20 | 2 | 70 | EHA | 15 | PEA | 15 | 1 | 0 | 3.89 | 0.97 | 0.39 | 4.00 | 10.10 | −92.0 |
| 21 | 2 | 70 | EHA | 15 | nVC | 15 | 1 | 0 | 3.35 | 0.90 | 0.37 | 3.74 | 9.10 | −96.1 |
| 22 | 2 | 80 | EHA | 20 | n/a | 0 | 1 | 0 | 6.20 | 1.52 | 0.59 | 4.07 | 10.50 | −90.6 |
| 23 | 5 | 70 | EHA | 15 | PEA | 15 | 1 | 0 | 5.68 | 1.27 | 0.47 | 4.46 | 12.10 | −86.1 |
| 24 | 5 | 80 | EHA | 20 | n/a | 0 | 1 | 0 | 9.74 | 2.11 | 0.75 | 4.62 | 13.00 | −83.4 |

TABLE 3B

Examples 25-48. Amounts are listed in parts by weight. Viscosity values are reported in pascal seconds (Pa · s); ratios are unitless.

| Example | Oligomer | Oligomer Amount | Monomer 1 | Monomer 1 Amt. | Monomer 2 | Monomer 2 Amt. | TPO | $\eta_{25}$ | $\eta_{55}$ | $\eta_{85}$ | $\frac{\eta_{25}}{\eta_{55}}$ | $\frac{\eta_{25}}{\eta_{85}}$ | Tg, rheo (° C.) |
|---|---|---|---|---|---|---|---|---|---|---|---|---|---|
| 25 | 6 | 70 | EHA | 30 | n/a | 0 | 1 | 2.47 | 0.64 | 0.26 | 3.84 | 9.41 | −94.5 |
| 26 | 7 | 80 | EHA | 20 | n/a | 0 | 1 | 4.52 | 1.06 | 0.41 | 4.25 | 11.00 | −88.6 |
| 27 | 8 | 80 | EHA | 20 | n/a | 0 | 1 | 2.80 | 0.71 | 0.29 | 3.95 | 9.77 | −92.8 |
| 28 | 9 | 80 | EHA | 20 | n/a | 0 | 1 | 5.15 | 1.1 | 0.39 | 4.67 | 13.10 | −82.0 |
| 29 | 10 | 80 | EHA | 20 | n/a | 0 | 1 | 4.16 | 0.98 | 0.37 | 4.26 | 11.25 | −88.0 |
| 30 | 10 | 70 | EHA | 30 | n/a | 0 | 1 | 1.66 | 0.44 | 0.18 | 3.77 | 9.12 | −95.7 |
| 31 | 10 | 70 | EHA | 15 | EPEA | 15 | 1 | 2.75 | 0.66 | 0.26 | 4.15 | 10.61 | −89.9 |
| 32 | 10 | 70 | EOEOA | 30 | n/a | 0 | 1 | 1.84 | 0.51 | 0.21 | 3.62 | 8.67 | −98.3 |
| 33 | 10 | 70 | EHA | 15 | LA | 15 | 1 | 1.95 | 0.5 | 0.20 | 3.89 | 9.74 | −93.5 |
| 34 | 10 | 70 | EHA | 15 | 4-HBA | 15 | 1 | 2.22 | 0.57 | 0.23 | 3.86 | 9.57 | −94.1 |
| 35 | 10 | 70 | EHA | 15 | IBOA | 15 | 1 | 2.46 | 0.59 | 0.23 | 4.14 | 10.61 | −89.9 |
| 36 | 10 | 70 | nVP | 30 | n/a | 0 | 1 | 1.77 | 0.51 | 0.22 | 3.46 | 7.93 | −101.9 |
| 37 | 10 | 70 | DMAA | 30 | n/a | 0 | 1 | 1.00 | 0.33 | 0.16 | 3.02 | 6.31 | −112.8 |
| 38 | 10 | 70 | EHA | 15 | M100 | 15 | 1 | 3.41 | 0.79 | 0.30 | 4.30 | 11.54 | −87.2 |
| 39 | 10 | 70 | EOEOA | 25 | nVP | 5 | 1 | 1.80 | 0.51 | 0.22 | 3.52 | 8.30 | −100.2 |
| 40 | 10 | 70 | EOEOA | 25 | nVC | 5 | 1 | 1.99 | 0.55 | 0.23 | 3.63 | 8.72 | −98.1 |
| 41 | 2 | 80 | EOEOA | 20 | n/a | 0 | 1 | 6.78 | 1.71 | 0.67 | 3.96 | 10.14 | −92.2 |
| 42 | 2 | 70 | EOEOA | 15 | ENPA | 15 | 1 | 5.63 | 1.35 | 0.52 | 4.16 | 10.91 | −89.3 |
| 43 | 2 | 70 | EOEOA | 25 | nVC | 5 | 1 | 3.10 | 0.88 | 0.37 | 3.53 | 8.37 | −99.9 |
| 44 | 2 | 70 | EOEOA | 15 | M100 | 15 | 1 | 5.76 | 1.4 | 0.54 | 4.11 | 10.71 | −90.0 |
| 45 | 3 | 70 | EOEOA | 15 | ENPA | 15 | 1 | 7.83 | 1.92 | 0.74 | 4.07 | 10.51 | −90.7 |
| 46 | 4 | 70 | EOEOA | 15 | ENPA | 15 | 1 | 10.09 | 2.51 | 0.98 | 4.02 | 10.31 | −91.4 |
| 47 | 10 | 70 | EHA | 15 | IDA | 15 | 1 | 1.86 | 0.49 | 0.20 | 3.81 | 9.38 | −94.9 |
| 48 | 11 | 80 | EHA | 20 | n/a | 0 | 1 | 5.54 | 1.27 | 0.47 | 4.36 | 11.78 | −86.6 |

TABLE 3C

Examples 49-50. Amounts are listed in parts by weight. Viscosity values are reported in pascal seconds (Pa · s); ratios are unitless.

| Example | Oligomer | Oligomer Amount | Monomer 1 | Monomer 1 Amt. | Monomer 2 | Monomer 2 Amt. | Monomer 3-TPGDA | TPO | $\eta_{25}$ | $\eta_{55}$ | $\eta_{85}$ | $\frac{\eta_{25}}{\eta_{55}}$ | $\frac{\eta_{25}}{\eta_{85}}$ | Tg, rheo (° C.) |
|---|---|---|---|---|---|---|---|---|---|---|---|---|---|---|
| 49 | 12 | 80 | EHA | 20 | n/a | 0 | 0 | 1 | 15.10 | 3.40 | 1.26 | 4.44 | 11.97 | −86.0 |
| 50 | 10 | 70 | EOEOA | 25 | nVC | 5 | 3 | 1 | 1.69 | 0.43 | 0.18 | 3.93 | 9.53 | −93.5 |

TABLE 4

The viscosity v. temperature sensitivity of Comparative Examples 1-6. Viscosity values are reported in pascal seconds (Pa · s). Ratios are unitless.

| Example | Oligomer 1 | Oligomer 2 | Oligomer 3 | Oligomer 4 | EHA | PEA | nVC | ENPA | TPO | $\eta_{25}$ | $\eta_{55}$ | $\eta_{85}$ | $\frac{\eta_{25}}{\eta_{55}}$ | $\frac{\eta_{25}}{\eta_{85}}$ | Tg, rheo (° C.) |
|---|---|---|---|---|---|---|---|---|---|---|---|---|---|---|---|
| C.1 | 70 | 0 | 0 | 0 | 0 | 30 | 0 | 0 | 0 | 3.73 | 0.55 | 0.16 | 6.77 | 22.9 | −67.9 |
| C.2 | 70 | 0 | 0 | 0 | 0 | 0 | 0 | 30 | 0 | 7.09 | 0.94 | 0.25 | 7.58 | 28.9 | −62.5 |
| C.3 | 50 | 0 | 0 | 0 | 0 | 0 | 0 | 50 | 0 | 3.08 | 0.44 | 0.13 | 7.00 | 24.6 | −66.1 |
| C.4 | DSM Desolite ® DP-1020; commercially available primary coating | | | | | | | | | 8.17 | 1.53 | 0.50 | 5.34 | 16.2 | −77.1 |
| C.5 | DSM Desolite ® DP-1078; commercially available primary coating | | | | | | | | | 7.44 | 1.19 | 0.36 | 6.25 | 20.8 | −69.4 |
| C.6 | KF6238; commercially available primary coating from JSR Corp. | | | | | | | | | 5.53 | 1.11 | 0.38 | 4.98 | 14.6 | −79.7 |

Film Preparation of Examples 40, 45, 47, and Examples 51-53

Next, further samples were prepared for evaluation of several mechanical properties which are understood to be relevant to a primary coating's performance for use in fiber optic coating applications. To screen for ideal candidates for further testing, a real-time dynamic mechanical analysis during cure (RT-DMA) was performed upon each of examples 1-50 described above. RT-DMA methods are known, and are described in P. A. M. Steeman et al., Macromolecules 2004, 37, p. 7001-7007. Three of the several coatings which exhibited film modulus values indicative of a suitable range for potential optical fiber primary coating application (such as those having a shear modulus on the order of 0.1 to 0.3 MPa)—namely the compositions of examples 40, 45, and 47 were selected as the basis for further mechanical property testing via dynamic mechanical analysis (DMA), according to the methods described below. In order to perform such evaluations, cured films were prepared from the compositions of Examples 40, 45, and 47 in accordance with the sample preparation methodology described below. Furthermore, three additional samples (Examples 51-53) similar to the compositions of 40, 45, and 47, respectively, were prepared, but for the addition of varying amounts of another difunctional reactive diluent monomer (TPGDA). The full composition of each example selected for further analysis is described below in Table 5. The results of the mechanical property testing, including the DMTA recorded values for tensile modulus E'23, the uniaxial tensile testing recorded values for strain hardening parameter α, and the strain energy release rate ($G_0$) are depicted in Table 6 below.

TABLE 5

Amounts listed are in parts per weight.

| Example | Oligomer Used | Oligomer Amount | Monomer 1 Used | Monomer 1 Amount | Monomer 2 Used | Monomer 2 Amount | Monomer 3- TPGDA | TPO |
|---|---|---|---|---|---|---|---|---|
| 40 | 10 | 70 | EOEOA | 25 | nVC | 5 | 0 | 1 |
| 51 | 10 | 70 | EOEOA | 25 | nVC | 5 | 1 | 1 |
| 45 | 3 | 70 | EOEOA | 15 | ENPA | 15 | 0 | 1 |
| 52 | 3 | 70 | EOEOA | 15 | ENPA | 15 | 3 | 1 |
| 47 | 10 | 70 | EHA | 15 | IDA | 15 | 0 | 1 |
| 53 | 10 | 70 | EHA | 15 | IDA | 15 | 3 | 1 |

Dynamic Mechanical Thermal Analysis (DMTA) to Determine Storage Modulus at 23° C.

The tensile modulus was determined via dynamic mechanical analysis. The storage modulus at 23° C. (E'23) of the primary coatings of the present invention was measured by DMTA in tension according to the standard Norm ASTM D5026-95a "Standard Test Method for Measuring the Dynamic Mechanical Properties of Plastics in Tension" under the following conditions which were adapted for the coatings of the present invention. A temperature sweep measurement was carried out under the following test conditions:

Test pieces: Rectangular strips
Length between grips: 25 mm
Width: 1-2 mm
Thickness: about 50-160 micrometers
Equipment Used: Temperature ramp tests were performed on a DMTA machine from TA-instruments type RSA-G2. This machine operated at a frequency of 1 Hz, with an initial strain of 0.15%. The temperature cycling began at −130° C. and was heated until 225° C., with a temperature ramp speed of 5° C. per minute. The following characteristics of auto-tension and auto-strain applied:

Auto-tension:
  Static Force Tracking Dynamic Force
  Initial static Force: 1.0N
  Static>Dynamic Force 25%
Auto-strain:
  Max. Applied Strain: 5%
  Min. Allowed Force: 0.05N
  Max. Allowed Force: 1.3N
  Strain adjustment: 20% (of current strain)

Determination of the dimensions of the test piece: The sample thickness was measured with an electronic Heidenhain thickness measuring device type MT 30B with a resolution of 1 micrometer. The width, meanwhile, was measured with a MITUTOYO microscope with a resolution of 1 micrometer.

In a DMTA measurement, which is a dynamic measurement, the loss tangent (tan δ) and the following moduli were measured: the storage modulus E', the loss modulus E", and the dynamic modulus E* according to the following relation $E^* = (E^{*2} + E^{*2})^{1/2}$. The storage modulus E' at 23° C. in the DMTA curve was taken as the value for E'23. Typically, the accuracy of these measurements is between 5-7%.

The E' at 23° C. values for each sample (expressed as E'23 and reported in units of MPa) tested were then recorded and are reported in Table 6 below.

Stress/Strain Curve from Uniaxial Tensile Test

The primary data source for this test was a force-displacement curve which was measured according to the uniaxial tensile test described in International Standard ISO 37 (third edition 1994-05-15) "Rubber, vulcanized or thermoplastic: Determination of tensile stress-strain properties." The following conditions were applied while using the primary coatings of the present invention:

Test pieces: Dumb-bell piece: type 3.
Length between the grips: 30 mm.
Initial length $l_0$: 9-12 mm.
Thickness: about 120-160 micrometers.
Equipment: The tensile tests were performed on the ZWICK tensile machine type Z010. The force sensor employed was a 10N cell, although if excessive environmental vibrations or other disturbances are expected, a 50N cell might be used as alternative. The elongation, meanwhile, was determined via a video extensometer having a 16 mm lens with a field of view 200 mm and a resolution of 0.001 mm. The clamps used in this setup were screw grips type 8153 (ZWICK item number 313348) with a maximum force of 20N.

In terms of test speed, modulus measurements were taken at 1 mm/min between 0.3-3% strain, and thereafter at 50 mm/min until break.

Then the dimensions of the dumb-bell shaped samples were determined. The thickness of such samples was determined by means of an electronic Heidenhain thickness measuring device type MT 30B with a resolution of 1 micrometer. The width of the samples was created with a punch, with the width of the punch being 4 mm in accordance with ISO37 (type 3). This test was carried out at a temperature of 23±2° C., with a relative humidity of 50±10%.

Five specimens were used for each test. The strain hardening parameter α (discussed below) was then determined from the curve which best represents best the average behavior of the 5 curves. The typical standard deviation of these measurements is 5% of the average.

Measurement of Strain Energy Release Rate or Tear Strength ($G_0$)

The strain energy release rate $G_0$ was measured according to the International Standard norm ISO 816 (second edition 1983-12-01) "Rubber, vulcanized: Determination of tear strength of small test pieces (Delft test pieces)" under the following specific conditions:

Test pieces: in accordance with the ISO 816
Length between grips: 30 mm
Thickness (d): about 120-160 micrometer
Slit length (b): length of initial crack is defined in ISO 816
Equipment: Tests were performed on a digital tensile machine from ZWICK type Z010
Type of clamps: Screw grips type 8153 (Zwick item number 313348) maximum force 20N
Force sensor: preferably a 10N cell, in case of excessive disturbances like e.g. environmental vibrations a 50N cell can be used as alternative
Elongation: Measured with machine displacement with a resolution of 0.001 mm/measured increment
Test speed: 0.1 mm/min
Dimensions of the test piece:
  Thickness (d): measured with an electronic Heidenhain thickness measuring device type MT 30B with a resolution of 1 micrometer.
  Width (B): measured with a MITUTOYO microscope with a resolution of 1 micrometer.
Test temperature: 23±2° C. at a relative humidity of 50±10%.

Again, five specimens were used. The reported $G_o$ value was the average value for these five samples. The typical standard deviation of these results is 15% of the average.

The strain energy release rate $G_0$ is the energy required per 1 m² crack in the above described test specimen of a cured primary coating initially containing a small crack equal to slit length b as defined in ISO 816. $G_0$ is then calculated as follows:

$$Go = \frac{\left(\frac{Fbreak}{BA} \cdot C \cdot \sqrt{\pi \frac{b}{2}}\right)^2}{E} \tag{10}$$

wherein Fbreak is the force at break, b is the slit length, d is the thickness and B the width of the test piece, and E is the segment modulus at a test speed of 0.1 mm/min as calculated from the stresses at elongations of 0.05 and 2% in test method as described in "the determination of the stress/strain curve from a uniaxial tensile test" and wherein C defines the sample geometry as follows:

$$C = \sqrt{\frac{1}{\cos\frac{\pi b}{2B}}} \qquad (11)$$

The $G_0$ values for each sample (reported in units of J/m²) tested were then recorded and are reported in Table 6 below.

Determination of the Mooney Curve

The uniaxial force-displacement curve was measured in accordance with the procedure relating to Stress/Strain Curve from a Uniaxial Tensile Test as described elsewhere herein, above. From this measurement the engineering and Mooney stress was calculated according to formulas (12)-(14) as given in the description below.

A relative Mooney plot was obtained as follows. The primary measurement was the force-displacement curve, measured according to ISO 37 with a speed of 5 mm/min, preferably 50 mm/min, and more preferred 500 mm/min. At higher speed, it is more certain that the effect of the material can be measured, in particular, when the strain hardening behavior sets in only at higher strain. From this measurement, the engineering stress $\sigma_E$ can be calculated according to formula (12):

$$\sigma_E = \frac{F}{A} \qquad (12)$$

where F is the force and A is the initial cross-section of the sample. The strain $\lambda$ is then calculated by formula (13):

$$\lambda = \frac{l}{l_0} \qquad (13)$$

where $l_o$ is the initial length and l the actual length of the prismatic region of the sample under test.

The Mooney stress, $\delta_M$, was then calculated from this engineering stress, further in accordance with the procedure outlined in *Elastomers and Rubber Elasticity*, J. E. Mark and J. Lal, 1982, ACS Symposium Series 193, American Chemical Society Washington D.C., which involves the following formula:

$$\sigma_M = \frac{\sigma_E}{\lambda - \frac{1}{\lambda^2}} \qquad (14)$$

Finally, a so-called Mooney plot can be constructed by plotting $\sigma_M$ versus $1/\lambda$.

In such a plot a strain hardening material shows an increase in the relatively Mooney stress at lower values of $1/\lambda$, i.e. higher elongations. On the contrary, an ideal rubber material does not show this increase in the relatively Mooney stress at lower values of $1/\lambda$ since the engineering stress for an ideal rubber material is given by the formula:

$$\sigma_E = E\left(\lambda - \frac{1}{\lambda^2}\right) \qquad (15)$$

wherein E is the tensile modulus. The Mooney stress $\sigma_M$ of an ideal rubber material is and remains equal to E upon increasing strain $\lambda$. A strain hardening material behaves as a finite extendable spring. It shows linear elastic behavior under an initial, small strain, but develops a limit in its stretching capacity upon further increase of the strain. From that point, a much higher stress is then required to further stretch the material, and thus, for a cavity to develop and grow. In a Mooney plot, this is visible by a rather steep increase in the relative Mooney stress at increasing strain $\lambda$. The amount of strain hardening is an important material behavior for developing cavitation resistant primary optical fiber coatings. Later we introduce a method to determine a parameter to quantify this behavior from the Mooney curve.

In practice rubbers often show strain softening at low elongations, which is in the case of a strain hardening rubber followed by hardening at high elongations. Therefore, the Mooney plot typically shows a minimum in the Mooney curve at intermediate strains. This has in literature for instance been described in the paper by S. F. Edwards and Th. Vilgis (Polymer (1986) Vol 27, April, p 483-492, FIGS. 4 and 5). The part of the curve at elongations beyond the minimum of the Mooney curve (i.e. values of $1/\lambda$ smaller than $1/\lambda_{min}$ at the minimum of the Mooney curve) will be used for determining the so-called stain hardening parameter $\alpha$.

Determination of the Edwards-Vilgis Strain Hardening Parameter Alpha ($\alpha$)

Figure 9:
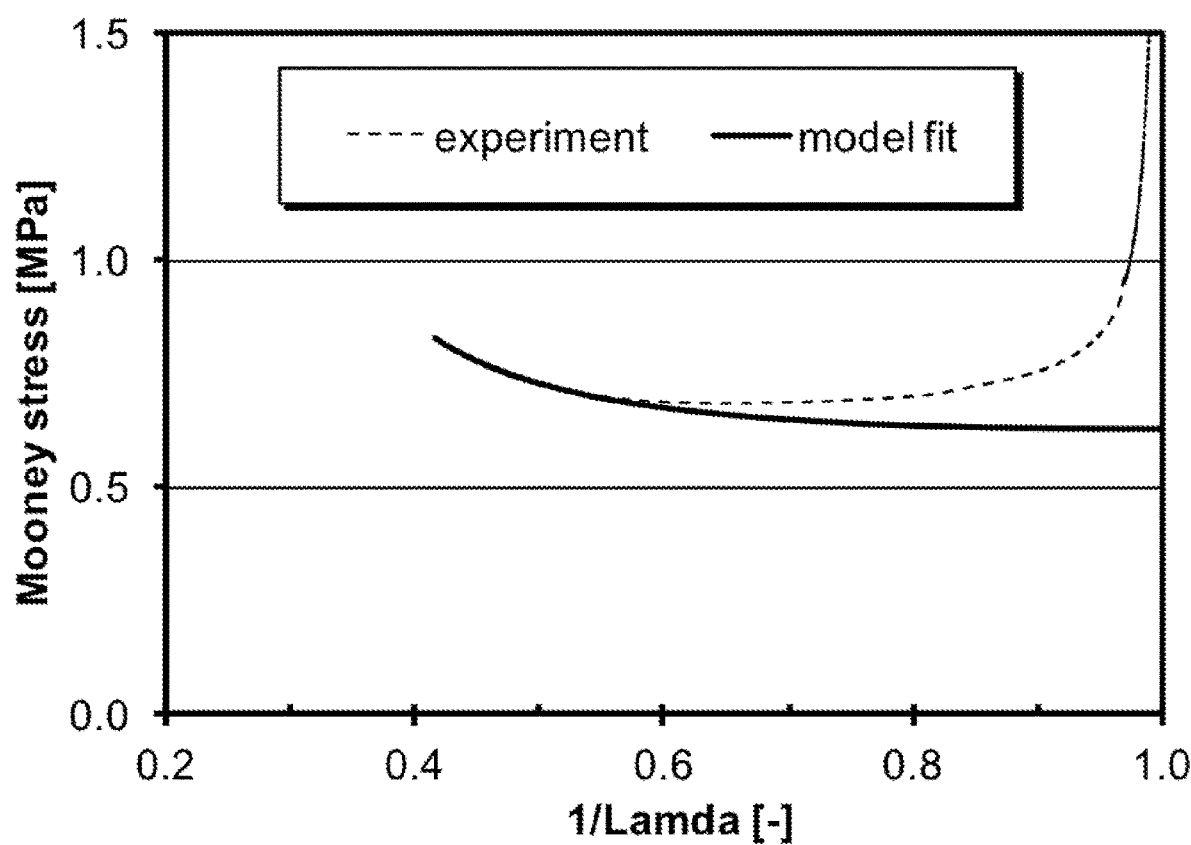
FIG. 9 depicts a least-squares fit of the Edward-Vilgis uniaxial Mooney curve to the Mooney curve from experimental stress/strain data for 1/λ, values less than $1/\lambda_{min}$ for with respect to Example 53.

The Edwards-Vilgis strain hardening parameter of the materials according to the current invention was next determined by fitting the Edwards-Vilgis stress-strain relationship for uniaxial deformation of rubbers to the measured stress-strain behavior. In their paper (S. F. Edwards and Th. Vilgis (Polymer (1986) Vol 27, April, p 483-492 at equations 4.30-4.32), Edwards and Vilgis have introduced a slip-link model for the free energy of deformation of rubbers. The stress-strain behavior in the case of uniaxial deformation ($\lambda_1=\lambda$, $\lambda_2=\lambda_3=1/\sqrt{\lambda}$) can be obtained by taking the derivative of the free energy versus deformation. In order to quantify the strain hardening behavior we use equation 4.31 from the Edwards et al. paper for the contribution of fixed cross-links (assuming the number of cross-links $N_c$ to be non-zero) and ignore the contribution of slip-links from equation 4.30 by setting the number of slip-links $N_s$ to zero. This E-V stress-strain curve is then converted into the corresponding Mooney curve following the procedure described elsewhere herein, above. The parameters $N_c$ and $\alpha$ can be determined from a least-squares fit of the Edward-Vilgis uniaxial Mooney curve to the Mooney curve from the experimental stress strain data, for $1/\lambda$ values less than $1/\lambda_{min}$ (the minimum of the Mooney curve). From this part of the curve, only data points with a Mooney stress larger than 1.01 times the minimum stress are considered. FIG. 9 illustrates such a fit for Example 53 of the current invention. The a values for each sample tested are depicted in Table 6 below.

Sample Preparation of Cured Films

As a substrate for preparing the films, glass plates treated with a fluor silane in order to have good release of the free-standing films for further analysis were used. The glass plates were subjected to a chemical vapor deposition treatment with (heptadeca fluoro-1,1,2,2-tetrahydrodecyl) trimethoxysilane in a vacuum oven at 120° C. for approx. 16 hours. Typically, 0.5-1 g is used for 20 glass plates (size 10 by 15 cm). Free-standing films were then prepared by applying a layer of liquid with a 200 μm doctor blade on these pre-treated glass plates. The coated glass plates were then passed 5 times under a UV-rig (Fusion) equipped with a 395 nm UV-LED source (Heraeus type IRIS X-II) under a nitrogen flow at 10.4 m/min to obtain cured films. The LED-source was configured to a setting of 20% power and 90% PWM (Power Modulation), which resulted in an intensity of 1.2 W/cm$^2$. The total corresponding light dose applied was 2.5 J/cm$^2$. Dose and intensity values were measured with a calibrated EIT PowerPuck® II Profiler by Efsen UV&EB technology (S/N 20298). The PowerPuck Profiler was configured to measure dose and intensity per square cm of surface area over the wavelength interval from 370-410 nm (defined as the UVA2 range according to the specification of the manufacturer).

Next, release of the films from the glass plates was performed by treating the cured films with polyethylene (PE) powder, followed by a slow removal of the film from the glass plate. The PE-powder on the surface of the free-standing films is not believed to have influenced its properties. After preparation, the samples were stored under lab ambient conditions (23±2° C. at a relative humidity of 50±10%) for a maximum of five days.

TABLE 6

Mechanical Testing Results

| Example | E'23 [MPa] | α[−] | G$_0$ [J/m$^2$] |
|---|---|---|---|
| 40 | 0.72 | 0.14 | 33.2 |
| 45 | 0.36 | 0.10 | 34.9 |
| 47 | 0.42 | 0.09 | 28.5 |
| 51 | 0.80 | 0.18 | 34.9 |
| 52 | 0.53 | 0.18 | 51.9 |
| 53 | 0.66 | 0.18 | 37.4 |

Discussion of Results

As can be witnessed from the data in Tables 3A, 3B, 3C, and 4, compositions according to various aspects of the present invention exhibit reduced thermal sensitivity, as determined by the viscosity ratio $$\frac{\eta_{25}}{\eta_{55}} \text{ and } \frac{\eta_{25}}{\eta_{85}}$$

or alternatively via the liquid Tg of the material (Tg, rheo). Although not all examples possess a photoinitiator or commercially-known additives which are common in commercial primary coating compositions for optical fibers, their performance herein illustrates their suitability as at least a precursor composition for use in optical fiber coating applications wherein an increased amount of thermal stress is placed upon the applied coating, as photoinitiators and additives are not expected to significantly affect temperature sensitivity. Such increased thermal stresses could be induced by, for example, line speeds which are increased versus commercially standard values, or via the reduction or elimination of the amount of cooling (via helium flow or otherwise) fluid that is applied to the composition during the coating process.

Figure 4:
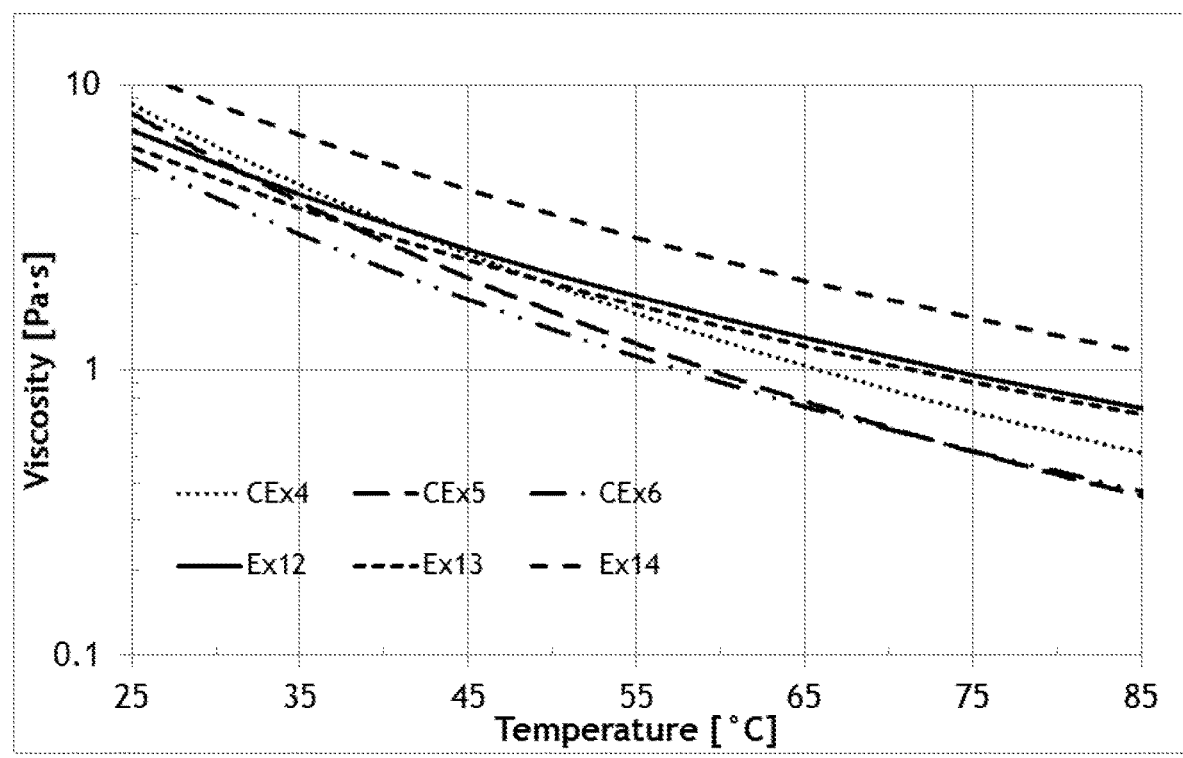
FIG. 4 illustrates the relative improved thermal sensitivity of embodiments of the present invention vs. comparative examples, when each composition's steady-state viscosity is plotted as a function of temperature between 25° C. and 85° C.

The results are further graphically illustrated in FIGS. 4 through 7. Turning to FIG. 4, the performance advantage of at least three compositions according to aspects of the current invention (Examples 12, 13, and 14) is depicted relative to three existing commercial optical fiber commercial coatings, when each composition's viscosity is plotted as a function of temperature between 25° C. and 85° C. Examples 12-14 may be considered superior candidates for use in optical fiber coating processes which induce increased thermal stresses upon the coating, as evidenced by their relatively higher measured viscosity values at an elevated (potentially operating) temperature of 85° C. This is true despite the fact that Examples 12 and 13, at least, exhibit lower initial viscosities (i.e. at 25° C.) than commercial coatings represented by Comparative Examples 4 and 5.

Figure 5:
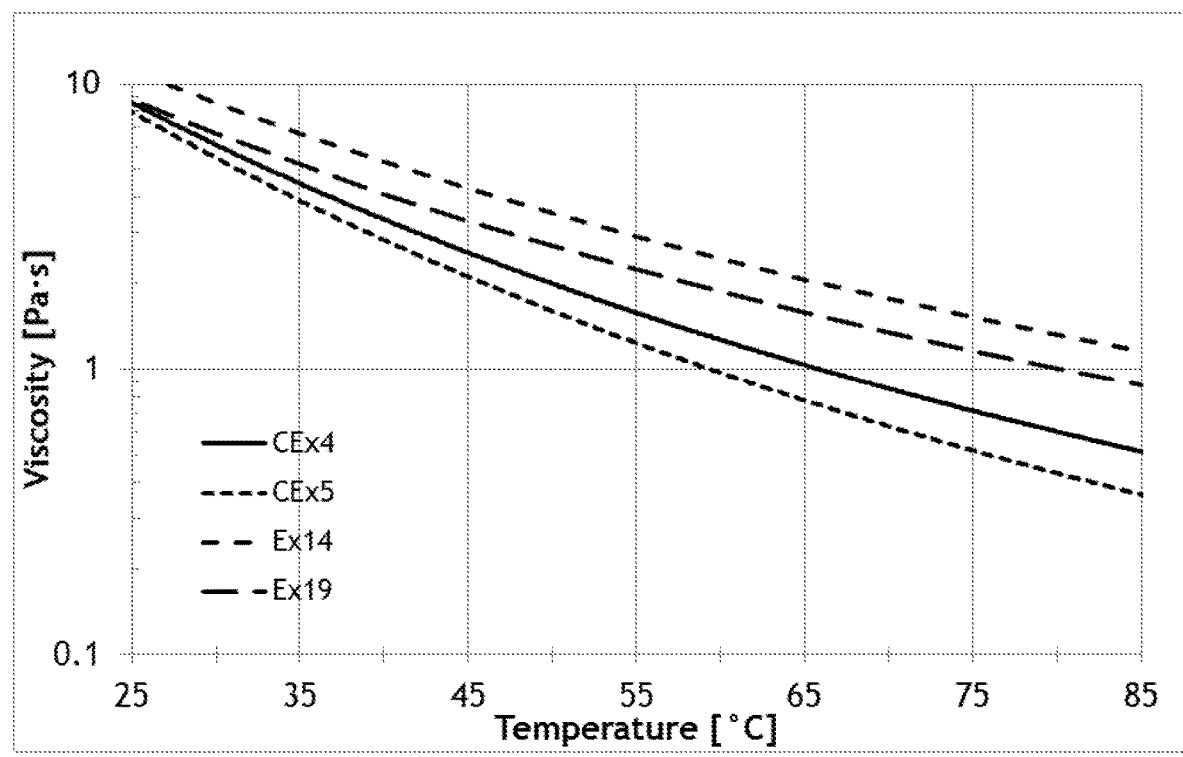
FIG. 5 also illustrates the relative improved thermal sensitivity of further embodiments of the present invention (Examples 14 and 19) vs. comparative examples (Comp. Ex. 4 and 5), when each composition's steady-state viscosity is plotted as a function of temperature between 25° C. and 85° C.

Turning to FIG. 5, a viscosity versus temperature plot is shown which is similar to that in FIG. 3. In this figure, Examples 14 and 19 are depicted to be superior to Comparative Examples 4 and 5 in terms of their relatively reduced temperature sensitivity between the measured range from 25° C. to 85° C. Notably, Example 19 possesses a viscosity at 25° C. which is approximately identical to Comparative Examples 4 and 5, but as it becomes heated, it exhibits a reduced viscosity change versus those commercial coatings.

Figure 6:
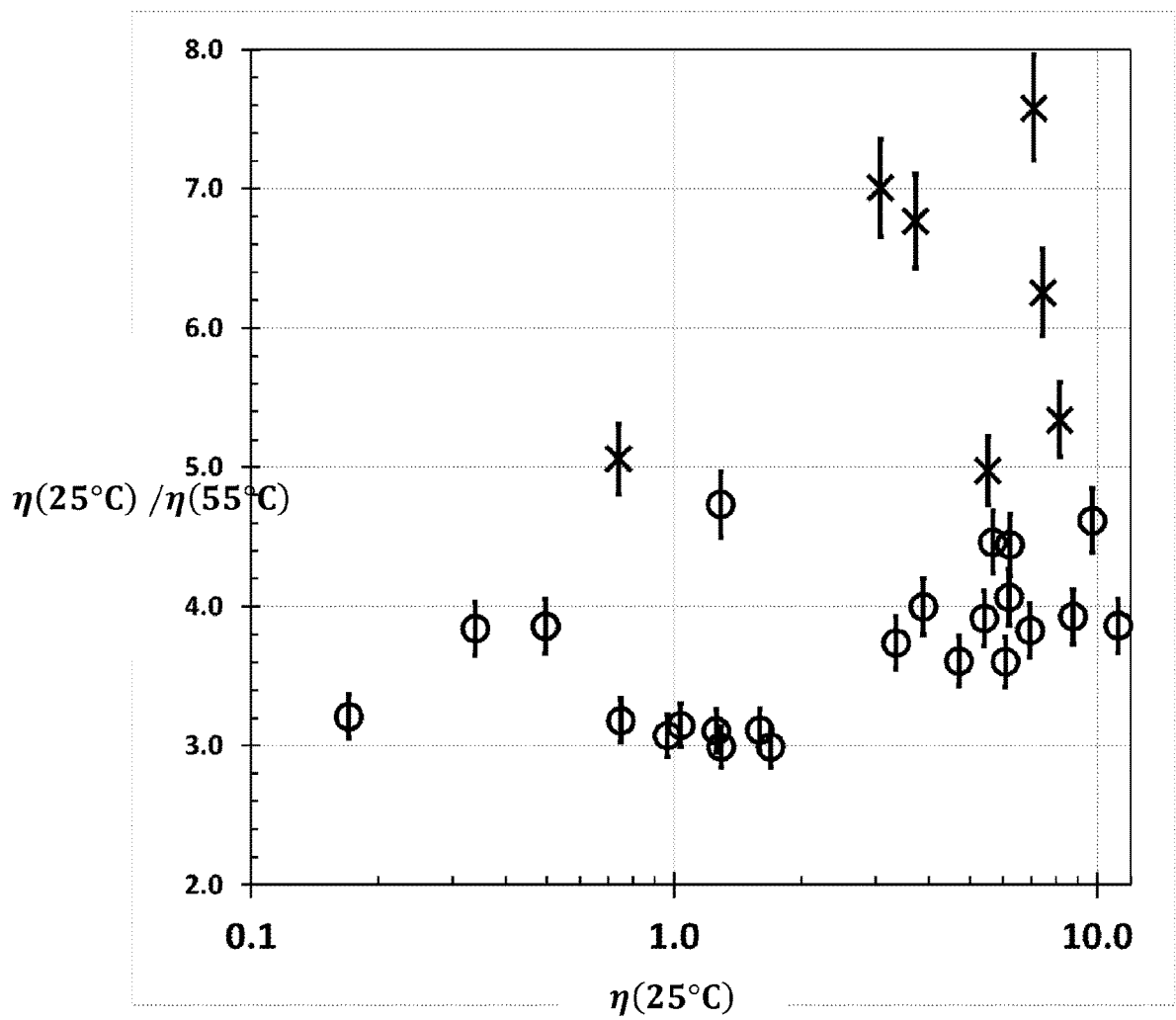
FIG. 6 depicts, for various compositions according to the present invention, as well as various comparative examples, a plot showing each composition's steady-state viscosity at 25° C., as well as each composition's viscosity ratio between 25° C. and 55° C.
Figure 7:
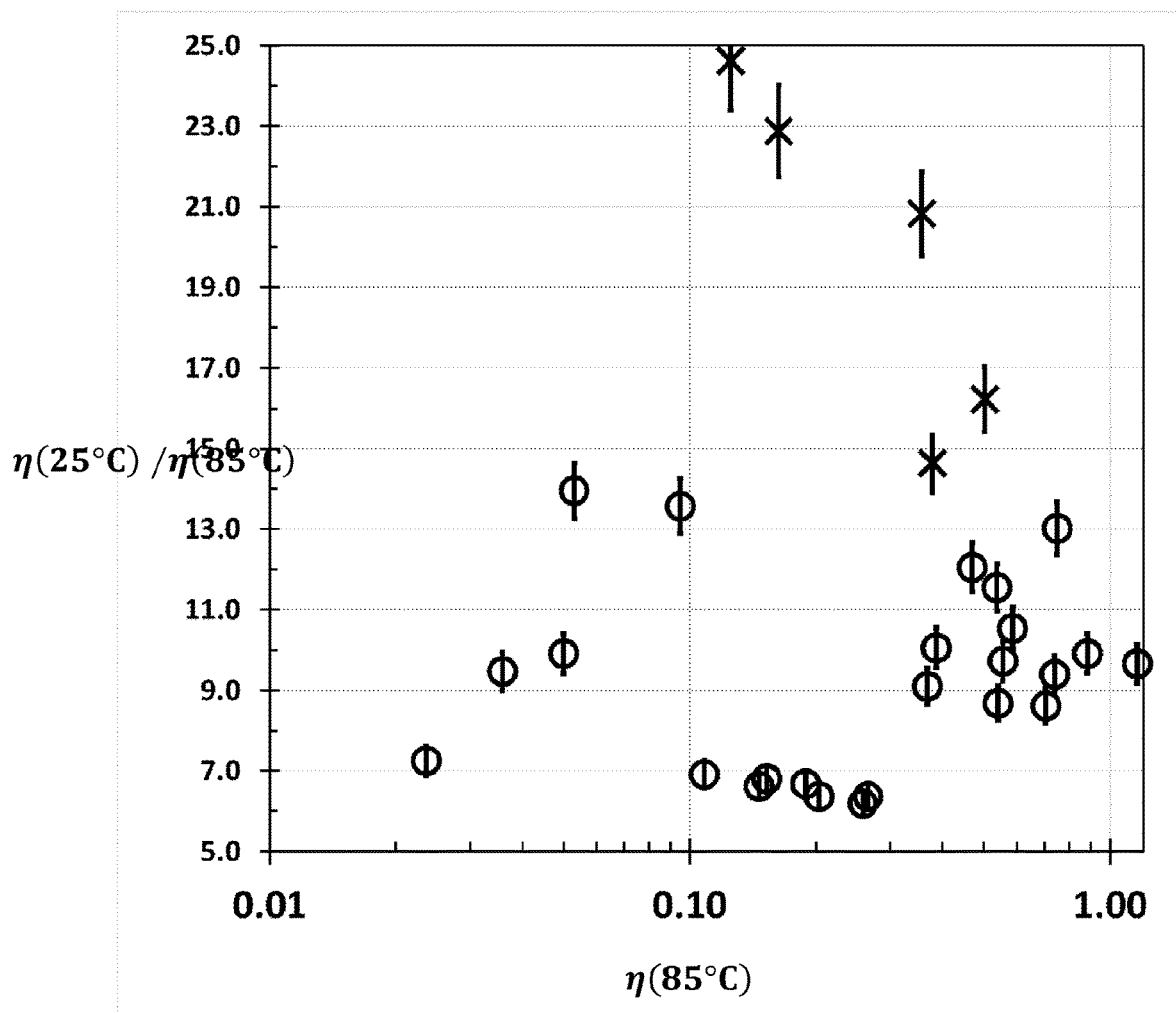
FIG. 7 depicts, for various compositions according to the present invention, as well as various comparative examples, a plot showing each composition's steady-state viscosity at 85° C., as well as each composition's viscosity ratio between 25° C. and 85° C.
Figure 8:
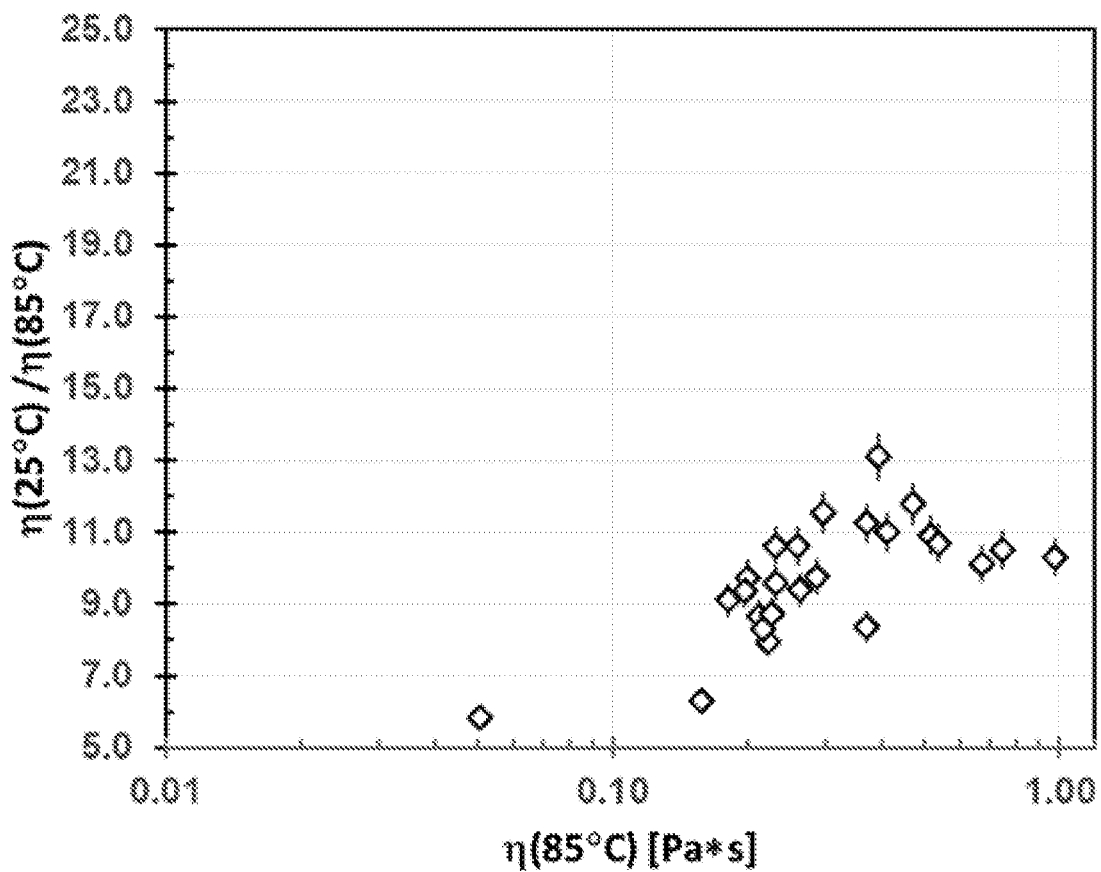
FIG. 8 depicts, for various other compositions according to the present invention a plot showing each composition's steady-state viscosity at 85° C., as well as each composition's viscosity ratio between 25° C. and 85° C.

FIG. 6, and FIG. 7 provide a depiction of, on the x-axis, the steady state shear viscosity (at 25° C. in FIG. 6 and at 85° C. in FIG. 7) of Examples 1-24 versus, on the y-axis, each composition's viscosity ratio (whether between 25° C./55° C. in FIG. 6, or between 25° C./85° C. in FIG. 7). FIG. 8, meanwhile, depicts similar information for a viscosity ratio between 25° C. and 85° C. with respect to Examples 25-50. Higher-performing, less temperature sensitive compositions according to various aspects of the current invention are represented with circular data points (or diamond data points in FIG. 8), wherein lower-performing, more temperature sensitive compositions (i.e. the comparative examples) are represented with data points in the shape of an "X." Vertical bars representing the viscosity ratio error bar are shown for each composition. As can be seen, a number of inventive examples are shown, which span various ranges for viscosity ratio and initial viscosity.

Furthermore, the Examples show that an oligomer may be synthesized via alternative means in order to yields a desirable increase in the compositional viscosity without any appreciable impact upon the liquid glass transition temperature of the composition with which it is associated. This effect is demonstrated most starkly by a comparison of Examples 49 with 26. The composition of Example 49 is similar but for the change in a synthesis method from outside-in (per oligomer 7 used in example 26) to an inside-out method. The results depict an increase in Tg,rheo of only 2.6° C. for a tenfold increase in viscosity (15.10 vs. 1.06 Pa·s).

As demonstrated in Table 6, meanwhile, the inventors have found that the materials according to this invention can also be tuned to have mechanical properties that are advantageous in the application as an optical fiber primary coating. More specifically, the materials according to this invention can be tuned to have a low tensile modulus (preferably less than 1.0 MPa), as is desired for good micro-bending performance, and a high cavitation resistance (i.e. the sensitivity of the coating to cavity formation caused by internal or external stresses as described in U.S. Pat. No. 7,706,659, which is hereby incorporated by reference). U.S. Pat. No. 7,706,659 teaches that cavitation resistant coatings have a strain energy release rate $G_0$ (sometimes also referred to as the tear strength) of at least 20 J/m2 and show strain hardening in the so-called Mooney plot of the stress-strain behavior.

Specifically, it can be seen from the results in Table 6 that Examples 40, 45, and 47 combine a tensile modulus less than 1.0 MPa with a strain energy release rate $G_0$ larger than 20 J/m² and an acceptable strain hardening value ($\alpha$>0.08). On this basis, according to, e.g., U.S. Pat. No. 7,706,659, such formulations are expected therefore to also provide good resistance to cavitation as well. With minor formulation changes, Examples 51-53 also exhibit sufficiently low tensile modulus values combined with significant improvements in strain hardening ($\alpha$>0.16) and an increase in $G_0$. Such examples are therefore expected to yield optical fiber primary coatings with yet further cavitation resistance.

Additional Exemplary Embodiments

A first aspect of a first additional exemplary embodiment of the invention is a coated optical fiber, comprising:
an optical fiber portion, said optical fiber portion further comprising
a glass core, and
a cladding layer in contact with and surrounding said glass core; and
a coating portion, said coating portion further comprising
a primary coating layer in contact with and surrounding said cladding layer; and
a secondary coating layer in contact with and surrounding said primary coating layer;
wherein said primary coating layer is a cured product of
a radiation curable composition comprising
a urethane acrylate oligomer which is a product of reactants, said reactants comprising an isocyanate, a polyol, and an acrylate monomer;
a reactive diluent monomer; and
a free-radical photoinitiator;
wherein the radiation curable composition possesses a first viscosity at 25° Celsius (C), a second viscosity at 55° C., and a third viscosity at 85° C., wherein the radiation curable composition is a liquid at each of the first viscosity, the second viscosity, and the third viscosity, and wherein the ratio of the first viscosity to the third viscosity is less than about 15, or less than about 14.4, or less than about 13.9, or less than about 13, or less than about 12, or less than about 11, or less than about 10, or less than about 9, or less than about 7.

An additional aspect of the first additional exemplary embodiment is a coated optical fiber according to the previous aspect, wherein the coated optical fiber possesses a mode-field diameter from 8 to 10 µm at a wavelength of 1310 nm, or a mode-field diameter from 9 to 13 µm at a wavelength of 1550 nm.

An additional aspect of the first additional exemplary embodiment is a coated optical fiber according to either of the previous two aspects, wherein the coated optical fiber is a single-mode fiber and is configured to possess an effective area between 20 and 200 µm².

An additional aspect of the first additional exemplary embodiment is a coated optical fiber according to any of the previous aspects of the first additional exemplary embodiment, wherein the coated optical fiber is a multi-mode fiber and is configured to possess an effective area between 1500 and 3500 µm².

An additional aspect of the first additional exemplary embodiment is a coated optical fiber according to any of the previous aspects of the first additional exemplary embodiment, wherein the ratio of the first viscosity to the third viscosity is less than 15, or less than 14.4, or less than 13.9, or less than 13, or less than 12, or less than 11, or less than 10, or less than 9, or less than 7.

An additional aspect of the first additional exemplary embodiment is a coated optical fiber according to any of the previous aspects of the first additional exemplary embodiment, wherein the ratio of the first viscosity to the third viscosity is from about 5 to about 15, or from about 5 to about 14.4, or from about 5 to about 13.9, or from about 5 to about 13, or from about 5 to about 12, or from about 5 to about 11, or from about 5 to about 10, or from about 5 to about 9, or from about 5 to about 7, or from about 7 to about 15, or from about 7 to about 14.4, or from about 7 to about 13.9, or from about 7 to about 13, or from about 7 to about 12, or from about 7 to about 10, or from about 7 to about 9.

An additional aspect of the first additional exemplary embodiment is a coated optical fiber according to any of the previous aspects of the first additional exemplary embodiment, wherein the ratio of the first viscosity to the third viscosity is from 5 to 15, or from 5 to 14.4, or from 5 to 13.9, or from 5 to 13, or from 5 to 12, or from 5 to 11, or from 5 to 10, or from 5 to 9, or from 5 to 7, or from 7 to 15, or from 7 to 14.4, or from 7 to 13.9, or from 7 to 13, or from 7 to 12, or from 7 to 10, or from 7 to 9.

An additional aspect of the first additional exemplary embodiment is a coated optical fiber according to any of the previous aspects of the first additional exemplary embodiment, wherein the ratio of the first viscosity to the second viscosity is less than about 4.7, or less than about 4.6, or less than about 4.4, or less than about 4.2, or less than about 4.0, or less than about 3.5.

An additional aspect of the first additional exemplary embodiment is a coated optical fiber according to the previous aspect, wherein the ratio of the first viscosity to the second viscosity is from about 2 to about 4.7, or from about 3 to about 4.7, or from about 2 to about 4.6, or from about 3 to about 4.6, or from about 2 to about 4.4, or from about 3 to about 4.4, or from about 2 to about 4.2, or from about 3 to about 4.2, or from about 2 to about 4.0 or from about 3 to about 4.0, or from about 2 to about 3.5, or from about 3 to about 3.5.

An additional aspect of the first additional exemplary embodiment is a coated optical fiber according to the previous aspect, wherein the ratio of the first viscosity to the second viscosity is from 2 to 4.7, or from 3 to 4.7, or from 2 to 4.6, or from 3 to 4.6, or from 2 to 4.4, or from 3 to 4.4, or from 2 to 4.2, or from 3 to 4.2, or from 2 to 4.0 or from 3 to 4.0, or from 2 to 3.5, or from 3 to 3.5.

An additional aspect of the first additional exemplary embodiment is a coated optical fiber according to any of the previous aspects of the first additional exemplary embodiment, wherein the second or third viscosity is greater than 0.01 pascal seconds (Pa·s), or greater than 0.10 Pa·s, or less than 1 Pa·s, or between about 0.01 Pa·s to about 1 Pa·s, or from about 0.03 Pa·s to about 1 Pa·s, or from about 0.03 Pa·s to about 0.8 Pa·s, or from about 0.03 Pa·s to about 0.5 Pa·s, or from about 0.03 Pa·s to about 0.4 Pa·s, or from about 0.05 Pas to about 1 Pa·s, or from about 0.05 Pa·s to about 0.5 Pa·s, or from about 0.1 Pa·s to about 1 Pa·s, or from about 0.1 Pa·s to about 0.8 Pa·s.

An additional aspect of the first additional exemplary embodiment is a coated optical fiber according to the previous aspect, wherein the third viscosity is greater than 0.01 pascal seconds (Pa·s), or greater than 0.10 Pa·s, or less than 1 Pa·s, or between about 0.01 Pa·s to about 1 Pa·s, or from about 0.03 Pas to about 1 Pa·s, or from about 0.03 Pa·s to about 0.8 Pa·s, or from about 0.03 Pas to about 0.5 Pa·s, or from about 0.03 Pas to about 0.4 Pa·s, or from about 0.05 Pa·s to about 1 Pa·s, or from about 0.05 Pa·s to about 0.5 Pa·s, or from about 0.1 Pa·s to about 1 Pa·s, or from about 0.1 Pa·s to about 0.8 Pa·s.

An additional aspect of the first additional exemplary embodiment is a coated optical fiber according to the previous aspect, wherein the first viscosity is between 0.1 to 20 Pa·s, or from 0.5 to 15 Pa·s, or from 1 to 10 Pa·s, the second viscosity is between 0.03 to 6 Pa·s, or from 0.05 to 5 Pa·s, or from 0.1 to 3 Pa·s, and the third viscosity is between 0.01 to 2 Pa·s, or from 0.03 to 1.5 Pa·s, or from 0.05 to 1 Pa·s.

An additional aspect of the first additional exemplary embodiment is the coated optical fiber according to any of the previous aspects of the first additional exemplary embodiment, wherein the primary coating layer possesses an in-situ modulus of less than 2.0 MPa, or less than 1.5 MPa, or less than 1.4 MPa, or less than 1.3 MPa, or less than 1.2 MPa, or less than 1.0 MPa, or less than 0.8 MPa, or less than 0.6 MPa, or less than 0.5 MPa, or less than 0.4 MPa, or less than 0.3 MPa, to greater than 0.01 MPa, or greater than 0.1 MPa, or greater than 0.5 MPa.

An additional aspect of the first additional exemplary embodiment is the coated optical fiber according to any of the previous aspects of the first additional exemplary embodiment, wherein the urethane acrylate oligomer is present by weight, relative to the total weight of the radiation curable composition, from about 40 to about 90 wt. %, or from about 50 to about 70 wt. %, or from 45-90 wt. %, or from 45-70 wt. %.

An additional aspect of the first additional exemplary embodiment is the coated optical fiber according to any of the previous aspects of the first additional exemplary embodiment, wherein the polyol comprises a polypropylene glycol.

An additional aspect of the first additional exemplary embodiment is a coated optical fiber according to the previous aspect, wherein the polyol possesses a number average molecular weight, as measured by size exclusion chromatography using a polystyrene standard in THF from 3000 to 10000, or from 3000 to 8000, or from 4000 to 10000, or from 4000 to 8000.

An additional aspect of the first additional exemplary embodiment is the coated optical fiber according to any of the previous aspects of the first additional exemplary embodiment, wherein the polyol possesses a hydroxyl equivalent molecular weight of at least about 1500 g/mol, or at least about 2000 g/mol, or at least about 3000 g/mol, or from 1500 g/mol to 5000 g/mol, or from 2000 g/mol to 4500 g/mol.

An additional aspect of the first additional exemplary embodiment is the coated optical fiber according to any of the previous aspects of the first additional exemplary embodiment, wherein the isocyanate comprises isophorone diisocyanate, 2,2,4-trimethylhexamethylene diisocyanate, 2,4,4 trimethylhexamethylene diisocyanate and hexamethylene diisocyanate, 2,4-tolylene diisocyanate, and 2,6-tolylene diisocyanate An additional aspect of the first additional exemplary embodiment is a coated optical fiber according to the previous aspect, wherein the isocyanate comprises a mixture of 2,4-toluene-di-isocyanate and 2,6-toluene-di-isocyanate.

An additional aspect of the first additional exemplary embodiment is a coated optical fiber according to the previous aspect, wherein the ratio, by weight, of the 2,4-toluene-di-isocyanate to the 2,6-toluene-di-isocyanate is from 1:1 to 100:1, or from 30:1 to 60:1, or from 40:1 to 50:1.

An additional aspect of the first additional exemplary embodiment is the coated optical fiber according to any of the previous aspects of the first additional exemplary embodiment, wherein the isocyanate consists of an isophorone diisocyanate.

An additional aspect of the first additional exemplary embodiment is the coated optical fiber according to any of the previous aspects of the first additional exemplary embodiment, wherein the isocyanate consists essentially of an isophorone diisocyanate, an hexamethylene diisocyanate, or trimethyl-1,6-diisocyanatohexane.

An additional aspect of the first additional exemplary embodiment is the coated optical fiber according to any of the previous aspects of the first additional exemplary embodiment, wherein the acrylate monomer comprises methyl acrylate, ethyl acrylate, butyl acrylate, 2-ethylhexylacrylate, 2-phenoxy ethyl acrylate, 2-hydroxyethyl acrylate, lauryl acrylate, or isobornyl acrylate.

An additional aspect of the first additional exemplary embodiment is the coated optical fiber according to any of the previous aspects of the first additional exemplary embodiment, wherein the urethane acrylate oligomer comprises a block copolymer.

An additional aspect of the first additional exemplary embodiment is a coated optical fiber according to the previous aspect, wherein the urethane acrylate oligomer consists of block copolymer(s).

An additional aspect of the first additional exemplary embodiment is a coated optical fiber according to either of the previous two aspects, wherein the block copolymer comprises a monoblock copolymer, a diblock copolymer, or a triblock copolymer.

An additional aspect of the first additional exemplary embodiment is a coated optical fiber according to the previous aspect, wherein the urethane acrylate oligomer consists essentially of block copolymer(s), wherein the block copolymer(s) comprise a monoblock, diblock, or triblock structure.

An additional aspect of the first additional exemplary embodiment is the coated optical fiber according to any of the previous aspects of the first additional exemplary embodiment, wherein the urethane acrylate oligomer comprises a block copolymer consisting of a monoblock structure.

An additional aspect of the first additional exemplary embodiment is the coated optical fiber according to any of the four previous aspects of the first additional exemplary embodiment, wherein the block copolymer comprises polyether blocks.

An additional aspect of the first additional exemplary embodiment is the coated optical fiber according to any of the five previous aspects of the first additional exemplary embodiment, wherein the urethane acrylate oligomer comprises an average from 0.9 to 3.5 polyether blocks, or between 0.9 and 1.5 polyether blocks, or between 1.5 and 2.5 polyether blocks, or between 2.5 and 3.5 polyether blocks.

An additional aspect of the first additional exemplary embodiment is the coated optical fiber according to any of the previous aspects of the first additional exemplary embodiment, wherein the urethane acrylate oligomer comprises a block copolymer consisting of a diblock structure.

An additional aspect of the first additional exemplary embodiment is the coated optical fiber according to any of the previous aspects of the first additional exemplary embodiment, wherein the urethane acrylate oligomer comprises a block copolymer consisting of a triblock structure.

An additional aspect of the first additional exemplary embodiment is the coated optical fiber according to any of the previous aspects of the first additional exemplary embodiment, wherein the urethane acrylate oligomer comprises a block copolymer consisting essentially of a mono-block structure.

An additional aspect of the first additional exemplary embodiment is the coated optical fiber according to any of the previous aspects of the first additional exemplary embodiment, wherein the urethane acrylate oligomer comprises a block copolymer consisting essentially of a diblock structure.

An additional aspect of the first additional exemplary embodiment is the coated optical fiber according to any of the previous aspects of the first additional exemplary embodiment, wherein the urethane acrylate oligomer comprises a block copolymer consisting essentially of a triblock structure.

An additional aspect of the first additional exemplary embodiment is the coated optical fiber according to any of the previous aspects of the first additional exemplary embodiment, wherein the urethane acrylate oligomer is formed in a process that utilizes a catalyst.

An additional aspect of the first additional exemplary embodiment is the coated optical fiber according to any of the previous aspects of the first additional exemplary embodiment, wherein the catalyst comprises dibutyltin dilaurate or an organobismuth compound.

An additional aspect of the first additional exemplary embodiment is the coated optical fiber according to any of the previous aspects of the first additional exemplary embodiment, wherein the catalyst consists of dibutyltin dilaurate or an organobismuth compound.

An additional aspect of the first additional exemplary embodiment is the coated optical fiber according to any of the previous aspects of the first additional exemplary embodiment, wherein the catalyst consists essentially of dibutyltin dilaurate or organobismuth compounds.

An additional aspect of the first additional exemplary embodiment is the coated optical fiber according to any of the previous aspects of the first additional exemplary embodiment, wherein the catalyst is present, relative to the amount of the entire radiation curable composition, from 0.001 to 1 wt. %, or from 0.01 to 1 wt. %, or from 0.05 to 1 wt. %, or from 0.001 to 0.1 wt. %, or from 0.01 to 0.1 wt. %, or from 0.05 to 0.1 wt. %.

An additional aspect of the first additional exemplary embodiment is the coated optical fiber according to any of the previous aspects of the first additional exemplary embodiment, wherein the urethane acrylate oligomer is formed in a process that utilizes an inhibitor.

An additional aspect of the first additional exemplary embodiment is the coated optical fiber according to any of the previous aspects of the first additional exemplary embodiment, wherein the inhibitor comprises butylated hydroxytoluene.

An additional aspect of the first additional exemplary embodiment is a coated optical fiber according to the previous aspect, wherein the butylated hydroxytoluene is food-grade.

An additional aspect of the first additional exemplary embodiment is the coated optical fiber according to any of the previous aspects of the first additional exemplary embodiment, wherein the inhibitor consists of butylated hydroxytoluene.

An additional aspect of the first additional exemplary embodiment is the coated optical fiber according to any of the previous aspects of the first additional exemplary embodiment, wherein the inhibitor consists essentially of butylated hydroxytoluene.

An additional aspect of the first additional exemplary embodiment is the coated optical fiber according to any of the previous aspects of the first additional exemplary embodiment, wherein the inhibitor is present, relative to the amount of the entire radiation curable composition, from 0.001 to 1 wt. %, or from 0.01 to 1 wt. %, or from 0.05 to 1 wt. %, or from 0.001 to 0.1 wt. %, or from 0.01 to 0.1 wt. %, or from 0.05 to 0.1 wt. %.

An additional aspect of the first additional exemplary embodiment is the coated optical fiber according to any of the previous aspects of the first additional exemplary embodiment, wherein the isocyanate is present by weight, relative to the total weight of the urethane acrylate oligomer, from 1 wt. % to 20 wt. %, or from 1 wt. % to 15 wt. %, or from 1 wt. % to 10 wt. %, or from 1 wt. % to 8 wt. %, or from 1 wt. % to 6 wt. %, or from 2 wt. % to 20 wt. %, or from 2 wt. % to 15 wt. %, or from 2 wt. % to 10 wt. %, or from 2 wt. % to 8 wt. %, or from 2 wt. % to 6 wt. %, or from 3.6 wt. % to 20 wt. %, or from 3.6 wt. % to 15 wt. %, or from 3.6 wt. % to 10 wt. %, or from 3.6 wt. % to 8 wt. %, or from 3.6 wt. % to 6 wt. %.

An additional aspect of the first additional exemplary embodiment is the coated optical fiber according to any of the previous aspects of the first additional exemplary embodiment, wherein the polyol is present by weight, relative to the total weight of the urethane acrylate oligomer, from 80 wt. % to 99 wt. %, or from 80 wt. % to 97 wt. %, or from 80 wt. % to 96 wt. %, or from 80 wt. % to 95.36 wt. %, or from 85 wt. % to 99 wt. %, or from 85 wt. % to 97 wt. %, or from 85 wt. % to 96 wt. %, or from 85 wt. % to 95.36 wt. %, or from 91.22 wt. % to 99 wt. %, or from 91.22 wt. % to 97 wt. %, or from 91.22 wt. % to 96 wt. %, or from 91.22 wt. % to 95.36 wt. %.

An additional aspect of the first additional exemplary embodiment is the coated optical fiber according to any of the previous aspects of the first additional exemplary embodiment, wherein the acrylate monomer is present by weight, relative to the total weight of the urethane acrylate oligomer, from 0.3 wt. % to 15 wt. %, or from 0.3 wt. % to 10 wt. %, or from 0.3 wt. % to 5 wt. %, or from 0.3 wt. % to 3 wt. %, or from 0.3 wt. % to 2.72 wt. %, or from 0.75 wt. % to 15 wt. %, or from 0.75 wt. % to 10 wt. %, or from 0.75 wt. % to 5 wt. %, or from 0.75 wt. % to 3 wt. %, or from 0.75 wt. % to 2.72 wt. %, or from 1 wt. % to 15 wt. %, or from 1 wt. % to 10 wt. %, or from 1 wt. % to 5 wt. %, or from 1 wt. % to 3 wt. %, or from 1 wt. % to 2.72 wt. %.

An additional aspect of the first additional exemplary embodiment is the coated optical fiber according to any of the previous aspects of the first additional exemplary embodiment, wherein the molar ratio of the polyol to the isocyanate is from 1:4 to 1:1, or from 1:2 to 3:4.

An additional aspect of the first additional exemplary embodiment is the coated optical fiber according to any of the previous aspects of the first additional exemplary embodiment, wherein the molar ratio of the polyol to the acrylate monomer is from 1:1 to 5:1, or from 1:1 to 4:1, or from 1:1 to 3:1.

An additional aspect of the first additional exemplary embodiment is the coated optical fiber according to any of the previous aspects of the first additional exemplary embodiment, wherein the molar ratio of the isocyanate to the acrylate monomer is from 1:1 to 5:1, or from 1:1 to 4:1, or from 1:1 to 3:1.

An additional aspect of the first additional exemplary embodiment is the coated optical fiber according to any of the previous aspects of the first additional exemplary embodiment, wherein the number average molecular weight of the urethane acrylate oligomer is greater than about 8,000 g/mol, or greater than about 10,000 g/mol, or greater than about 15,000 g/mol, or greater than 20,000 g/mol, or greater than 25,000 g/mol.

An additional aspect of the first additional exemplary embodiment is the coated optical fiber according to any of the previous aspects of the first additional exemplary embodiment, wherein the number average molecular weight of the urethane acrylate oligomer is from about 8,000 to about 30,000 g/mol, or from about 8,000 to about 25,000 g/mol, or from about 8,000 to about 20,000 g/mol, or from about 10,000 to about 30,000 g/mol, or from about 10,000 to about 25,000 g/mol, or from about 10,000 to about 20,000 g/mol, or from about 15,000 to about 30,000 g/mol, or from about 15,000 to about 25,000 g/mol, or from about 15,000 to about 20,000 g/mol.

An additional aspect of the first additional exemplary embodiment is the coated optical fiber according to any of the previous aspects of the first additional exemplary embodiment, wherein the reactive diluent monomer comprises a number average from 0.5 to 1.5 polymerizable groups.

An additional aspect of the first additional exemplary embodiment is the coated optical fiber according to any of the previous aspects of the first additional exemplary embodiment, wherein the reactive diluent monomer consists of monofunctional compound(s).

An additional aspect of the first additional exemplary embodiment is the coated optical fiber according to any of the previous aspects of the first additional exemplary embodiment, wherein the reactive diluent monomer comprises an alkyl acrylate with an alkyl chain comprising at least 1 carbon atom, or at least 2 carbon atoms, or at least 8 carbon atoms, or a $C_8$-$C_{24}$, or a $C_8$-$C_{16}$ alkyl chain.

An additional aspect of the first additional exemplary embodiment is the coated optical fiber according to the previous embodiment, wherein the alkyl acrylate possesses comprises isodecyl acrylate.

An additional aspect of the first additional exemplary embodiment is the coated optical fiber according to any of the previous aspects of the first additional exemplary embodiment, wherein the reactive diluent monomer comprises methyl acrylate, ethyl acrylate, butyl acrylate, 2-ethylhexyl acrylate, 2-hydroxyethyl acrylate, or isobornyl acrylate.

An additional aspect of the first additional exemplary embodiment is the coated optical fiber according to any of the previous aspects of the first additional exemplary embodiment, wherein the reactive diluent monomer comprises ethyl-hexyl acrylate, phenoxy-ethyl acrylate, N-vinyl caprolactam, 2-ethylhexylacrylate, or 2-phenoxyethyl acrylate.

An additional aspect of the first additional exemplary embodiment is the coated optical fiber according to any of the previous aspects of the first additional exemplary embodiment, wherein the reactive diluent monomer consists essentially of ethyl-hexyl acrylate, or phenoxy-ethyl acrylate, or N-vinyl caprolactam.

An additional aspect of the first additional exemplary embodiment is the coated optical fiber according to any of the previous aspects of the first additional exemplary embodiment, wherein the acrylate monomer comprises ethylhexyl acrylate, phenoxyethyl acrylate, or n-vinylcaprolactam.

An additional aspect of the first additional exemplary embodiment is the coated optical fiber according to any of the previous aspects of the first additional exemplary embodiment, wherein the reactive diluent monomer comprises 2-ethylhexyl acrylate, 2-phenoxyethyl acrylate, or n-vinylcaprolactam.

An additional aspect of the first additional exemplary embodiment is the coated optical fiber according to any of the previous aspects of the first additional exemplary embodiment, wherein the reactive diluent monomer consists of 2-ethylhexyl acrylate, 2-phenoxyethyl acrylate, or n-vinylcaprolactam.

An additional aspect of the first additional exemplary embodiment is the coated optical fiber according to any of the previous aspects of the first additional exemplary embodiment, wherein the reactive diluent monomer consists essentially of 2-ethylhexyl acrylate, 2-phenoxyethyl acrylate, or n-vinylcaprolactam.

An additional aspect of the first additional exemplary embodiment is the coated optical fiber according to any of the previous aspects of the first additional exemplary embodiment, further comprising a second reactive diluent monomer.

An additional aspect of the first additional exemplary embodiment is the coated optical fiber according to any of the previous aspects of the first additional exemplary embodiment, wherein the second reactive diluent monomer comprises ethylhexyl acrylate, phenoxyethyl acrylate, or N-vinyl caprolactam.

An additional aspect of the first additional exemplary embodiment is the coated optical fiber according to any of the previous aspects of the first additional exemplary embodiment, wherein the second reactive diluent monomer comprises 2-ethylhexyl acrylate, 2-phenoxyethyl acrylate, or n-vinylcaprolactam.

An additional aspect of the first additional exemplary embodiment is the coated optical fiber according to any of the previous aspects of the first additional exemplary embodiment, wherein the reactive diluent monomer is present by weight, relative to the weight of the entire coated optical fiber, of at least about 20%, or from about 20 wt. % to about 60 wt. %, or from about 30 wt. % to about 60 wt. %, or from about 30 wt. % to about 50 wt. %.

An additional aspect of the first additional exemplary embodiment is the coated optical fiber according to any of the previous aspects of the first additional exemplary embodiment, wherein the reactive diluent monomer and the second reactive diluent monomer are present by weight, relative to the weight of the entire coated optical fiber, of at least about 20%, or from about 20 wt. % to about 60 wt. %, or from about 30 wt. % to about 60 wt. %, or from about 30 wt. % to about 50 wt. %.

An additional aspect of the first additional exemplary embodiment is the coated optical fiber according to any of the previous aspects of the first additional exemplary embodiment, wherein the reactive diluent monomer is present by weight, relative to the second reactive diluent monomer, in a ratio from 1:1 to 4:1, or from 1:1 to about 2:1.

An additional aspect of the first additional exemplary embodiment is the coated optical fiber according to any of the previous aspects of the first additional exemplary embodiment, wherein the photoinitiator comprises a benzophenone, a benzoylphosphine oxide, an ethoxy or alkoxy phosphine oxide, or a 1-hydroxyphenyl ketone compound.

An additional aspect of the first additional exemplary embodiment is the coated optical fiber according to any of the previous aspects of the first additional exemplary embodiment, wherein the photoinitiator comprises 4-methyl benzophenone, 2,4,6-trimethyl benzophenone, dimethoxybenzophenone, 1-hydroxycyclohexyl phenyl ketone, phenyl (1-hydroxyisopropyl)ketone, 2-hydroxy-1-[4-(2-hydroxyethoxy)phenyl]-2-methyl-1-propanone, and 4-isopropylphenyl(1-hydroxyisopropyl)ketone, benzil dimethyl ketal, oligo-[2-hydroxy-2-methyl-1-[4-(1-methylvinyl)phenyl]propanone]; 2,4,6-trimethylbenzoyl diphenylphosphine oxide, 2,4,6-trimethylbenzoyl phenyl, bis(2,4,6-trimethylbenzoyl)-phenylphosphineoxide, 2-methyl-1-[4-(methylthio)phenyl]-2-morpholinopropanone-1, 2-benzyl-2-(dimethyl amino)-1-[4-(4-morpholinyl)phenyl]-1-butanone, 2-dim ethyl amino-2-(4-methyl-benzyl)-1-(4-morpholin-4-yl-phenyl)-butan-1-one, 4-benzoyl-4'-methyl diphenyl sulphide, 4,4'-bis(diethylamino)benzophenone, and 4,4'-bis(N,N-dimethylamino)benzophenone (Michler's ketone), and mixtures thereof.

An additional aspect of the first additional exemplary embodiment is the coated optical fiber according to any of the previous aspects of the first additional exemplary embodiment, wherein the photoinitiator consists essentially of diphenyl(2,4,6-trimethylbenzoyl)phosphine oxide.

An additional aspect of the first additional exemplary embodiment is the coated optical fiber according to any of the previous aspects of the first additional exemplary embodiment, wherein the photoinitiator consists of diphenyl (2,4,6-trimethylbenzoyl)phosphine oxide.

An additional aspect of the first additional exemplary embodiment is the coated optical fiber according to any of the previous aspects of the first additional exemplary embodiment, wherein the photoinitiator is present in an amount, relative to the weight of the entire composition, of at least 0.1 wt. %, or from about 0.1-5 wt. %, or from 0.1-3 wt. %, or from about 0.1 to about 2 wt. %, or from about 0.5 to about 5 wt. %, or from about 0.5 to about 3 wt. %, or from about 0.5 to about 2 wt. %, or from about 0.5 to about 1.5 wt. %, or from about 0.9 wt. % to about 5 wt. %, or from about 0.9 wt. % to about 3 wt. %, or from about 0.9 wt. % to about 2 wt. %, or from about 0.9 wt. % to about 1.5 wt. %.

An additional aspect of the first additional exemplary embodiment is the coated optical fiber according to any of the previous aspects of the first additional exemplary embodiment, wherein the radiation curable composition further comprises one or more additives.

An additional aspect of the first additional exemplary embodiment is the coated optical fiber according to any of the previous aspects of the first additional exemplary embodiment, wherein the radiation curable composition further comprises at least one adhesion promoter.

An additional aspect of the first additional exemplary embodiment is a coated optical fiber according to the previous aspect, wherein the radiation curable composition further comprises trimethylopropan tri(3-mercaptopropionate).

An additional aspect of the first additional exemplary embodiment is the coated optical fiber according to any of the previous aspects of the first additional exemplary embodiment, wherein the adhesion promoter is present by weight, relative to the weight of the entire radiation curable composition, from 0.001 to 5 wt. %, or from 0.01 to 5 wt. %, or from 0.1 to 5 wt. %, or from 0.5 to 5 wt. %, or from 0.001 to 3 wt. %, or from 0.01 to 3 wt. %, or from 0.1 to 3 wt. %, or from 0.5 to 3 wt. %, or from 0.001 to 1 wt. %, or from 0.01 to 1 wt. %, or from 0.1 to 1 wt. %, or from 0.5 to 1 wt. %.

An additional aspect of the first additional exemplary embodiment is the coated optical fiber according to any of the previous aspects of the first additional exemplary embodiment, wherein the radiation curable composition wherein the radiation curable composition possesses a liquid glass transition temperature (Tg, rheo), wherein the Tg, rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −85° C., or from −115 to −85° C., or from −110 to −85° C., or from −100 to −85° C., or from −120 to −90° C., or from −115 to −90° C., or from −110 to −90° C., or from −100 to −90° C.; or from −120 to −97° C., or from −113 to −97° C.

An additional aspect of the first additional exemplary embodiment is the coated optical fiber according to any of the previous aspects of the first additional exemplary embodiment, wherein Tg,rheo is determined by fitting equation (8) to experimental viscosity versus temperature data for the radiation curable composition:

$$\eta(T)/\eta_{25} = 10^{\left(\frac{-562.5/(62.5 - T_{g,rheo})*(T-25)}{37.5 + T - T_{g,rheo}}\right)}, \quad (8)$$

where η(T) is the viscosity of the composition at temperature, T, and $\eta_{25}$ is the first viscosity.

A first aspect of a second additional exemplary embodiment of the invention is a radiation curable composition for coating an optical fiber comprising:
a reactive oligomer comprising at least one polymerizable group and a backbone derived
from a diol comprising polypropylene glycol;
a reactive diluent monomer; and
one or more photoinitiators;
wherein the radiation curable composition possesses a liquid glass transition temperature (Tg,rheo), a first viscosity at 25° Celsius (C), a second viscosity at 55° C., and a third viscosity at 85° C.;
wherein, at least one of the following conditions is satisfied:
(1) the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −85° C., or from −115 to −85° C., or from −110 to −85° C., or from −100 to −85° C., or from −120 to −90° C., or from −115 to −90° C., or from −110 to −90° C., or from −100 to −90° C.; or from −120 to −97° C., or from −113 to −97° C.;
or
(2) wherein the ratio of the first viscosity to the third viscosity is less than about 15, or less than about 14.4, or less than about 13.9, or less than about 13, or less than 12, or less than about 11, or less than about 10, or less than about 9, or less than about 7.

An additional aspect of the second additional exemplary embodiment is the radiation curable composition according to the previous aspect of the second additional exemplary embodiment, wherein Tg,rheo is determined by fitting equation (8) to experimental viscosity versus temperature data for the radiation curable composition:

$$\eta(T)/\eta_{25} = 10\left(\frac{-562.5/(62.5 - T_{g,rheo})*(T - 25)}{37.5 + T - T_{g,rheo}}\right), \quad (8)$$

where η(T) is the viscosity of the composition at temperature, T, and $\eta_{25}$ is the first viscosity.

An additional aspect of the second additional exemplary embodiment is the radiation curable composition according to either of the previous aspects of the second additional exemplary embodiment, wherein the reactive oligomer comprises a number average from 0.9 to 2.1 more polymerizable groups, or from 0.9 to 1.1 polymerizable groups, or from 0.9 to 3.1 polymerizable groups, or from 1.9 to 2.1 polymerizable groups, or from 1.5 to 2.5 polymerizable groups.

An additional aspect of the second additional exemplary embodiment is the radiation curable composition according to any of the previous aspects of the second additional exemplary embodiment, wherein the polymerizable groups comprise endgroups.

An additional aspect of the second additional exemplary embodiment is the radiation curable composition according to any of the previous aspects of the second additional exemplary embodiment, wherein the polymerizable groups consist essentially of endgroups.

An additional aspect of the second additional exemplary embodiment is the radiation curable composition according to any of the previous aspects of the second additional exemplary embodiment, wherein the polymerizable groups consist of endgroups.

An additional aspect of the second additional exemplary embodiment is the radiation curable composition according to any of the previous aspects of the second additional exemplary embodiment, wherein the polymerizable groups comprise a (meth)acrylate group.

An additional aspect of the second additional exemplary embodiment is the radiation curable composition according to any of the previous aspects of the second additional exemplary embodiment, wherein the endgroups comprise a (meth)acrylate group.

An additional aspect of the second additional exemplary embodiment is the radiation curable composition according to any of the previous aspects of the second additional exemplary embodiment, wherein the polymerizable groups or endgroups comprise an acrylate group.

An additional aspect of the second additional exemplary embodiment is the radiation curable composition according to any of the previous aspects of the second additional exemplary embodiment, wherein the polymerizable groups or endgroups consist essentially of acrylate group(s).

An additional aspect of the second additional exemplary embodiment is the radiation curable composition according to any of the previous aspects of the second additional exemplary embodiment, wherein the polymerizable groups or endgroups consist of acrylate group(s).

An additional aspect of the second additional exemplary embodiment is the radiation curable composition according to any of the previous aspects of the second additional exemplary embodiment, wherein the acrylate group is derived from methyl acrylate, phenoxyethyl acrylate, ethyl acrylate, butyl acrylate, 2-ethylhexylacrylate, 2-hydroxyethyl acrylate, or isobornyl acrylate.

An additional aspect of the second additional exemplary embodiment is the radiation curable composition according to any of the previous aspects of the second additional exemplary embodiment, wherein the reactive oligomer comprises a urethane acrylate oligomer, wherein said urethane acrylate oligomer is the reaction product of an isocyanate, an acrylate, and a polypropylene glycol.

An additional aspect of the second additional exemplary embodiment is the radiation curable composition according to any of the previous aspects of the second additional exemplary embodiment, wherein the reactive oligomer consists of urethane acrylate oligomer(s).

An additional aspect of the second additional exemplary embodiment is the radiation curable composition according to any of the previous aspects of the second additional exemplary embodiment, wherein the reactive oligomer consists essentially of urethane acrylate oligomer(s).

An additional aspect of the second additional exemplary embodiment is the radiation curable composition according to any of the previous aspects of the second additional exemplary embodiment, wherein the isocyanate comprises isophorone diisocyanate, hexane diisocyanate, toluene diisocyanate, 2,2,4-trimethyl hexane diisocyanate, 2,4,4-trimethylhexane diisocyanate, pentane diisocyanate or 4,4-methylene bis(cyclohexyl isocyanate).

An additional aspect of the second additional exemplary embodiment is the radiation curable composition according to the previous aspect of the second additional exemplary embodiment, wherein the isocyanate comprises a mixture of 2,4-toluene-di-isocyanate and 2,6-toluene-di-isocyanate.

An additional aspect of the second additional exemplary embodiment is the radiation curable composition according to any of the previous aspects of the second additional exemplary embodiment, wherein the isocyanate consists of a mixture of 2,4-toluene-di-isocyanate and 2,6-toluene-di-isocyanate.

An additional aspect of the second additional exemplary embodiment is the radiation curable composition according to any of the previous aspects of the second additional exemplary embodiment, wherein the isocyanate consists essentially of a mixture of 2,4-toluene-di-isocyanate and 2,6-toluene-di-isocyanate.

An additional aspect of the second additional exemplary embodiment is the radiation curable composition according to any of the previous aspects of the second additional exemplary embodiment, wherein the ratio, by weight, of the 2,4-toluene-di-isocyanate to the 2,6-toluene-di-isocyanate is from 1:1 to 100:1, or from 30:1 to 60:1, or from 40:1 to 50:1.

An additional aspect of the second additional exemplary embodiment is the radiation curable composition according to any of the previous aspects of the second additional exemplary embodiment, wherein the isocyanate consists of an isophorone diisocyanate.

An additional aspect of the second additional exemplary embodiment is the radiation curable composition according to any of the previous aspects of the second additional exemplary embodiment, wherein the isocyanate consists essentially of an isophorone diisocyanate.

An additional aspect of the second additional exemplary embodiment is the radiation curable composition according to any of the previous aspects of the second additional exemplary embodiment, wherein the reactive oligomer comprises a block copolymer.

An additional aspect of the second additional exemplary embodiment is the radiation curable composition according to the previous aspect of the second additional exemplary embodiment, wherein the block copolymer comprises a monoblock, diblock, or triblock structure.

An additional aspect of the second additional exemplary embodiment is the radiation curable composition according to any of the previous aspects of the second additional exemplary embodiment, wherein the urethane acrylate oligomer consists of block copolymer(s), wherein the block copolymers(s) comprise a monoblock, diblock, or triblock structure.

An additional aspect of the second additional exemplary embodiment is the radiation curable composition according to any of the previous aspects of the second additional exemplary embodiment, wherein the urethane acrylate oligomer consists essentially of block copolymer(s), wherein the block copolymer(s) comprise a monoblock, diblock, or triblock structure.

An additional aspect of the second additional exemplary embodiment is the radiation curable composition according to any of the previous aspects of the second additional exemplary embodiment, wherein the urethane acrylate oligomer comprises a block copolymer consisting of a monoblock structure.

An additional aspect of the second additional exemplary embodiment is the radiation curable composition according to any of the previous aspects of the second additional exemplary embodiment, wherein the urethane acrylate oligomer comprises a block copolymer consisting of a diblock structure.

An additional aspect of the second additional exemplary embodiment is the radiation curable composition according to any of the previous aspects of the second additional exemplary embodiment, wherein the urethane acrylate oligomer comprises a block copolymer consisting of a triblock structure.

An additional aspect of the second additional exemplary embodiment is the radiation curable composition according to any of the previous aspects of the second additional exemplary embodiment, wherein the urethane acrylate oligomer comprises a block copolymer consisting essentially of a monoblock structure.

An additional aspect of the second additional exemplary embodiment is the radiation curable composition according to any of the previous aspects of the second additional exemplary embodiment, wherein the urethane acrylate oligomer comprises a block copolymer consisting essentially of a diblock structure.

An additional aspect of the second additional exemplary embodiment is the radiation curable composition according to any of the previous aspects of the second additional exemplary embodiment, wherein the urethane acrylate oligomer comprises a block copolymer consisting essentially of a triblock structure.

An additional aspect of the second additional exemplary embodiment is the radiation curable composition according to any of the previous aspects of the second additional exemplary embodiment, wherein the reactive oligomer comprises the reaction product of a polypropylene glycol with a number average molecular weight, as measured by size exclusion chromatography using a polystyrene standard in THF from 3,000 to 10,000, or from 3,000 to 8,000, or from 4,000 to 10,000, or from 4,000 to 8,000.

An additional aspect of the second additional exemplary embodiment is the radiation curable composition according to any of the previous aspects of the second additional exemplary embodiment, wherein the polypropylene glycol possesses a hydroxyl equivalent weight of at least about 2000 g/mol, or at least about 3000 g/mol, or from 1500 g/mol to 5000 g/mol, or from 2000 g/mol to 4500 g/mol.

An additional aspect of the second additional exemplary embodiment is the radiation curable composition according to any of the previous aspects of the second additional exemplary embodiment, wherein the reactive oligomer is formed in a process that utilizes a catalyst.

An additional aspect of the second additional exemplary embodiment is the radiation curable composition according to any of the previous aspects of the second additional exemplary embodiment, wherein the catalyst comprises dibutyltin dilaurate or an organobismuth compound.

An additional aspect of the second additional exemplary embodiment is the radiation curable composition according to any of the previous aspects of the second additional exemplary embodiment, wherein the catalyst consists of dibutyltin dilaurate or an organobismuth compound.

An additional aspect of the second additional exemplary embodiment is the radiation curable composition according to any of the previous aspects of the second additional exemplary embodiment, wherein the catalyst consists essentially of dibutyltin dilaurate or organobismuth compounds.

An additional aspect of the second additional exemplary embodiment is the radiation curable composition according to any of the previous aspects of the second additional exemplary embodiment, wherein the catalyst is present, relative to the amount of the entire radiation curable composition, from 0.001 to 1 wt. %, or from 0.01 to 1 wt. %, or from 0.05 to 1 wt. %, or from 0.001 to 0.1 wt. %, or from 0.01 to 0.1 wt. %, or from 0.05 to 0.1 wt. %.

An additional aspect of the second additional exemplary embodiment is the radiation curable composition according to any of the previous aspects of the second additional exemplary embodiment, wherein the reactive oligomer is formed in a process that utilizes an inhibitor.

An additional aspect of the second additional exemplary embodiment is the radiation curable composition according to any of the previous aspects of the second additional exemplary embodiment, wherein the inhibitor comprises butylated hydroxytoluene.

An additional aspect of the second additional exemplary embodiment is the radiation curable composition according to the previous aspect of the second additional exemplary embodiment, wherein the butylated hydroxytoluene is food-grade.

An additional aspect of the second additional exemplary embodiment is the radiation curable composition according to any of the previous aspects of the second additional exemplary embodiment, wherein the inhibitor consists of butylated hydroxytoluene.

An additional aspect of the second additional exemplary embodiment is the radiation curable composition according to any of the previous aspects of the second additional exemplary embodiment, wherein the inhibitor consists essentially of butylated hydroxytoluene.

An additional aspect of the second additional exemplary embodiment is the radiation curable composition according to any of the previous aspects of the second additional exemplary embodiment, wherein the inhibitor is present, relative to the amount of the entire radiation curable composition, from 0.001 to 1 wt. %, or from 0.01 to 1 wt. %, or from 0.05 to 1 wt. %, or from 0.001 to 0.1 wt. %, or from 0.01 to 0.1 wt. %, or from 0.05 to 0.1 wt. %.

An additional aspect of the second additional exemplary embodiment is the radiation curable composition according to any of the previous aspects of the second additional exemplary embodiment, wherein the isocyanate is present by weight, relative to the total weight of the reactive oligomer, from 1 wt. % to 20 wt. %, or from 1 wt. % to 15 wt. %, or from 1 wt. % to 10 wt. %, or from 1 wt. % to 8 wt. %, or from 1 wt. % to 6 wt. %, or from 2 wt. % to 20 wt. %, or from 2 wt. % to 15 wt. %, or from 2 wt. % to 10 wt. %, or from 2 wt. % to 8 wt. %, or from 2 wt. % to 6 wt. %, or from 3.6 wt. % to 20 wt. %, or from 3.6 wt. % to 15 wt. %, or from 3.6 wt. % to 10 wt. %, or from 3.6 wt. % to 8 wt. %, or from 3.6 wt. % to 6 wt. %.

An additional aspect of the second additional exemplary embodiment is the radiation curable composition according to any of the previous aspects of the second additional exemplary embodiment, wherein the polypropylene glycol is present by weight, relative to the total weight of the reactive oligomer, from 80 wt. % to 99 wt. %, or from 80 wt. % to 97 wt. %, or from 80 wt. % to 96 wt. %, or from 80 wt. % to 95.36 wt. %, or from 85 wt. % to 99 wt. %, or from 85 wt. % to 97 wt. %, or from 85 wt. % to 96 wt. %, or from 85 wt. % to 95.36 wt. %, or from 91.22 wt. % to 99 wt. %, or from 91.22 wt. % to 97 wt. %, or from 91.22 wt. % to 96 wt. %, or from 91.22 wt. % to 95.36 wt. %.

An additional aspect of the second additional exemplary embodiment is the radiation curable composition according to any of the previous aspects of the second additional exemplary embodiment, wherein the acrylate is present by weight, relative to the total weight of the reactive oligomer, from 0.3 wt. % to 15 wt. %, or from 0.3 wt. % to 10 wt. %, or from 0.3 wt. % to 5 wt. %, or from 0.3 wt. % to 3 wt. %, or from 0.3 wt. % to 2.72 wt. %, or from 0.75 wt. % to 15 wt. %, or from 0.75 wt. % to 10 wt. %, or from 0.75 wt. % to 5 wt. %, or from 0.75 wt. % to 3 wt. %, or from 0.75 wt. % to 2.72 wt. %, or from 1 wt. % to 15 wt. %, or from 1 wt. % to 10 wt. %, or from 1 wt. % to 5 wt. %, or from 1 wt. % to 3 wt. %, or from 1 wt. % to 2.72 wt. %.

An additional aspect of the second additional exemplary embodiment is the radiation curable composition according to any of the previous aspects of the second additional exemplary embodiment, wherein the molar ratio of the polypropylene glycol to the isocyanate is from 1:4 to 1:1, or from 1:2 to 3:4.

An additional aspect of the second additional exemplary embodiment is the radiation curable composition according to any of the previous aspects of the second additional exemplary embodiment, wherein the molar ratio of the polypropylene glycol to the acrylate is from 1:1 to 5:1, or from 1:1 to 4:1, or from 1:1 to 3:1.

An additional aspect of the second additional exemplary embodiment is the radiation curable composition according to any of the previous aspects of the second additional exemplary embodiment, wherein the molar ratio of the isocyanate to the acrylate is from 1:1 to 5:1, or from 1:1 to 4:1, or from 1:1 to 3:1.

An additional aspect of the second additional exemplary embodiment is the radiation curable composition according to any of the previous aspects of the second additional exemplary embodiment, wherein the number average molecular weight of the reactive oligomer is greater than about 8,000 g/mol, or greater than about 10,000 g/mol, or greater than about 15,000 g/mol, or greater than 20,000 g/mol, or greater than 25,000 g/mol.

An additional aspect of the second additional exemplary embodiment is the radiation curable composition according to any of the previous aspects of the second additional exemplary embodiment, wherein the number average molecular weight of the reactive oligomer is from about 8,000 to about 30,000 g/mol, or from about 8,000 to about 25,000 g/mol, or from about 8,000 to about 20,000 g/mol, or from about 10,000 to about 30,000 g/mol, or from about 10,000 to about 25,000 g/mol, or from about 10,000 to about 20,000 g/mol, or from about 15,000 to about 30,000 g/mol, or from about 15,000 to about 25,000 g/mol, or from about 15,000 to about 20,000 g/mol.

An additional aspect of the second additional exemplary embodiment is the radiation curable composition according to any of the previous aspects of the second additional exemplary embodiment, wherein the number average molecular weight of the urethane acrylate oligomer is greater than about 8,000 g/mol, or greater than about 10,000 g/mol, or greater than about 15,000 g/mol, or greater than 20,000 g/mol, or greater than 25,000 g/mol.

An additional aspect of the second additional exemplary embodiment is the radiation curable composition according to any of the previous aspects of the second additional exemplary embodiment, wherein the number average molecular weight of the urethane acrylate oligomer is from about 8,000 to about 30,000 g/mol, or from about 8,000 to about 25,000 g/mol, or from about 8,000 to about 20,000 g/mol, or from about 10,000 to about 30,000 g/mol, or from about 10,000 to about 25,000 g/mol, or from about 10,000 to about 20,000 g/mol, or from about 15,000 to about 30,000 g/mol, or from about 15,000 to about 25,000 g/mol, or from about 15,000 to about 20,000 g/mol.

An additional aspect of the second additional exemplary embodiment is the radiation curable composition according to any of the previous aspects of the second additional exemplary embodiment, wherein the reactive oligomer is present by weight, relative to the weight of the entire radiation curable composition, of at least about 40%, or from about 50 wt. % to about 70 wt. %.

An additional aspect of the second additional exemplary embodiment is the radiation curable composition according to any of the previous aspects of the second additional exemplary embodiment, wherein the reactive diluent monomer comprises one or more polymerizable groups.

An additional aspect of the second additional exemplary embodiment is the radiation curable composition according to any of the previous aspects of the second additional exemplary embodiment, wherein the one or more polymerizable groups comprise an endgroup.

An additional aspect of the second additional exemplary embodiment is the radiation curable composition according to any of the previous aspects of the second additional exemplary embodiment, wherein the one or more polymerizable groups consist of endgroups.

An additional aspect of the second additional exemplary embodiment is the radiation curable composition according to any of the previous aspects of the second additional exemplary embodiment, wherein the one or more polymerizable groups consist essentially of endgroups.

An additional aspect of the second additional exemplary embodiment is the radiation curable composition according to any of the previous aspects of the second additional exemplary embodiment, wherein the endgroups comprise a (meth)acrylate group.

An additional aspect of the second additional exemplary embodiment is the radiation curable composition according to any of the previous aspects of the second additional exemplary embodiment, wherein the polymerizable groups or endgroups comprise an acrylate group.

An additional aspect of the second additional exemplary embodiment is the radiation curable composition according to any of the previous aspects of the second additional exemplary embodiment, wherein the polymerizable groups or endgroups consist essentially of acrylate group(s).

An additional aspect of the second additional exemplary embodiment is the radiation curable composition according to any of the previous aspects of the second additional exemplary embodiment, wherein the polymerizable groups or endgroups consist of acrylate group(s).

An additional aspect of the second additional exemplary embodiment is the radiation curable composition according to any of the previous aspects of the second additional exemplary embodiment, wherein the reactive diluent monomer comprises a number average from 0.9 to 2.1 more polymerizable groups, or from 0.9 to 1.1 polymerizable groups, or from 0.9 to 3.1 polymerizable groups, or from 1.9 to 2.1 polymerizable groups, or from 0.5 to 1.5 polymerizable groups.

An additional aspect of the second additional exemplary embodiment is the radiation curable composition according to any of the previous aspects of the second additional exemplary embodiment, wherein the reactive diluent monomer comprises a monofunctional compound.

An additional aspect of the second additional exemplary embodiment is the radiation curable composition according to any of the previous aspects of the second additional exemplary embodiment, wherein the reactive diluent monomer consists of monofunctional compound(s).

An additional aspect of the second additional exemplary embodiment is the coated optical fiber according to any of the previous aspects of the second additional exemplary embodiment, wherein the reactive diluent monomer comprises an alkyl acrylate with an alkyl chain comprising at least 8 carbon atoms, or a $C_8$-$C_{24}$ alkyl chain, or a $C_8$-$C_{16}$ alkyl chain.

An additional aspect of the first additional exemplary embodiment is the coated optical fiber according to the previous embodiment, wherein the alkyl acrylate possesses comprises isodecyl acrylate.

An additional aspect of the second additional exemplary embodiment is the radiation curable composition according to any of the previous aspects of the second additional exemplary embodiment, wherein the reactive diluent monomer comprises methyl acrylate, ethyl acrylate, butyl acrylate, 2-ethylhexylacrylate, 2-hydroxyethyl acrylate, isobornyl acrylate, lauryl-acrylate, diethylene-glycol-ethyl-hexyl acylate (DEGEHA), phenoxy-ethyl acrylate, or N-vinyl caprolactam.

An additional aspect of the second additional exemplary embodiment is the radiation curable composition according to any of the previous aspects of the second additional exemplary embodiment, wherein the reactive diluent monomer comprises ethyl-hexyl acrylate, phenoxy-ethyl acrylate, or N-vinyl caprolactam.

An additional aspect of the second additional exemplary embodiment is the radiation curable composition according to any of the previous aspects of the second additional exemplary embodiment, wherein the reactive diluent monomer consists essentially of ethyl-hexyl acrylate, phenoxy-ethyl acrylate, or N-vinyl caprolactam.

An additional aspect of the second additional exemplary embodiment is the radiation curable composition according to any of the previous aspects of the second additional exemplary embodiment, wherein the reactive diluent monomer consists of ethyl-hexyl acrylate, phenoxy-ethyl acrylate, or N-vinyl caprolactam.

An additional aspect of the second additional exemplary embodiment is the radiation curable composition according to any of the previous aspects of the second additional exemplary embodiment, wherein the reactive diluent monomer comprises 2-ethylhexyl acrylate, 2-phenoxyethyl acrylate, or n-vinylcaprolactam.

An additional aspect of the second additional exemplary embodiment is the radiation curable composition according to any of the previous aspects of the second additional exemplary embodiment, wherein the reactive diluent monomer consists of 2-ethylhexyl acrylate, 2-phenoxyethyl acrylate, or n-vinylcaprolactam.

An additional aspect of the second additional exemplary embodiment is the radiation curable composition according to any of the previous aspects of the second additional exemplary embodiment, wherein the reactive diluent monomer consists essentially of 2-ethylhexyl acrylate, 2-phenoxyethyl acrylate, or n-vinylcaprolactam.

An additional aspect of the second additional exemplary embodiment is the radiation curable composition according to any of the previous aspects of the second additional exemplary embodiment, wherein the composition comprises a polar reactive diluent monomer.

An additional aspect of the second additional exemplary embodiment is the radiation curable composition according to any of the previous aspects of the second additional exemplary embodiment, wherein the composition consists of polar reactive diluent monomers.

An additional aspect of the second additional exemplary embodiment is the radiation curable composition according to any of the previous aspects of the second additional exemplary embodiment, wherein consists essentially of polar reactive diluent monomers.

An additional aspect of the second additional exemplary embodiment is the radiation curable composition according to any of the previous aspects of the second additional exemplary embodiment, wherein the composition comprises a reactive diluent monomer possessing a calculated average dipole moment of greater than 2.2 Debye, or greater than 2.3 D, or greater than 2.35, or greater than 2.5, or from 2.2 to 4.2 D, or from 2.3 to 4.1 D, or from 2.35 to 4.1 D, or from 2.35 to 4.0 D, or from 2.35 to 3.7 D, or from 2.35 to 3.0 D, or from 2.4 to 4.1 D, or from 2.4 to 4.0 D, or from 2.4 to 3.7 D, or from 2.4 to 3.0 D.

An additional aspect of the second additional exemplary embodiment is the radiation curable composition according to any of the previous aspects of the second additional exemplary embodiment, wherein the total calculated Boltzmann average dipole moment of all of the reactive diluent monomers present in the composition is greater than 2.2 Debye, or greater than 2.3 D, or greater than 2.35, or greater than 2.5, or from 2.2 to 4.2 D, or from 2.3 to 4.1 D, or from 2.35 to 4.1 D, or from 2.35 to 4.0 D, or from 2.35 to 3.7 D, or from 2.35 to 3.0 D, or from 2.4 to 4.1 D, or from 2.4 to 4.0 D, or from 2.4 to 3.7 D, or from 2.4 to 3.0 D.

An additional aspect of the second additional exemplary embodiment is the radiation curable composition according to any of the previous aspects of the second additional exemplary embodiment, further comprising a second reactive diluent monomer.

An additional aspect of the second additional exemplary embodiment is the radiation curable composition according to any of the previous aspects of the second additional exemplary embodiment, wherein the second reactive diluent monomer comprises ethylhexyl acrylate, phenoxyethyl acrylate, or N-vinyl caprolactam.

An additional aspect of the second additional exemplary embodiment is the radiation curable composition according to any of the previous aspects of the second additional exemplary embodiment, wherein the second reactive diluent monomer comprises 2-ethylhexyl acrylate, 2-phenoxyethyl acrylate, or n-vinylcaprolactam.

An additional aspect of the second additional exemplary embodiment is the radiation curable composition according to any of the previous aspects of the second additional exemplary embodiment, comprising at least two different reactive diluent monomers.

An additional aspect of the second additional exemplary embodiment is the radiation curable composition according to any of the previous aspects of the second additional exemplary embodiment, wherein the reactive diluent monomer comprises ethyl-hexyl acrylate and phenoxy-ethyl acrylate, or ethyl-hexyl acrylate and n-vinyl caprolactam.

An additional aspect of the second additional exemplary embodiment is the radiation curable composition according to any of the previous aspects of the second additional exemplary embodiment, wherein the reactive diluent monomer is present by weight, relative to the weight of the entire radiation curable composition, of at least about 20%, or from about 20 wt. % to about 60 wt. %, or from about 30 wt. % to about 60 wt. %, or from about 30 wt. % to about 50 wt. %.

An additional aspect of the second additional exemplary embodiment is the radiation curable composition according to any of the previous aspects of the second additional exemplary embodiment, wherein the photoinitiator comprises a benzophenone, a benzoylphosphine oxide, an ethoxy phosphine oxide, or a 1-hydroxyphenyl ketone compound.

An additional aspect of the second additional exemplary embodiment is the radiation curable composition according to any of the previous aspects of the second additional exemplary embodiment, wherein the photoinitiator comprises 4-methyl benzophenone, 2,4,6-trimethyl benzophenone, dimethoxybenzophenone, 1-hydroxycyclohexyl phenyl ketone, phenyl(1-hydroxyisopropyl)ketone, 2-hydroxy-1-[4-(2-hydroxyethoxy)phenyl]-2-methyl-1-propanone, and 4-isopropylphenyl(1-hydroxyisopropyl)ketone, benzil dimethyl ketal, oligo-[2-hydroxy-2-methyl-1-[4-(1-methylvinyl)phenyl]propanone]; 2,4,6-trimethylbenzoyl diphenylphosphine oxide, 2,4,6-trimethylbenzoyl phenyl, bis(2,4,6-trimethylbenzoyl)-phenylphosphineoxide, 2-methyl-1-[4-(methylthio)phenyl]-2-morpholinopropanone-1, 2-benzyl-2-(dimethylamino)-1-[4-(4-morpholinyl)phenyl]-1-butanone, 2-dimethyl amino-2-(4-methyl-benzyl)-1-(4-morpholin-4-yl-phenyl)-butan-1-one, 4-benzoyl-4'-methyl diphenyl sulphide, 4,4'-bis(diethylamino)benzophenone, and 4,4'-bis(N,N-dimethylamino)benzophenone (Michler's ketone), and mixtures thereof.

An additional aspect of the second additional exemplary embodiment is the radiation curable composition according to any of the previous aspects of the second additional exemplary embodiment, wherein the photoinitiator consists essentially of diphenyl(2,4,6-trimethylbenzoyl)phosphine oxide.

An additional aspect of the second additional exemplary embodiment is the radiation curable composition according to any of the previous aspects of the second additional exemplary embodiment, wherein the photoinitiator consists of diphenyl(2,4,6-trimethylbenzoyl)phosphine oxide.

An additional aspect of the second additional exemplary embodiment is the radiation curable composition according to any of the previous aspects of the second additional exemplary embodiment, wherein the photoinitiator is present in an amount, relative to the weight of the entire composition, of at least 0.1 wt. %, or from about 0.1-5 wt. %, or from 0.1-3 wt. %, or from about 0.1 to about 2 wt. %, or from about 0.5 to about 5 wt. %, or from about 0.5 to about 3 wt. %, or from about 0.5 to about 2 wt. %, or from about 0.5 to about 1.5 wt. %, or from about 0.9 wt. % to about 5 wt. %, or from about 0.9 wt. % to about 3 wt. %, or from about 0.9 wt. % to about 2 wt. %, or from about 0.9 wt. % to about 1.5 wt. %.

An additional aspect of the second additional exemplary embodiment is the radiation curable composition according to any of the previous aspects of the second additional exemplary embodiment, further comprising one or more additives.

An additional aspect of the second additional exemplary embodiment is the radiation curable composition according to any of the previous aspects of the second additional exemplary embodiment, further comprising at least one adhesion promoter.

An additional aspect of the second additional exemplary embodiment is the radiation curable composition according to the previous aspect of the second additional exemplary embodiment, wherein the radiation curable composition comprises trimethylopropan tri(3-mercaptopropionate).

An additional aspect of the second additional exemplary embodiment is the radiation curable composition according to any of the previous aspects of the second additional exemplary embodiment, wherein the radiation curable composition is a liquid at each of the first viscosity, the second viscosity, and the third viscosity, and wherein the ratio of the first viscosity to the third viscosity is less than about 15, or less than about 14.4, or less than about 13, or less than about 12, or less than about 11, or less than about 10, or less than about 9, or less than about 7, or wherein the ratio of the first viscosity to the third viscosity is less than 15, or less than 14, or less than 13, or less than 12, or less than 11, or less than 10, or less than 9, or less than 7.

An additional aspect of the second additional exemplary embodiment is the radiation curable composition according to the previous aspect of the second additional exemplary embodiment, wherein the ratio of the first viscosity to the third viscosity is from about 5 to about 15, or from about 5 to about 14.4, or from about 5 to about 13.9, or from about 5 to about 13, or from about 5 to about 12, or from about 5 to about 11, or from about 5 to about 10, or from about 5 to about 9, or from about 5 to about 7, or from about 7 to about 15, or from about 7 to about 14.4, or from about 7 to about 13.9, or from about 7 to about 13, or from about 7 to about 12, or from about 7 to about 11, or from about 7 to about 10, or from about 7 to about 9.

An additional aspect of the second additional exemplary embodiment is the radiation curable composition according to either of the previous two aspects of the second additional exemplary embodiment, wherein the ratio of the first viscosity to the third viscosity is from 5 to 15, or from 5 to 14.4, or from 5 to 13.9, or from 5 to 13, or from 5 to 12, or from 5 to 11, or from 5 to 10, or from 5 to 9, or from 5 to 7, or from 7 to 15, or from 7 to 14.4, or from 7 to 13.9, or from 7 to 13, or from 7 to 12, or from 7 to 11, or from 7 to 10, or from 7 to 9.

An additional aspect of the second additional exemplary embodiment is the radiation curable composition according to any of the previous three aspects of the second additional exemplary embodiment, wherein the ratio of the first viscosity to the second viscosity is less than about 4.7, or less than 4.6, or less than about 4.4, or less than about 4.2, or less than about 4.0, or less than about 3.5, or wherein the ratio of the first viscosity to the second viscosity is less than 4.7, or less than 4.6, or less than 4.4, or less than 4.2, or less than 4.0, or less than 3.5.

An additional aspect of the second additional exemplary embodiment is the radiation curable composition according to the previous aspect of the second additional exemplary embodiment, wherein the ratio of the first viscosity to the second viscosity is from about 2 to about 4.7, or from about 3 to about 4.7, or from about 2 to about 4.6, or from about 3 to about 4.6, or from about 2 to about 4.4, or from about 3 to about 4.4, or from about 2 to about 4.2, or from about 3 to about 4.2, or from about 2 to about 4.0 or from about 3 to about 4.0, or from about 2 to about 3.5, or from about 3 to about 3.5.

An additional aspect of the second additional exemplary embodiment is the radiation curable composition according to any of the previous aspects of the second additional exemplary embodiment, wherein the ratio of the first viscosity to the second viscosity is from 2 to 4.7, or from 3 to 4.7, or from 2 to 4.6, or from 3 to 4.6, or from 2 to 4.4, or from 3 to 4.4, or from 2 to 4.2, or from 3 to 4.2, or from 2 to 4.0 or from 3 to 4.0, or from 2 to 3.5, or from 3 to 3.5.

An additional aspect of the second additional exemplary embodiment is the radiation curable composition according to any of the previous aspects of the second additional exemplary embodiment, wherein the second or third viscosity is greater than 0.01 pascal seconds (Pa·s), or greater than 0.10 Pa·s, or less than 1 Pa·s, or between about 0.01 Pa·s to about 1 Pa·s, or from about 0.03 Pa·s to about 1 Pa·s, or from about 0.03 Pa·s to about 0.8 Pa·s, or from about 0.03 Pa·s to about 0.5 Pa·s, or from about 0.03 Pas to about 0.4 Pa·s, or from about 0.05 Pa·s to about 1 Pa·s, or from about 0.05 Pa·s to about 0.5 Pa·s, or from about 0.1 Pas to about 1 Pa·s, or from about 0.1 Pa·s to about 0.8 Pa·s.

An additional aspect of the second additional exemplary embodiment is the radiation curable composition according to any of the previous aspects of the second additional exemplary embodiment, wherein the third viscosity is greater than 0.01 pascal seconds (Pa·s), or greater than 0.10 Pa·s, or less than 2 Pa·s, or less than 1 Pa·s, or between about 0.01 Pa·s to about 1 Pa·s, or from about 0.03 Pa·s to about 1 Pa·s, or from about 0.03 Pa·s to about 0.8 Pa·s, or from about 0.03 Pa·s to about 0.5 Pa·s, or from about 0.03 Pa·s to about 0.4 Pa·s, or from about 0.05 Pa·s to about 1 Pa·s, or from about 0.05 Pas to about 0.5 Pa·s, or from about 0.1 Pas to about 1 Pa·s, or from about 0.1 Pas to about 0.8 Pa·s.

An additional aspect of the second additional exemplary embodiment is the radiation curable composition according to any of the previous aspects of the second additional exemplary embodiment, wherein the first viscosity is between 0.1 to 20 Pa·s, or from 0.5 to 15 Pa·s, or from 1 to 10 Pa·s, the second viscosity is between 0.03 to 6 Pa·s, or from 0.05 to 5 Pa·s, or from 0.1 to 3 Pa·s, and the third viscosity is between 0.01 to 2 Pa·s, or from 0.03 to 1.5 Pa·s, or from 0.05 to 1 Pa·s.

The third additional exemplary embodiment of the invention is a coated optical fiber comprising a primary coating, wherein the primary coating is the cured product of the radiation curable composition according to any of the aspects of the second additional exemplary embodiment.

A first aspect of the fourth additional exemplary embodiment of the invention is a method for producing a coated optical fiber comprising the steps of:
drawing a glass optical fiber through a draw tower;
applying a primary coating composition onto the surface of the glass optical fiber;
optionally, imparting a dose of UV light sufficient to at least partially cure said primary coating composition;
applying a secondary coating composition to the primary coating composition;
exposing the primary coating composition and the secondary coating composition to at least one radiation source capable of emitting ultraviolet radiation to affect curing of said primary coating composition and said secondary coating composition, to form a cured primary coating on the surface of the optical fiber, and a cured secondary coating on the surface of the cured primary coating;
wherein the primary coating composition comprises a reactive oligomer comprising at least one polymerizable group and a backbone derived from a diol comprising polypropylene glycol;
a reactive diluent monomer; and
one or more photoinitiators;
wherein the radiation curable composition possesses a liquid glass transition temperature (Tg,rheo), a first viscosity at 25° Celsius (C), a second viscosity at 55° C., and a third viscosity at 85° C.;
wherein the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −90° C., or from −115 to −90° C., or from −110 to −90° C., or from −100 to −90° C.; or from −120 to −97° C., or from −113 to −97° C.; or
wherein the ratio of the first viscosity to the third viscosity is less than about 15, or less than about 14.4, or less than about 13.9, or less than about 13, or less than about 9, or less than about 7.

An additional aspect of the fourth additional exemplary embodiment is the method of the previous aspect, wherein Tg,rheo is determined by fitting equation (8) to experimental viscosity versus temperature data for the radiation curable composition:

$$\eta(T)/\eta_{25} = 10\left(\frac{-562.5/(62.5 - T_{g,rheo})*(T - 25)}{37.5 + T - T_{g,rheo}}\right), \quad (8)$$

where η(T) is the viscosity of the composition at temperature, T, and $\eta_{25}$ is the first viscosity.

An additional aspect of the fourth additional exemplary embodiment is the method of either of the previous aspects, wherein the radiation curable composition is a liquid at the first viscosity, the second viscosity, and the third viscosity, and wherein the third viscosity is greater than 0.01 pascal seconds (Pa·s), or greater than 0.10 Pa·s, or less than 1 Pa·s, or between about 0.01 Pa·s to about 1 Pa·s, or from about 0.03 Pas to about 1 Pa·s, or from about 0.03 Pa·s to about 0.8 Pa·s, or from about 0.03 Pas to about 0.5 Pa·s, or from about 0.03 Pas to about 0.4 Pa·s, or from about 0.05 Pas to about 1 Pa·s, or from about 0.05 Pa·s to about 0.5 Pa·s, or from about 0.1 Pa·s to about 1 Pa·s, or from about 0.1 Pa·s to about 0.8 Pa·s.

An additional aspect of the fourth additional exemplary embodiment is the method of either of the previous two aspects, wherein the ratio of the first viscosity to the third viscosity is from about 5 to about 15, or from about 5 to about 14.4, or from about 5 to about 13.9, or from about 5 to about 13, or from about 5 to about 9, or from about 5 to about 7, or from about 7 to about 15, or from about 7 to about 14.4, or from about 7 to about 13.9, or from about 7 to about 13, or from about 7 to about 9.

An additional aspect of the fourth additional exemplary embodiment is the method of any of the previous aspects of the fourth additional exemplary embodiment, wherein the drawing occurs under one of the following conditions:
- at a draw speed of greater than 1500 m/min, or greater than 1700 m/min, or greater than 2000 m/min, or greater than 2500 m/min, or greater than 3000 m/min, and less than 5000 m/min, or less than 4000 m/min, or less than 3100 m/min; or
- under the application of no helium, or the application of helium at a flow rate of less than 20 standard liters per minute (SLM), or less than 10 SLM, or less than 5 SLM, or from 1 to 20 SLM, or from 1 to 10 SLM, or from 1 to 5 SLM, or from 5 to 20 SLM, or from 5 to 10 SLM.

An additional aspect of the fourth additional exemplary embodiment is the method of any of the previous aspects of the fourth additional exemplary embodiment, wherein the primary coating composition is the radiation curable composition of any of the aspects of the second additional exemplary embodiment.

An additional aspect of the fourth additional exemplary embodiment is the coated optical fiber produced by the process of any of the previous aspects of the fourth additional exemplary embodiment.

A first aspect of the fifth additional exemplary embodiment of the invention is an optical fiber cable comprising a plurality of coated optical fibers disposed within at least a portion of the cable, wherein at least one of the plurality of coated optical fibers comprises a primary coating that is the cured product of a radiation curable composition comprising
- a urethane acrylate oligomer which is the reaction product of an isocyanate, a polyol, and an acrylate monomer;
- a reactive diluent monomer; and
- a free-radical photoinitiator;
- wherein the radiation curable composition possesses a first viscosity at 25° Celsius (C), a second viscosity at 55° C., and a third viscosity at 85° C., wherein the radiation curable composition is a liquid at each of the first viscosity, the second viscosity, and the third viscosity, and wherein the ratio of the first viscosity to the third viscosity is less than about 15, or less than about 14.4, or less than about 13.9, or less than about 13, or less than about 9, or less than about 7.

An additional aspect of the fifth additional exemplary embodiment is an optical fiber cable according to the previous aspect, wherein at least one of the coated optical fibers possess a mode-field diameter from 8 to 10 µm at a wavelength of 1310 nm, or a mode-field diameter from 9 to 13 µm at a wavelength of 1550 nm.

An additional aspect of the fifth additional exemplary embodiment is the optical fiber cable according to either of the previous two aspects, wherein at least one of the coated optical fibers is a single-mode fiber that is configured to possess an effective area between 20 and 200 µm².

An additional aspect of the fifth additional exemplary embodiment is the optical fiber cable according to any of the previous aspects of the fifth additional exemplary embodiment, wherein at least one of the coated optical fibers is a multi-mode fiber that is configured to possess an effective area between 1500 and 3500 µm².

An additional aspect of the fifth additional exemplary embodiment is the optical fiber cable of any of the previous aspects of the fifth additional exemplary embodiment, wherein the radiation curable composition possesses a liquid glass transition temperature (Tg,rheo); wherein the Tg,rheo of the radiation curable composition is less than −81.5° C., or from −120 to −80° C., or from −115 to −80° C., or from −110 to −80° C., or from −100 to −80° C., or from −120 to −82° C., or from −115 to −82° C., or from −110 to −82° C., or from −100 to −82° C., or from −120 to −90° C., or from −115 to −90° C., or from −110 to −90° C., or from −100 to −90° C., or from −120 to −97° C., or from −113 to −97° C.; wherein Tg,rheo is determined by fitting equation (8) to experimental viscosity versus temperature data for the radiation curable composition:

$$\eta(T)/\eta_{25} = 10\left(\frac{-562.5/(62.5 - T_{g,rheo}) * (T - 25)}{37.5 + T - T_{g,rheo}}\right), \quad (8)$$

where η(T) is the viscosity of the composition at temperature, T, and $\eta_{25}$ is the first viscosity.

An additional aspect of the fifth additional exemplary embodiment is the optical fiber cable of any of the previous aspects of the fifth additional exemplary embodiment, wherein the radiation curable composition is a liquid at the first viscosity, the second viscosity, and the third viscosity, and wherein the third viscosity is greater than 0.01 pascal seconds (Pa·s), or greater than 0.10 Pa·s, or less than 1 Pa·s, or between about 0.01 Pa·s to about 1 Pa·s, or from about 0.03 Pa·s to about 1 Pa·s, or from about 0.03 Pa·s to about 0.8 Pa·s, or from about 0.03 Pa·s to about 0.5 Pa·s, or from about 0.03 Pa·s to about 0.4 Pa·s, or from about 0.05 Pas to about 1 Pa·s, or from about 0.05 Pa·s to about 0.5 Pa·s, or from about 0.1 Pa·s to about 1 Pa·s, or from about 0.1 Pa·s to about 0.8 Pa·s.

An additional aspect of the fifth additional exemplary embodiment is the optical fiber cable of any of the previous aspects of the fifth additional exemplary embodiment, wherein the radiation curable composition is the radiation curable composition according to any of the previous claims.

An additional aspect of the fifth additional exemplary embodiment is the optical fiber cable of any of the previous aspects of the fifth additional exemplary embodiment, wherein the plurality of coated optical fibers is coated via the methods according to any of the aspects of the fourth additional exemplary embodiment.

An additional aspect of the fifth additional exemplary embodiment is the optical fiber cable of any of the previous aspects of the fifth additional exemplary embodiment, wherein the plurality of coated optical fibers are the optical fibers according to any of the aspects of the first additional exemplary embodiment.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A radiation curable composition for coating an optical fiber comprising:
   a reactive oligomer comprising at least one polymerizable group and a backbone comprising a compound derived from a polypropylene glycol;
   a reactive diluent monomer;
   a photoinitiator; and
   optionally, one or more additives;
   wherein, relative to the weight of the entire composition, the reactive oligomer is present in an amount of at least 70 wt. %;
   wherein the radiation curable composition possesses a liquid glass transition temperature (Tg, rheo), a first viscosity at 25° Celsius (C) ($\eta_{25}$), a second viscosity at 55° ($\eta_{55}$), and a third viscosity at 85° C. ($\eta_{85}$);
   wherein the first viscosity of the radiation curable composition is from 0.1 to 20 Pascal seconds (Pa·s) at a shear rate of 10 s$^{-1}$;
   wherein
   the Tg, rheo of the radiation curable composition is from −120 to −82° C., wherein Tg, rheo is determined by fitting equation (8) to experimental viscosity versus temperature data for the radiation curable composition:

$$\eta(T)/\eta_{25} = 10\left(\frac{-562.5/(62.5 - T_{g,rheo}) * (T - 25)}{37.5 + T - T_{g,rheo}}\right), \quad (8)$$

where $\eta(T)$ is the viscosity of the composition at temperature, T (in ° C.); and
   wherein the polypropylene glycol is present by weight, relative to the total weight of the reactive oligomer, from 80 wt. % to 96 wt. %.

2. The radiation curable composition of claim 1, wherein the reactive oligomer possesses, as measured by a size exclusion chromatography (SEC) method,
   a peak molecular weight (Mp),
   a Z-average molecular weight (Mz), and
   a number average molecular weight (Mn);
   wherein a Relative High Molecular Weight Ratio (RHMWR) of the reactive oligomer is from −0.3 to 3, wherein $$RHMWR = \frac{Mp - Mz}{Mn}.$$

3. The radiation curable composition of claim 1, wherein the reactive diluent monomer comprises a compound possessing a calculated Botzmann average dipole moment by weight fraction of greater than 2.2 Debye (D).

4. The radiation curable composition of claim 3, wherein the total calculated Boltzmann average dipole moment of all of the reactive diluent monomers present in the composition is from 2.2 to 4.2 D.

5. The radiation curable composition of claim 1, wherein the reactive oligomer comprises a urethane acrylate oligomer which is a product of reactants, said reactants comprising an isocyanate, a polyol, and an acrylate monomer.

6. The radiation curable composition of claim 5, wherein
   the polyol comprises polypropylene glycol;
   the isocyanate comprises isophorone diisocyanate, 2,4-isomer toluent diisocyanate, 4,4'-methylenedicyclohexyl diisocyanate, 1,5-pentane diisocyanate, 2,2,4-trimethyl-hexamethylene diisocyanate, 2,4,4-trimethyl-hexamethylene diisocyanate, or hexamethylene diisocyanate, or combinations thereof; and
   the acrylate monomer comprises methyl acrylate, ethyl acrylate, butyl acrylate, 2-ethylhexylacrylate, 2-phenoxy ethyl acrylate, 2-hydroxyethyl acrylate, lauryl acrylate, or isobornyl acrylate, or combinations thereof.

7. The radiation curable composition according to claim 5, wherein the reactive diluent monomer comprises 2-ethylhexyl acrylate, 2-phenoxyethyl acrylate, 2-(2-ethoxyethoxy)ethyl acrylate, n-vinyl pyrrolidone, dimethylacrylamide, n-vinylcaprolactam, ethoxylated 2-phenoxy ethyl acrylate, 4-hydroxy butyl acrylate, lauryl acrylate, isobornyl acrylate, caprolactone acrylate, ethoxylated nonylphenol acrylate, or isodecyl acrylate, or combinations thereof.

8. The radiation curable composition according to claim 5, wherein the reactive oligomer comprises a block copolymer comprising at least one polyether block, wherein the reactive oligomer possesses a monoblock structure, a diblock structure, or a triblock structure,
   wherein a monoblock structure is defined as an average number from 0.9 to less than 1.5 polyether blocks per unreacted oligomer,
   a diblock structure is defined as an average number of between 1.5 to less than 2.5 polyether blocks per unreacted oligomer, and
   a triblock structure is defined as an average number of between 2.5 to less than 3.5 polyether blocks per unreacted oligomer.

9. The radiation curable composition according to claim 5, wherein the reactive oligomer is difunctional and possesses a weight average molecular weight from 8,000 g/mol to 25,000 g/mol.

10. The radiation curable composition according to claim 5, wherein a molar ratio of the compound derived from polypropylene glycol to the isocyanate is from 1:4 to 1:1.

11. The radiation curable composition of claim 5, wherein the composition comprises, relative to the entire weight of the composition:

at least 60 wt. % of the reactive oligomer;

at least 5 wt. % of the reactive diluent monomer;

at least 1 wt. % of the photoinitiator;

wherein the composition further comprises an adhesion promoter.

12. The radiation curable composition of claim 11, wherein the reactive diluent monomer comprises at least two different compounds, wherein at least one of the two different compounds is a diacrylate, wherein the diacrylate is present, relative to the entire composition, from 0.25 wt. % to 10 wt. %.

13. The radiation curable composition of claim 11, wherein the radiation curable composition is a liquid at each of the first viscosity, the second viscosity, and the third viscosity, and wherein the ratio of the first viscosity to the third viscosity is from 6.4 to 13.9.

14. The radiation curable composition of claim 13, wherein the ratio of the first viscosity to the third viscosity is from 6.4 to 10.7.

15. The radiation curable composition of claim 13, wherein the ratio of the first viscosity to the second viscosity is from 2.9 to 4.98.

16. The radiation curable composition of claim 13, wherein Tg, rheo of the radiation curable composition is from −115 to −90° C.

17. The radiation curable composition of claim 13, wherein the third viscosity is between 0.10 and 1 Pa·s, at a shear rate of 10 $s^{-1}$.

18. The radiation curable composition according to claim 1, wherein a cured film formed from said radiation curable composition possesses a tensile modulus E'23 of less than 1.0 MPa.

19. The radiation curable composition of claim 1, wherein a cured film formed from said radiation curable composition possesses a strain energy release rate $G_0$ from 25 to 60 J/m².

20. The radiation curable composition of claim 1, wherein a cured film formed from said radiation curable composition possesses an Edward-Vilgis strain hardening parameter a greater than 0.07.

* * * * *